(12) United States Patent
Kawanabe

(10) Patent No.: US 7,068,386 B2
(45) Date of Patent: Jun. 27, 2006

(54) IMAGE PROCESSING SYSTEM, IMAGE DATA PROCESSING METHOD, AND STORAGE MEDIUM

(75) Inventor: Tetsuya Kawanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1046 days.

(21) Appl. No.: 09/853,710

(22) Filed: May 14, 2001

(65) Prior Publication Data
US 2002/0001100 A1 Jan. 3, 2002

(30) Foreign Application Priority Data

| May 16, 2000 | (JP) | ............................... 2000-144026 |
| May 16, 2000 | (JP) | ............................... 2000-144027 |
| May 16, 2000 | (JP) | ............................... 2000-144028 |
| May 16, 2000 | (JP) | ............................... 2000-144029 |
| May 16, 2000 | (JP) | ............................... 2000-144030 |
| May 16, 2000 | (JP) | ............................... 2000-144031 |

(51) Int. Cl.
*G06F 15/00* (2006.01)
*G06F 3/12* (2006.01)
*G06F 1/32* (2006.01)
*H04N 1/00* (2006.01)
*G11C 5/14* (2006.01)

(52) U.S. Cl. ...................... 358/1.15; 358/1.1; 358/407; 379/100.09; 713/320; 365/227

(58) Field of Classification Search ............... 358/1.15, 358/1.16, 501, 530, 1.1; 725/6; 710/13; 711/102, 103, 115, 154; 379/357.02; 705/41; 709/229
See application file for complete search history.

(56) References Cited

U.S. PATENT DOCUMENTS

5,550,637 A * 8/1996 Murakami ................... 358/296

FOREIGN PATENT DOCUMENTS

| EP | 0 575 168 | 12/1993 |
| EP | 0 920 184 | 6/1999 |
| JP | 59-000624 | 1/1984 |
| JP | 62-272384 | 11/1987 |
| JP | 63-220385 | 9/1988 |
| JP | 01-159274 | 6/1989 |

(Continued)

*Primary Examiner*—Mark Wallerson
*Assistant Examiner*—Thomas J. Lett
(74) *Attorney, Agent, or Firm*—Fitzpatrick, Cella, Harper & Scinto

(57) ABSTRACT

This invention provides an image processing system which is built by connecting a host device which reads out and executes program data stored in a storage medium, and a device added with a card device function, and which allows easy device connection and has high convenience. In this system, the device connected to the system has a communication controller (11) for controlling a communication between the host device and the device, a card interface (31) for connecting a card device, a card controller (30, 40) for controlling a card device which is detachably connectable to the card interface, a communication unit (2, 3) for sharing device information between the host device and the card device via the card controller and the communication controller, and a controller (10) for allowing another device connected via the card device to use information shared by the communication unit.

24 Claims, 41 Drawing Sheets

FOREIGN PATENT DOCUMENTS

| | | |
|---|---|---|
| JP | 03-225410 | 10/1991 |
| JP | 04-199392 | 7/1992 |
| JP | 06-052670 | 2/1994 |
| JP | 06-282127 | 7/1994 |
| JP | 06-309265 | 11/1994 |
| JP | 07-234833 | 9/1995 |
| JP | 08/263188 | 10/1996 |
| JP | 08-305654 | 11/1996 |
| JP | 9-46470 | 2/1997 |
| JP | 11-068765 | 3/1999 |
| JP | 11-075000 | 3/1999 |
| JP | 11-195038 | 7/1999 |
| JP | 11-205523 | 7/1999 |
| JP | 11-272656 | 10/1999 |
| JP | 11-306119 | 11/1999 |
| JP | 11-320977 | 11/1999 |
| JP | 11-321028 | 11/1999 |
| JP | 2000-112705 | 4/2000 |
| JP | 2000-132398 | 5/2000 |
| JP | 2001-322335 | 11/2001 |
| JP | 2001-322336 | 11/2001 |
| JP | 2001-325079 | 11/2001 |
| JP | 2001-325114 | 11/2001 |
| JP | 2001-325714 | 11/2001 |
| JP | 2001-326766 | 11/2001 |

* cited by examiner

FIG. 10

| Len | Rn | Msg | Ack | Did1 | Did2 | Data / Str |

FIG. 31

| OBJECT NAME | TYPE | POSITION | ENLARGEMENT/ REDUCTION | ROTATION/ REVERSE | LAYER |
|---|---|---|---|---|---|
| P1 | ClipArt | x1,y1 | 120% | 0°, 0 | 0 |
| P2 | Jpeg | x2,y2 | 100% | 0°, 0 | 0 |
| T1 | Text | x3,y3 | 100% | 0°, 0 | 0 |
| P3 | Jpeg | x4,y4 | 25% | 0°, 0 | 1 |
| T2 | Text | x5,y5 | 80% | 0°, 0 | 0 |

IMAGE PROCESSING SYSTEM, IMAGE DATA PROCESSING METHOD, AND STORAGE MEDIUM

FIELD OF THE INVENTION

The present invention relates to an image processing system which includes a printer device to which a detachable card device is attached, and which has a connection function, and a host device and, more particularly, to an image processing system in which a card device includes a communication controller for exchanging information with a host device, and a printer device prints in accordance with information from the card device, an image data processing method, and a storage medium which stores a program module that makes a computer implement that method.

BACKGROUND OF THE INVENTION

In recent years, information devices such as personal computers (to be referred to as PCs hereinafter) and the like have increasingly prevailed in homes. Also, an infrastructure environment such as the Internet or the like with which everyone can easily use information on the network has been built, and digital home appliances such as digital cameras, digital video cameras, and the like have proliferated. Under such circumstances, printer devices that can obtain a desired printout have rapidly spread to homes.

A so-called multimedia environment that allows the user to print or to insert images sensed by digital cameras and the like in e-mail messages, home pages, and the like via the Internet by connecting such devices to the PC is ready. Upon building use environments of such devices, installation processes are often required. That is, the user must install an application program to be used, a so-called device driver required to use a device to be connected, and the like in the PC in advance, and then must connect the device to a predetermined I/O port. That is, the user can use the required functions after he or she successfully completes such installation processes.

However, since these processes require some expert knowledge and correct understanding of manuals and the like, such requirements make beginners, children, aged users, and the like harder to use such functions and impose mental loads on them.

The conventional arrangement will be explained below with reference to the accompanying drawings. FIG. 38 is a view for explaining an example of the conventional arrangement, and shows a system arrangement using a personal computer (PC). Reference numeral 500 denotes a PC main body. A monitor 501 is connected to a video circuit (not shown), and can output text and images.

As shown in FIG. 38, many devices are connected to the PC main body: a keyboard 503 for inputting text and the like, a mouse 504 as one of pointing devices for operating an input instruction position such as a pointer on a screen, and a printer 505 used to obtain a desired printout are connected to an I/F port 507. The PC main body comprises a CD (compact disk reader) 506 which can read the contents of a CD-ROM (compact disk ROM) that records information required to install an application and the like, a floppy disk device (not shown), a large-size memory 502 which comprises a hard disk or a flash ROM (electrically programmable memory) for storing application programs, device drivers, and the like installed using information recorded on a CD-ROM in the CD 506 and floppy disk, and a work memory, an external I/F 510 which comprises a modem used to connect an external network 511 such as the Internet or the like, a network communication circuit, and the like, and an I/O port 508 used to connect a digital home appliance 512 such as a digital camera or the like, and other external devices 509.

In the conventional arrangement, when the user connects and uses a desired application program, and devices such as a printer, digital camera, and the like he or she purchased, he or she must install program information/data supplied via storage media such as a floppy disk, CD-ROM, and the like which come with them or via a file acquired via the Internet or the like in the hard disk or the like. For this reason, upon using the application and the devices connected, the storage capacity of the expensive hard disk decreases.

Before the user begins to use the desired application or device connected after the installation processes, he or she must often restart the personal computer, thus requiring a long setup time until he or she can begin to use them.

Upon connecting various devices shown in FIG. 38, the user must often attach option boards such as an I/F port, I/O card, external I/F, and the like to the PC main body.

Upon attaching such option boards, in most cases, the user must temporarily turn off the power supplies of devices already connected to the PC, and the power supply of the PC itself, open the housing cover of the PC main body, insert an option board into a predetermined I/O slot and fix it using screws or the like, close the housing cover again, and turn on the power supply to start the system. After that, in order to use the inserted option board, the user must install an optimal device driver and the like in the hard disk or the like, restart the system once more in the worst case, and then install a device driver and the like of a required device to be connected to that option board, resulting in troublesome operations.

Such option card or a control circuit of a device built in the PC main body often incorporates a ROM or the like so as to control various functions. In recent years, a flash ROM (electrically erasable/programmable ROM) is used as such ROM so that the ROM contents can be rewritten, and the user can debug software and upgrade the version of software after purchase.

However, such rewrite operation of the ROM contents is normally done by the user, and is provided at user's own risk. That is, this operation requires some expert knowledge.

For example, confirmation of the version of a ROM to be rewritten, acquisition of an appropriate version-up program, rewrite operation in a specific operation environment, and the like are required, thus requiring close attention. If the user makes wrong operation, the system can no longer be started or some or all functions are no longer available in the worst case.

That is, such version-up service method is difficult for and not welcomed by end users.

For example, a function "to print an image sensed by a digital camera" in the conventional arrangement will be examined below. The user connects a digital camera and printer to the PC, and installs device drivers, applications, and the like required for these devices in a hard disk or the like in advance. The user then selects and launches a predetermined installed application or the like to temporarily download a desired image from the digital camera to a storage device such as a hard disk or the like of the PC, and inputs a print instruction after connecting the printer, thus obtaining a printout. That is, in order to implement a relatively simple function "to take and print a picture" that the user wants, the user must perform a tremendous amount of work.

FIGS. 39 and 40 are views for explaining another conventional arrangement. The conventional arrangement shown in FIGS. 39 and 40 is an example that improves convenience of the function "to print an image sensed by a digital camera", and the printer comprises a so-called direct print function.

In FIGS. 39 and 40, a memory 530 is a memory device which can be attached to a digital camera, and comprises a nonvolatile memory. An image sensed by a digital camera is saved in the memory, and when the sensed image is to be printed, the memory 530 is detached from the digital camera, and is attached to an adapter 520 or printer 540. Then, print operation is made at a control panel 521 or 541 to print out a desired image.

So-called JPEG data is used as image data saved in the memory 530, and the adapter 520 or printer 540 comprises an image processing function to print out such image data. These devices print out image information such as JPEG data while rasterizing, reducing, or enlarging it.

In order to generate print data at high speed via an image process, color process, and the like, the aforementioned device comprises a high-speed CPU, complicated hardware, and a large-size memory, resulting in high device cost. Also, since the control panel 520 or 541 has an LCD (liquid crystal display), many operation buttons, and the like, the device size increases due to an increase in physical area of the operation portion, and the operability suffers due to hard-to-see display of operation designation states and the like on a compact display such as an LCD or the like, considering the fact that the device cost increases.

In the conventional arrangement, upon printing using the printer device, the user must set the type of print medium such as a paper sheet to be used in a print process in correspondence with the output print quality of a target image he or she wants to print out. If the user makes wrong setups, a printout against his or her expectation is obtained. For example, when an ink-jet printer is used, the output print quality deteriorates due to tincture, color mixing, ink overflow, and the like.

On the other hand, print media used to output high-quality images are normally expensive, and such media may often be wasted by erroneous operations.

In the conventional arrangement, when the user takes a family photo in, e.g., a living room using a digital camera and wants to immediately print it out, he or she must go to a room where the personal computer is set, resulting in poor convenience.

SUMMARY OF THE INVENTION

The present invention has been proposed to solve the conventional problems, and has as its object to provide a home-use image processing system everyone can easily use, from which tedious processes such as installation processes and the like are excluded as much as possible.

In order to solve the above problems and to achieve the object of the present invention, an image processing system or the like according to the present invention is characterized mainly by the following arrangement.

That is, in an image processing system built by connecting a host device which reads out and executes program data stored in a storage medium, and a device added with a card device function, the device connected to the system comprises:

communication control means for controlling a communication between the host device and the device;

a card interface for connecting a card device;

card control means for controlling a card device which is detachably connectable to the card interface;

communication means for sharing device information between the host device and the card device via the card control means and the communication control means; and control means for allowing another device connected via the card device to use information shared by the communication means.

An image data processing method for processing data by exchanging information between a host device which reads out and executes program data stored in a storage medium, and a device added with a card device function, comprises:

the communication control step of controlling a communication between the host device and the device;

the step of executing a connection process to a card device via a card interface;

the card control step of controlling a card device which is detachably connectable to the card interface;

the communication step of sharing device information between the host device and the card device via processes of the card control step and the communication control step; and the control step of allowing another device connected via the card device to use information shared by a process of the communication step.

In a computer readable storage medium which stores a program module for making a computer implement an image data processing method for processing data by exchanging information between a host device which reads out and executes program data stored in a storage medium, and a device added with a card device function, the program module comprises:

a communication control module for controlling a communication between the host device and the device;

a connection process module for executing a connection process to a card device via a card interface;

a card control module for controlling a card device which is detachably connectable to the card interface;

a communication module for sharing device information between the host device and the card device via processes of the card control module and the communication control module; and a control module for allowing another device connected via the card device to use information shared by a process of the communication module.

In an image processing system built by connecting a host device which reads out and executes program data stored in a storage medium, and a device added with a card device function, the device connected to the system comprises:

communication control means for controlling a communication between the host device and the device;

a card interface for connecting a card device;

card control means for controlling a card device which is detachably connectable to the card interface;

communication means for sharing device information between the host device and the card device via the card control means and the communication control means;

control means for allowing another device connected via the card device to use information shared by the communication means; and detection means for detecting based on the information shared by the communication means if the host device can communicate with the device, and when the host device cannot communicate with the device as a result of detection, and when the card device receives a data transmission request from the other device connected to the host device, the control means saves the transmission request as error history information in storage means in the device, and when the host device can communicate with the device later, the communication means sends to the host device a message indicating that the error history information is stored in the device, and sends back the error history information to the host device in response to a request from the host device which received that message.

An image data processing method for processing data by exchanging information between a host device which reads out and executes program data stored in a storage medium, and a device added with a card device function, comprises:

the communication control step of controlling a communication between the host device and the device;

the step of executing a connection process to a card device via a card interface;

the card control step of controlling a card device which is detachably connectable to the card interface;

the communication step of sharing device information between the host device and the card device via processes of the card control step and the communication control step;

the control step of allowing another device connected via the card device to use information shared by a process of the communication step; and the detection step of detecting based on the information shared by the process of the communication step if the host device can communicate with the device, and in the control step when the host device cannot communicate with the device as a result of detection, and when the card device receives a data transmission request from the other device connected to the host device, the transmission request is saved as error history information in storage means in the device, and in the communication step when the host device can communicate with the device later, a message indicating that the error history information is saved is sent to the host device, and the error history information is sent back to the host device in response to a request from the host device which received that message.

In a computer readable storage medium which stores a program module for making a computer implement an image data processing method for processing data by exchanging information between a host device which reads out and executes program data stored in a storage medium, and a device added with a card device function, the program module comprises:

a communication control module for controlling a communication between the host device and the device;

a connection process module for executing a connection process to a card device via a card interface;

a card control module for controlling a card device which is detachably connectable to the card interface;

a communication module for sharing device information between the host device and the card device via processes of the card control module and the communication control module;

a control module for allowing another device connected via the card device to use information shared by a process of the communication module; and a detection module for detecting based on the information shared by the process of the communication module if the host device can communicate with the device, and when the host device cannot communicate with the device as a result of detection, and when the card device receives a data transmission request from the other device connected to the host device, the control module saves the transmission request as error history information in storage means in the device, and when the host device can communicate with the device later, the communication module sends to the host device a message indicating that the error history information is stored in the device, and sends back the error history information to the host device in response to a request from the host device which received that message.

In an image processing system built by connecting a host device which reads out and executes program data stored in a storage medium, and a device added with a card device function, the device connected to the system comprises:

communication control means for controlling a communication between the host device and the device;

a card interface for connecting a card device;

card control means for controlling a card device which is detachably connectable to the card interface;

communication means for sharing device information between the host device and the card device via the card control means and the communication control means; and control means for allowing another device connected via the card device to use information shared by the communication means, and when the device is in a power saving mode upon receiving a processing request from the other device connected via the card device, the control means starts a printer initial operation, and the control means sends the request information to the host device, and when a request other than the print request is received, the control means does not start the printer initial mode operation even when the device is in the power saving mode, and the communication means sends the request information to the host device.

An image data processing method for processing data by exchanging information between a host device which reads out and executes program data stored in a storage medium, and a device added with a card device function, comprises:

the communication control step of controlling a communication between the host device and the device;

the step of executing a connection process to a card device via a card interface;

the card control step of controlling a card device which is detachably connectable to the card interface;

the communication step of sharing device information between the host device and the card device via processes of the card control step and the communication control step; and the control step of allowing another device connected via the card device to use information shared by a process of the communication step, and in the communication step when the device is in a power saving mode upon receiving a processing request from the other device connected via the card device, a printer initial operation is started in the control step, and the request information is sent to the host device, and in the communication step when a request other than the print request is received, the printer initial mode operation is not started in the control step even when the device is in the power saving mode, and the request information is sent to the host device.

In a computer readable storage medium which stores a program module for making a computer implement an image data processing method for processing data by exchanging information between a host device which reads out and executes program data stored in a storage medium, and a device added with a card device function, the program module comprises:

a communication control module for controlling a communication between the host device and the device;

a connection process module for executing a connection process to a card device via a card interface;

a card control module for controlling a card device which is detachably connectable to the card interface;

a communication module for sharing device information between the host device and the card device via processes of the card control module and the communication control module; and a control module for allowing another device connected via the card device to use information shared by a process of the communication module, and when the device is in a power saving mode upon receiving a processing request from the other device connected via the card device, the control module starts a printer initial operation, and the control module sends the request information to the host device, and when a request other than the print request is received, the control module does not start the printer initial mode operation even when the device is in the power saving mode, and the communication module sends the request information to the host device.

In an image processing system built by connecting a host device which reads out and executes program data stored in a storage medium, and a device added with a card device function, the device connected to the system comprises:

communication control means for controlling a communication between the host device and the device;

a card interface for connecting a card device;

card control means for controlling a card device which is detachably connectable to the card interface;

communication means for sharing device information between the host device and the card device via the card control means and the communication control means; and control means for allowing another device connected via the card device to use information shared by the communication means, the host device comprises:

recognition means for recognizing a device connected by the communication control means; and driver detection means for automatically detecting driver software optimal to the device recognized by the recognition means, and the card control means checks compatibility between the detected driver software and the card device, and automatically updates a control program of the card device.

An image data processing method for processing data by exchanging information between a host device which reads out and executes program data stored in a storage medium, and a device added with a card device function, comprises:

the communication control step of controlling a communication between the host device and the device;

the step of executing a connection process to a card device via a card interface;

the card control step of controlling a card device which is detachably connectable to the card interface;

the communication step of sharing device information between the host device and the card device via processes of the card control step and the communication control step;

the control step of allowing another device connected via the card device to use information shared by a process of the communication step;

the recognition step of recognizing a device connected by a process of the communication control step; and the driver detection step of automatically detecting driver software optimal to the device recognized by a process of the recognition step, and a process of the control step checks compatibility between the detected driver software and the card device, and automatically updates a control program of the card device.

In a computer readable storage medium which stores a program module for making a computer implement an image data processing method for processing data by exchanging information between a host device which reads out and executes program data stored in a storage medium, and a device added with a card device function, the program module comprises:

a communication control module for controlling a communication between the host device and the device;

a connection process module for executing a connection process to a card device via a card interface;

a card control module for controlling a card device which is detachably connectable to the card interface;

a communication module for sharing device information between the host device and the card device via processes of the card control module and the communication control module;

a control module for allowing another device connected via the card device to use information shared by a process of the communication module;

a recognition module for recognizing a device connected by a process of the communication control module; and a driver detection module for automatically detecting driver software optimal to the device recognized by a process of the recognition module, and a process of the control module checks compatibility between the detected driver software and the card device, and automatically updates a control program of the card device.

In an image processing system built by connecting a host device which reads out and executes program data stored in a storage medium, and a device added with a card device function, the device connected to the system comprises:

communication control means for controlling a communication between the host device and the device;

a card interface for connecting a card device;

card control means for controlling a card device which is detachably connectable to the card interface;

communication means for sharing device information between the host device and the card device via the card control means and the communication control means;

control means for allowing another device connected via the card device to use information shared by the communication means;

means for detecting a type of device connected to the host device in accordance with the device information shared by the communication means; and means for selecting and setting a control program that is compatible with the device from storage means in accordance with the detection result, and the control means executes the control program, and controls the device to output a processing result.

An image data processing method for processing data by exchanging information between a host device which reads out and executes program data stored in a storage medium, and a device added with a card device function, comprises:

the communication control step of controlling a communication between the host device and the device;

the step of executing a connection process to a card device via a card interface;

the card control step of controlling a card device which is detachably connectable to the card interface;

the communication step of sharing device information between the host device and the card device via processes of the card control step and the communication control step;

the control step of allowing another device connected via the card device to use information shared by a process of the communication step;

the step of detecting a type of device connected to the host device in accordance with the device information shared by the process of the communication step; and the step of selecting and setting a control program that is compatible with the device from storage means in accordance with the detection result, and a process of the control step executes the control program, and controls the device to output a processing result.

In a computer readable storage medium which stores a program module for making a computer implement an image data processing method for processing data by exchanging information between a host device which reads out and executes program data stored in a storage medium, and a device added with a card device function, the program module comprises:

a communication control module for controlling a communication between the host device and the device;

a connection process module for executing a connection process to a card device via a card interface;

a card control module for controlling a card device which is detachably connectable to the card interface;

a communication module for sharing device information between the host device and the card device via processes of the card control module and the communication control module;

a control module for allowing another device connected via the card device to use information shared by a process of the communication module;

a module for detecting a type of device connected to the host device in accordance with the device information shared by the process of the communication module; and a module for selecting and setting a control program that is compatible with the device from storage means in accordance with the detection result, and a process of the control module executes the control program, and controls the device to output a processing result.

In an image processing system built by connecting a host device which reads out and executes program data stored in a storage medium, and a device which can exchange information such as image data, audio data, and the like with the host device, the device including at least a device comprising a print function, the device connected to the system comprises:

communication control means for controlling a communication between the host device and the device;

communication means for sharing device information between the host device and the card device via the communication control means;

control means for allowing another device connected to use information shared by the communication means;

means for detecting a type of device connected to the host device in accordance with the device information shared by the communication means; and means for selecting and setting a control program that is compatible with the device from storage means in accordance with the detection result, and the control means executes the control program, and controls the device to output a processing result.

An image data processing method for processing data by exchanging information between devices in an image processing system built by connecting a host device which reads out and executes program data stored in a storage medium, and a device which can exchange information such as image data, audio data, and the like with the host device, the device including at least a device comprising a print function, comprises:

the communication control step of controlling a communication between the host device and the device;

the communication step of sharing device information between the host device and the card device via a process of the communication control step;

the control step of allowing another device connected to use information shared by a process of the communication step;

the step of detecting a type of device connected to the host device in accordance with the device information shared by the process of the communication step; and the step of selecting and setting a control program that is compatible with the device from storage means in accordance with the detection result, and a process of the control step executes the control program, and controls the device to output a processing result.

In a computer readable storage medium which stores a program for making a computer implement an image data processing method for processing data by exchanging information between devices in an image processing system built by connecting a host device which reads out and executes program data stored in a storage medium, and a device which can exchange information such as image data, audio data, and the like with the host device, the device including at least a device comprising a print function, the program module comprises:

a communication control module for controlling a communication between the host device and the device;

a communication module for sharing device information between the host device and the card device via a process of the communication control module;

a control module for allowing another device connected to use information shared by a process of the communication module;

a module for detecting a type of device connected to the host device in accordance with the device information shared by the process of the communication module; and a module for selecting and setting a control program that is compatible with the device from storage means in accordance with the detection result, and a process of the control module executes the control program, and controls the device to output a processing result.

In an image processing system built by connecting a host device which reads out and executes program data stored in a storage medium, and a device added with a card device function, the device connected to the system comprises:

communication control means for controlling a communication between the host device and the device;

a card interface for connecting a card device;

card control means for controlling a card device which is detachably connectable to the card interface;

communication means for sharing device information between the host device and the card device via the card control means and the communication control means; and control means for allowing another device connected via the card device to use information shared by the communication means, and the host device comprises:

identification means for identifying for all devices connected on the basis of the device information shared by the communication means if the devices are usable; and suppression control means for, when none of devices which are used upon executing an application program can be used in accordance with an identification result of the identification means, inhibiting the application program from being launched.

An image data processing method for processing data by exchanging information between a host device which reads out and executes program data stored in a storage medium, and a device added with a card device function, comprises:

the communication control step of controlling a communication between the host device and the device;

the step of executing a connection process to a card device via a card interface;

the card control step of controlling a card device which is detachably connectable to the card interface;

the communication step of sharing device information between the host device and the card device via processes of the card control step and the communication control step;

the control step of allowing another device connected via the card device to use information shared by a process of the communication step;

the identification step of identifying for all devices connected on the basis of the device information shared by the process of the communication step if the devices are usable; and the suppression control step of inhibiting, when none of devices which are used upon executing an application program can be used in accordance with an identification result of a process of the identification step, the application program from being launched.

In a computer readable storage medium which stores a program module for making a computer implement an image data processing method for processing data by exchanging information between a host device which reads out and executes program data stored in a storage medium, and a device added with a card device function, the program module comprises:

a communication control module for controlling a communication between the host device and the device;

a connection process module for executing a connection process to a card device via a card interface;

a card control module for controlling a card device which is detachably connectable to the card interface;

a communication module for sharing device information between the host device and the card device via processes of the card control module and the communication control module;

a control module for allowing another device connected via the card device to use information shared by a process of the communication module;

an identification module for identifying for all devices connected on the basis of the device information shared by the process of the communication module if the devices are usable; and a suppression control module for, when none of devices which are used upon executing an application program can be used in accordance with an identification result of a process of the identification module, inhibiting the application program from being launched.

In an image processing system built by connecting a host device which reads out and executes program data stored in a storage medium, and a device which can exchange information such as image data, audio data, and the like with the host device, the device including at least a device comprising a print function, the device connected to the system comprises:

communication control means for controlling a communication between the host device and the device;

communication means for sharing device information between the host device and the card device via the communication control means;

control means for allowing another device connected to use information shared by the communication means, and the host device comprises:

identification means for identifying for all devices connected on the basis of the device information shared by the communication means if the devices are usable; and suppression control means for, when none of devices which are used upon executing an application program can be used in accordance with an identification result of the identification means, inhibiting the application program from being launched.

An image data processing method for processing data by exchanging information between devices in an image processing system built by connecting a host device which reads out and executes program data stored in a storage medium, and a device which can exchange information such as image data, audio data, and the like with the host device, the device including at least a device comprising a print function, comprises:

the communication control step of controlling a communication between the host device and the device;

the communication step of sharing device information between the host device and the card device via a process of the communication control step;

the control step of allowing another device connected to use information shared by a process of the communication step;

the identification step of identifying for all devices connected on the basis of the device information shared by the process of the communication step if the devices are usable; and the suppression control step of inhibiting, when none of devices which are used upon executing an application program can be used in accordance with an identification result of a process of the identification step, the application program from being launched.

In a computer readable storage medium which stores a program for making a computer implement an image data processing method for processing data by exchanging information between devices in an image processing system built by connecting a host device which reads out and executes program data stored in a storage medium, and a device which can exchange information such as image data, audio data, and the like with the host device, the device including at least a device comprising a print function, the program module comprises:

a communication control module for controlling a communication between the host device and the device;

a communication module for sharing device information between the host device and the card device via a process of the communication control module;

a control module for allowing another device connected to use information shared by a process of the communication module;

an identification module for identifying for all devices connected on the basis of the device information shared by the process of the communication module if the devices are usable; and a suppression control module for, when none of devices which are used upon executing an application program can be used in accordance with an identification result of a process of the identification module, inhibiting the application program from being launched.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view for explaining communication information of the ninth embodiment;

FIG. 31 is a table for explaining management information of the host device in the 16th embodiment;

DETAILED DESCRIPTION OF THE PREFERRED EMBODIMENTS

Preferred embodiments of the present invention will now be described in detail in accordance with the accompanying drawings.

First Embodiment

Figure 1:
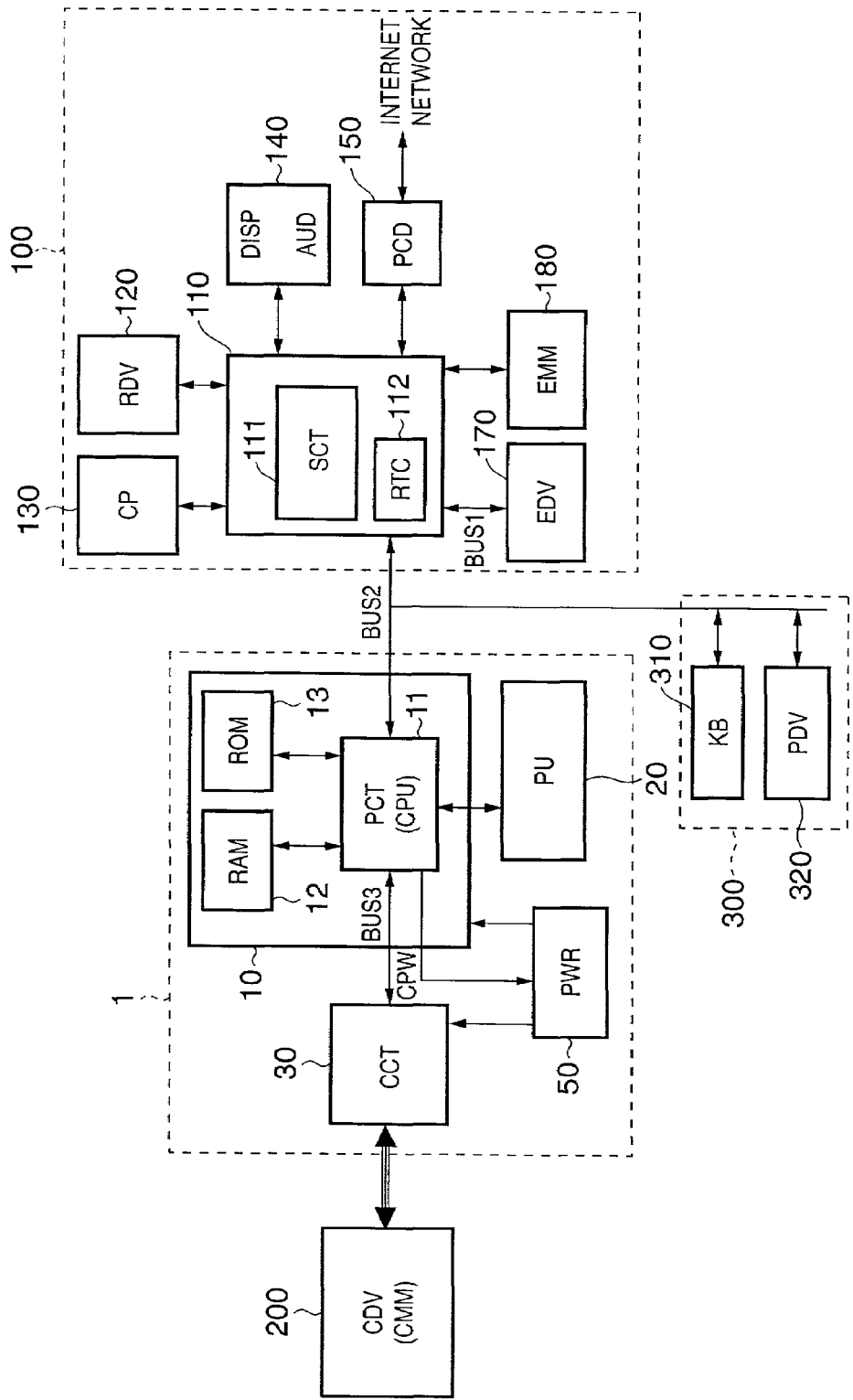
FIG. 1 is a block diagram for explaining the system arrangement of the first embodiment.

FIG. 1 is a block diagram for explaining the arrangement of an image processing system to which the present invention can be applied.

Reference numeral 100 denotes a host device; 110, a system main controller of the host device, which comprises an SCT 111 (system controller; to be described later) and an RTC 112 (real-time clock) used to generate a time stamp upon saving information such as a file or the like in a memory, a timepiece/calendar function, a print start time, and the like.

The SCT 111 (system controller) is a CPU (central processing unit) for controlling the entire system (not shown).

The system has a RAM as a storage device from/in which a desired program/data can be read out/written in response to a request from the CPU or the like, a system bus controller for controlling an address bus/data bus in the system main controller, and an interrupt controller for controlling interrupt requests from respective controllers in the system main controller.

Furthermore, the system includes a DMA (direct memory access) controller for controlling read/write of the RAM and the respective controllers at high speed without the intervention of the CPU, a timer controller which can be used by the respective controllers in the system main controllers for time control, a ROM (an electrically erasable/programmable ROM may be used instead) from which a boot-up program or the like is read out upon starting the system, and an image input/output controller for outputting desired text/image data to a DISP 140 (image input/output device) or inputting image data output on the DISP.

Moreover, the system comprises an audio input/output controller for outputting audio/music data and the like to an AUD 140 (audio input/output device) and inputting audio data from the AUD, an operation input controller for controlling an operation input from a CP 130 (control panel), a read-out controller for reading a predetermined program/data from an RDV 120 (read-only storage device) in accordance with a CPU/DMA instruction or the like, an expansion input/output controller for controlling input/output with respect to a PCD 150 (expansion unit), an external memory controller for reading/writing desired data from/in an EMM 180 (external memory), external interface controller 1 for reading/writing data from/in an EDV 170 (externally connected device) via an external interface bus BUS1, external interface controller 2 for exchanging data with a printer device 1 (to be described later) via an external interface bus BUS2, and a power supply unit for supplying electric power to the aforementioned circuits and devices.

The CP 130 (control panel) is a device used by the user to make operation inputs, and comprises cursor keys, joystick, a plurality of operation buttons, status check LEDs, and the like.

The RDV 120 (read-only storage device) can arbitrarily read out the contents of storage media such as a CD-ROM (compact disk ROM), DVD-ROM (digital video disk ROM), DVD (digital video disk), and the like in response to an instruction from the CPU or the like.

The storage media pre-store programs/data (1) to (9) required for control as needed.

(1) control programs such as device drivers, libraries, and the like
(2) application programs
(3) font (character generation) information
(4) still image information
(5) audio information
(6) moving image information
(7) dictionary information
(8) management information
(9) other kinds of information The storage media are copy-protected, and information which can be read out from a specific program such as an application, and information that can be arbitrarily read out and used by the user can be identified from each other.

In this way, copyrights of the contents of the storage media are protected. When the system main controller recognizes that the storage medium described above is inserted into the RDV 120 (read-only storage device), it reads out a device driver, library, application program, data, and the like onto the RAM, and launches a desired program.

In this embodiment, read-only storage media such as a CD-ROM and the like are adopted. For example, rewritable media such as a CD-R (write once, read many CD-ROM), CD-RW (erasable/programmable CD-ROM), and the like may be used, and the same applies to a case wherein the storage media use a mask ROM, EPROM, EEPROM, flash ROM, and the like, which comprise semiconductors. In this case, the RDV 120 (read-only storage device) can be changed in correspondence with the storage media used, and such change can be easily made by those who are skilled in the art.

With those arrangements, the need for cumbersome setup processes such as installation processes and the like can be obviated unlike in a conventional case wherein a personal computer is used, and no storage device such as a hard disk or the like is needed.

As the DISP 140 (image input/output device) for outputting desired text and image data and the AUD 140 (audio input/output device) for outputting audio and music data, for example, a home-use TV can be used. In this manner, the image processing system that shares the TV can be set in, e.g., a living room where the TV is set. When the user wants to obtain outputs with high image quality and high sound quality, the outputs can be supplied to a high image quality TV, monitor, audio amplifier, and the like. Furthermore, image data, audio data, and the like can be input from the TV or the like, and when digital communications can be made if the user has a TV which is compatible to digital broadcast services that will be available soon, information other than image and audio data can be exchanged.

The PCD 150 (expansion unit) adopts, e.g., a PCMCIA compatible expansion unit, to which a modem or network control unit for connecting the external Internet/network is attached. Of course, a built-in modem may be used in place of the PCD 150 (expansion unit). But the above-mentioned arrangement is adopted in consideration of an increase in device cost and poor versatility. For example, even when a built-in modem is adopted, a cable modem and network connection unit are required to connect a cable TV network that has increasingly spread or a TA (terminal adapter) is required to connect the ISDN. Hence, upon implementing a function of connecting the Internet, various environments/means are used depending on users.

The EMM 180 (external memory) is a storage means which can save user information or a control program and the like. In this embodiment, for example, a flash ROM (electrically erasable/ programmable ROM) as one of nonvolatile memories is adopted.

The BUS1 can be a so-called external interface bus which can make bidirectional communications to connect the EDV 170 (externally connected device). For example, in this embodiment, an IEEE1394 compatible high-speed serial bus (maximum transfer rate=400 Mbits/sec) is adopted to achieve high-speed communications with a digital home appliance connected such as a digital camera, digital video camera, or the like. Since the IEEE1394 compatible high-speed serial bus can build a star-connected network of a plurality of devices on a single external interface bus via, e.g., a hub, many devices can be connected at the same time.

The EDV 170 (externally connected device) is a digital device which can be connected to the external interface bus BUS1, and includes, e.g., a digital camera, digital video camera, digital audio device, digital video, digital tuner, personal computer, and the like.

The BUS2 can be a so-called external interface bus which can make bidirectional communications to connect the printer device 1. For example, in this embodiment, a USB compatible high-speed serial bus (maximum transfer rate=12 Mbits/sec) is adopted.

Since the USB compatible high-speed serial bus can build a star-connected network of a plurality of devices on a single external interface bus via, e.g., a hub, option devices 300 can be connected, e.g., a KB 310 (keyboard input device) used to improve input operations of text and the like, a PDV 320 (pointing device) such as a mouse/touch pad or the like used to easily instruct an input position/GUI operation selection or the like, and the like can be connected at the same time, as shown in FIG. 1.

The printer apparatus 1 of this embodiment will be explained below. The printer device 1 is constructed by a printer controller 10, a PU 20 (printer unit) as a print mechanism including a print head, convey mechanism, and the like, a CCT 30 (card controller) for controlling a CDV 200 (card device; to be described later), and a PWR 50 (power supply) for supplying electric power to the printer controller 10 and CCT 30 (card controller).

The printer controller 10 comprises a PCT 11 (printer control circuit) including a CPU (central processing unit) for controlling the entire printer device, and various logic units, the RAM 12 as a storage from/in which a desired program/data can be read out/written in response to a request from the CPU or the like, and a ROM 13 (an electrically erasable/programmable ROM may be used instead) from which a control program/data and the like required to implement interface control, print control, and the like of the entire printer device are read out.

The PCT 11 (printer control circuit) comprises a CPU that controls the operation of the whole printer device in accordance with a control program stored in the ROM13/RAM 12, a system bus controller for controlling address and data buses in the printer controller 10, an interrupt controller for controlling interrupt requests from respective controllers in the printer controller 10, a DMA (direct memory access) controller for controlling read/write of the RAM 12 and the respective controllers at high speed without the intervention of the CPU in response to requests from the respective controllers in the printer controller 10, a timer controller which can be used by the respective controllers in the printer controller 10, an external interface controller for making data communications with the host device 100 via the external interface bus BUS2, an interface controller for exchanging data with the CCT 30 (card controller; to be described later) via an interface bus BUS3, a power supply controller for controlling a power supply control signal CPW, and a print controller for controlling print operation of the PU 20 (printer unit).

The PU 20 (printer unit) is a print mechanism which comprises a print head, print head scan mechanism, print sheet convey mechanism, and the like. In this embodiment, since the PU 20 adopts, e.g., an ink-jet printer, a color image with high image quality can be printed, and a photo-quality printout can be obtained.

Of course, printers other than the ink-jet printer can be used. For example, a sublimation thermal transfer printer, color laser printer, and the like can be used.

The BUS2 can be a so-called external interface bus which can make bidirectional communications to connect the host device. For example, in this embodiment, a USB compatible high-speed serial bus (maximum transfer rate=12 Mbits/sec) is adopted.

Since the USB compatible high-speed serial bus can build a star-connected network of a plurality of devices on a single external interface bus via, e.g., a hub, the option devices 300 can be connected, e.g., the KB 310 (keyboard input device) used to improve input operations of text and the like, the PDV 320 (pointing device) such as a mouse/touch pad or the like used to easily select an input position/GUI operation selection or the like, and the like can be connected at the same time, as shown in FIG. 1. Even when these devices are connected, communications with the host device are never disturbed.

Figure 2:
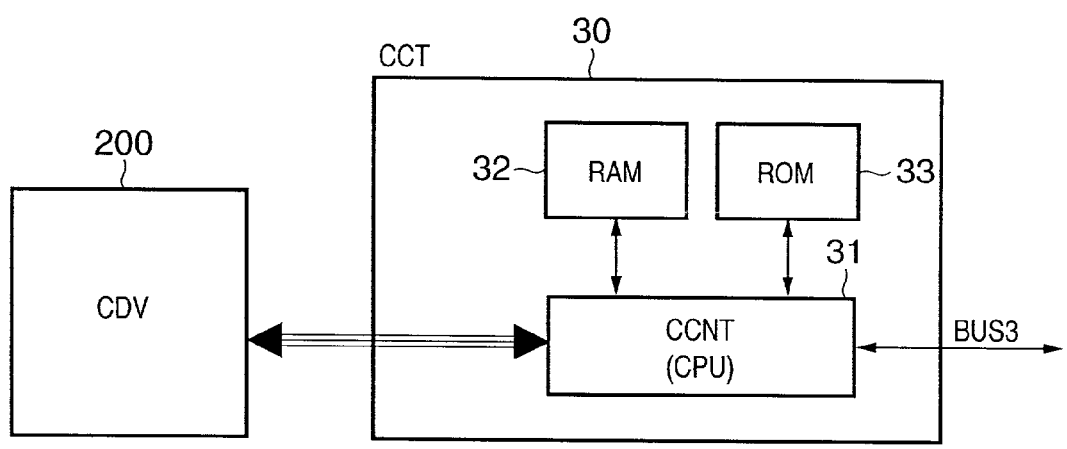
FIG. 2 is a block diagram for explaining the arrangement of a card controller.

As shown in FIG. 2, the CCT 30 (card controller) comprises a CCNT 31 (card control circuit) which includes a CPU (central processing unit) for controlling the entire CCT 30 (card controller) and various control logic units, a RAM 32 from/in which a desired program/data can be read out/written in response to a request from the CPU or the like, and a ROM 33 (an electrically erasable/programmable ROM may be used instead) from which a control program/data and the like used to implement interface control of the entire CCT 30 (card controller), various kinds of control that pertain to the CDV 200 (card device), and the like are read out.

The CCNT 31 (card control circuit) comprises a CPU for controlling the operation of the entire CCT 30 (card controller) in accordance with a control program stored in the ROM 33/RAM 32, a system bus controller for controlling address and data buses in the CCT 30 (card controller), an interrupt controller for controlling interrupt requests from respective controllers in the CCT 30 (card controller), a DMA (direct memory access) controller for controlling read/write of the RAM 32 and the respective controllers at high speed without the intervention of the CPU in response to requests from the respective controllers in the CCT 30 (card controller), a timer controller which can be used by the respective controllers in the CCT 30 (card controller), an external interface controller for making data communications with the PCT 11 (printer control circuit) via the interface bus BUS3, and a device interface controller for detecting attachment/detachment of the CDV 200 (card device), and making data exchange and control with the CDV 200 (card device).

The BUS3 can be an interface bus which can make bidirectional communications to connect the PCT 11 (printer control circuit). For example, this embodiment adopts an IEEE1284 compatible parallel interface bus of an ECP mode (maximum transfer rate=500 kbytes/sec) which allows two-way communications. The data transfer rate of this bus is lower than the aforementioned BUS1 and BUS2 but is high enough for the data size the current CDV 200 (card device) processes. Also, since the number of control logics that form the interface controller and the control program scale can be greatly reduced compared to USB and IEEE1394 mentioned above, a low-cost device can be currently constructed using IEEE1284. Of course, when high data transfer rate is required, a high-speed interface bus such as aforementioned USB, IEEE1394, or the like can be used.

The PWR 50 (power supply) controls ON/OFF of various voltage outputs in accordance with the power supply control signal CPW from the PCT 11 (printer control circuit). For example, the PCT 11 (printer control circuit) can turn on/off the power supply output to be supplied to the CCT 30 (card controller) in accordance with an instruction from CPW as needed.

The CDV 200 (card device) is a card device which is physically detachable from the printer device 1, and can undergo attachment/detachment detection, data exchange control, and the like via the CCT 30 (card controller) incorporated in the printer device 1. The card device is an expandable, compact, lightweight, portable device to which a communication means for connecting the card device and an external device, other control functions, and the like can be added in addition to a storage means CMM (card device memory) comprising a nonvolatile memory or the like.

This card device is also detachably attached to digital devices such as a digital camera, digital video camera, digital audio, personal computer, and the like, and can store/save various data such as image data, audio data, information, and the like acquired by these devices.

As described above, in the image processing system of the present invention, the aforementioned card device, the CCT 30 (card controller) and PCT 11 (printer control circuit) incorporated in the printer device 1, and the host device 1 can arbitrarily exchange data with one another.

Second Embodiment

A case will be explained below with reference to FIG. 3 wherein a communication function is added as an expansion function to the CDV 200 (card device) described in the above embodiment.

Since the arrangements of the host device 100 and printer device 1 are the same as those described with reference to FIG. 1, a detailed description thereof will be omitted.

Reference numeral 200 denotes a CDV which comprises a storage device CMM (card device memory) comprising, e.g., a nonvolatile memory or the like, and a WCT 210 (card device communication controller) which exemplifies a communication function added as an example of an expansion function, and makes wireless communications with, e.g., external communication devices 400. Note that an infrared communication (IrDA or the like), radio wave communication, and the like are available as wireless communication techniques. In this embodiment, a communication scheme (BlueTooth compatible) using a weak radio wave is adopted as the wireless communication scheme.

The external communication devices 400 are prepared as options by the user. For example, a WKB 410 (wireless keyboard input device), a WPDV 320 (wireless pointing device), and a WCP 440 (wireless control panel) are prepared in place of the aforementioned KB 310 (keyboard input device), PDV 320 (pointing device), and CP 130 (control panel), thus reducing the total number of connection cables of the entire system.

With this arrangement, since the number of connection cables is reduced upon using the image processing system in a living room in home, the appearance of the room upon using the device can be prevented from being spoiled, a sufficient operation distance can be assured between the device and user, the user never trips on the connection cord, and so forth.

A CPH 430 (cellular phone) is a mobile communication member such as a so-called portable telephone, PHS, or the like. As is well known, in at least the Japanese market, such devices have become increasingly prevalent. In addition, additional service functions such as an e-mail function, Internet function, and the like have also prevailed since most of these devices comprise character input/output means.

A wireless function (without using the public network) is provided to such device so as to allow the device to exchange data with the card device 200. For example, e-mail messages received by the CPH 430 (cellular phone) from the public network, phonebook data stored in the device, or the like are exchanged with the printer device 1 or host device 100, so that an e-mail message can be read, edited, or created on the large screen of the DISP 140 (image input/output device) connected to the host device, and such information can be saved in the CPH 430 (cellular phone) as data or can be printed by the printer device 1.

Furthermore, ten-key input operation, character input operations using a ten-key pad, and the like of the CPH 430 (cellular phone) can be used as input means of other devices such as the printer device 1, host device 100, and the like connected, or a display of the CPH 430 (cellular phone) can be used as output means of other devices such as the printer device 1, host device 100, and the like connected.

When a wireless communication function is provided to other devices in addition to the aforementioned device, data exchange with, e.g., digital home appliances and personal computer can be made via the CDV 200 (card device). In this embodiment, the wireless communication function has been exemplified. Alternatively, an expansion function such as a wired communication function, digital image sensing device function, or the like can be added to the CDV 200 (card device).

Third Embodiment

An arrangement in which the PCT 11 (printer control circuit) described in the first and second embodiments incorporates the CCNT 31 (card control circuit) will be described below with reference to FIG. 4.

Figure 3:
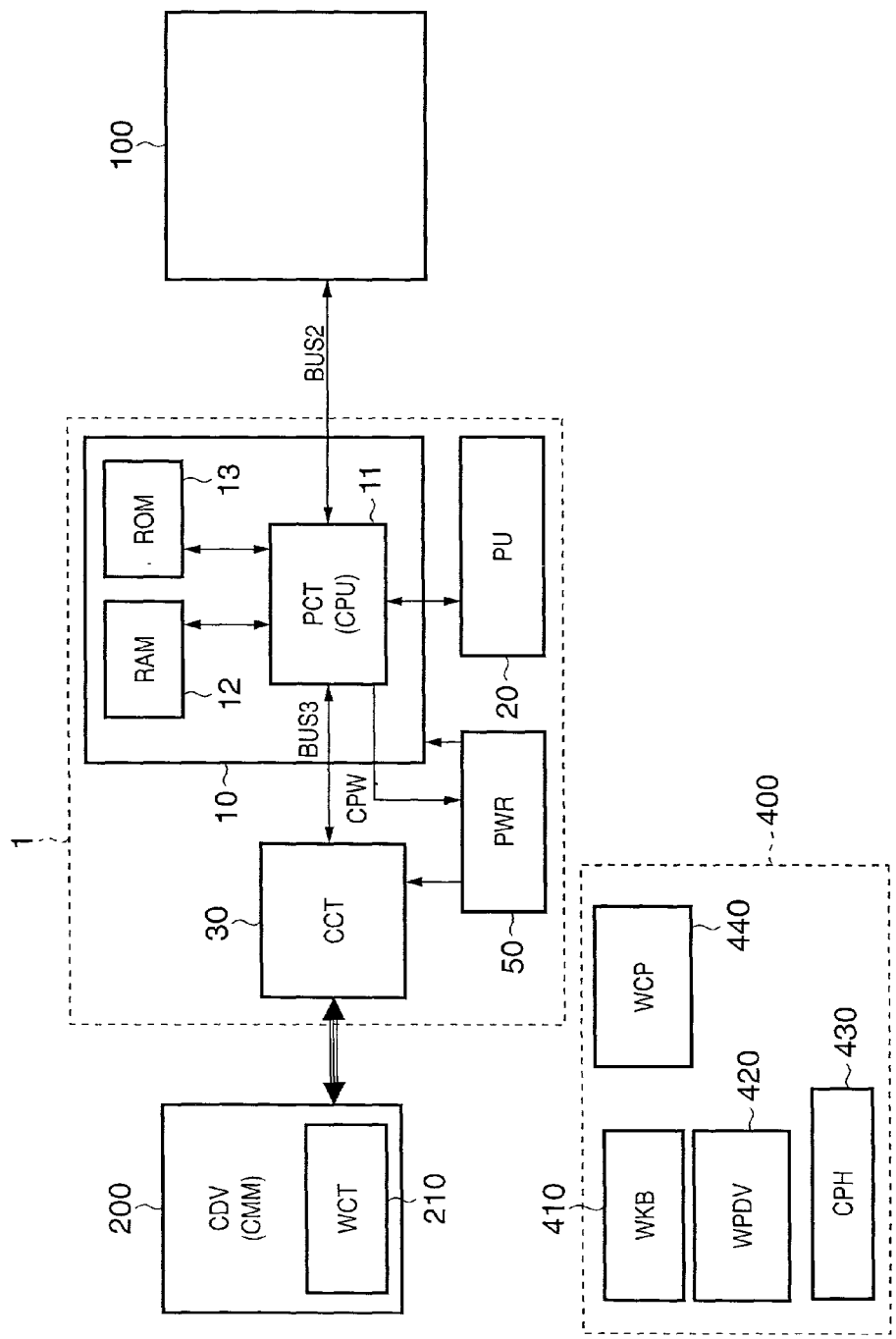
FIG. 3 is a block diagram for explaining the system arrangement of the second embodiment.

Since the arrangements of the host device 100 and CDV 200 (card device) in this embodiment are the same as those described using FIGS. 1 to 3, a detailed description thereof will be omitted.

The CCT 30 (card controller) and printer controller 10 in FIGS. 1 to 3 are connected to each other using a connector and the like, and their circuit boards can be physically separated. For this reason, the interface bus BUS3 is provided to independently receive power supply from the PWR 50 (power supply), and the two controllers are connected using a connector.

This arrangement is suitable for a case wherein the user purchases and externally connects the CCT 30 (card controller) as an option after he or she purchased the device. However, when the CCT 30 (card controller) is mounted as a standard function of the device from the beginning upon delivery, the cost increases since a connector and a power supply circuit for independently supplying electric power are required. Also, in order to allow the user to attach the CCD 30 (card controller), a portion of the housing of the printer device 1 must have a detachable mechanism, resulting in an increase in cost.

In order to solve such cost problems, in this embodiment, a control portion obtained by removing the CPU and the interface controller of the interface bus BUS3 from the CCNT 31 (card control circuit) shown in FIG. 2 is built in as a CCNT 40 (card control circuit) in the PCT 11 (printer control circuit).

Note that the PCT 11 (printer control circuit) of this embodiment is a semiconductor device which is prepared by physically forming, on a single chip, a bus control circuit that allows the CCNT 40 (card control circuit) to access the RAM 12 and ROM 13 and allows the CPU to control the CCNT 40 (card control circuit) by removing the interface controller for the interface bus BUS3.

Figure 4:
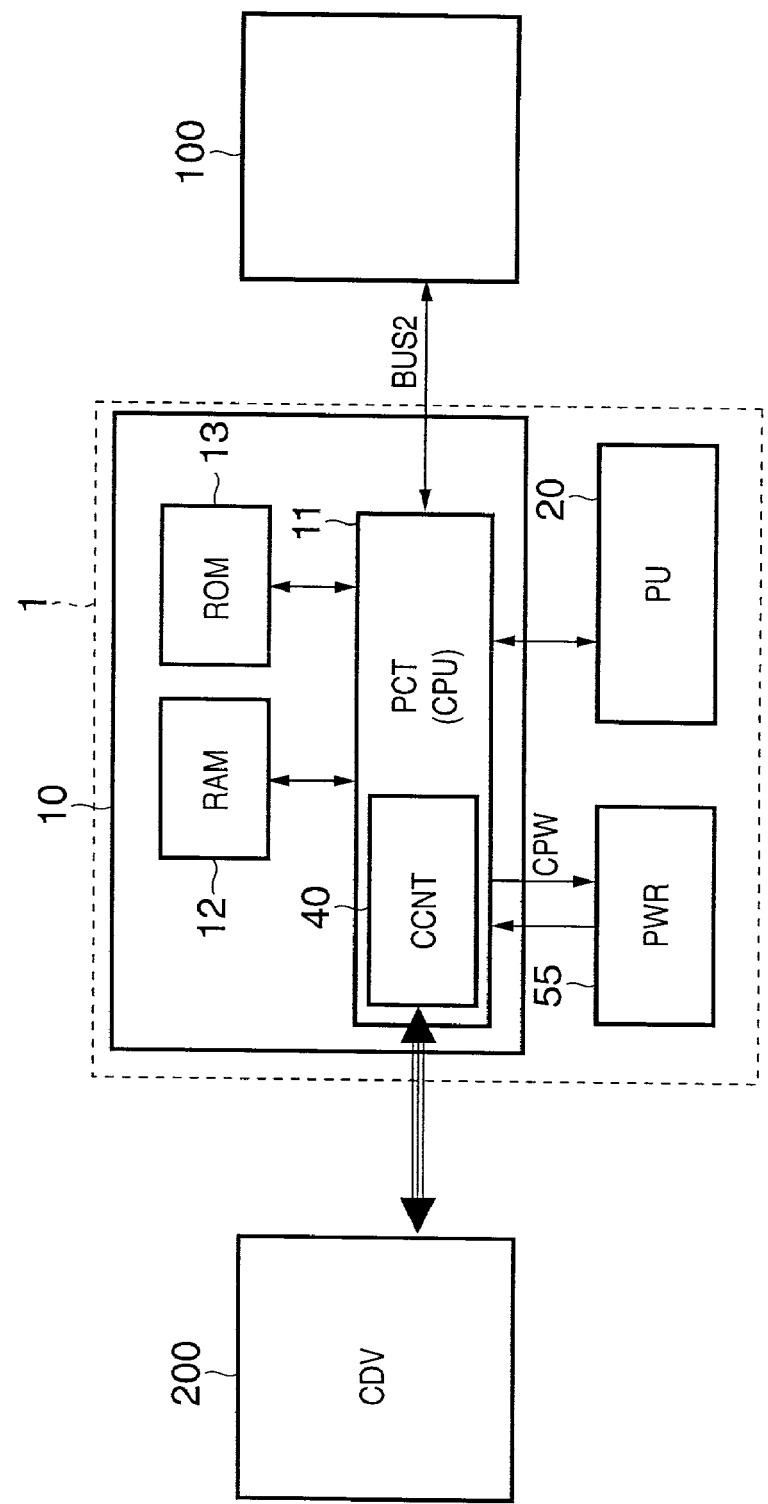
FIG. 4 is a block diagram for explaining the system arrangement of the third embodiment.

The contents of the RAM 32 and ROM 33 in the CCT 30 (card controller) described using FIG. 2 such as the control programs/data that the CCNT 31 (card control circuit) requires upon control are contained in the RAM 12 and ROM 13 in FIG. 4.

Furthermore, the aforementioned PWR 50 (power supply) has an independent power supply line to the CCT 30 (card controller). However, since the CCT is integrated in the arrangement of this embodiment, a PWR 55 (power supply) of this embodiment can reduce the number of power supply lines.

With this arrangement, since the number of components to be disposed on a control circuit board, the area required for disposing such components, and the like can be reduced, a lower-cost device can be provided.

Fourth Embodiment

An arrangement in which most of controllers in the printer controller 10 described in the third embodiment are built in the PCT 11 (printer control circuit) will be explained below with reference to FIG. 5.

Since the arrangements of the host device 100 and CDV 200 (card device) in this embodiment are the same as those described using FIGS. 1 to 4, a detailed description thereof will be omitted.

In recent years, the semiconductor technique has advanced rapidly, the wiring/gate layout in a semiconductor can be made based on, e.g., 0.25-μ rule, 0.18-μ rule, or the like, and a semiconductor circuit having a higher degree of integration than the conventional circuit can be formed. Also, storage devices such as a ROM, RAM, and the like with a relatively large capacity, which are required upon constructing a control circuit can be integrated in a single semiconductor chip.

Such semiconductor technique can be applied to the device of the present invention. FIG. 5 shows a semiconductor device, which is obtained by physically forming on a single chip, the RAM 12, ROM 13, and CCNT 40 (card control circuit) described in the third embodiment, and a bus control circuit that allows the CCNT 40 (card control circuit) to access the RAM 12 and ROM 13 and allows the CPU to control the CCNT 40 (card control circuit) by removing the interface controller for the interface bus BUS3 described in the first and second embodiments.

Furthermore, the aforementioned PWR 50 (power supply) comprises an independent power supply line to the CCT 30 (card controller). However, since the CCT is integrated in this arrangement as in the fourth embodiment, the PWR 55 (power supply) of this embodiment can reduce the number of power supply lines.

With this arrangement, since the number of components to be disposed on a control circuit board, the area required for disposing such components, and the like can be further reduced compared to the fourth embodiment, a lower-cost device can be provided.

When the ROM 13 is not suitable for integration on a single chip due to its program size or for the convenience in the manufacture, the ROM 13 is excluded, a bus signal line and the like used to access the ROM outside the chip are provided, and an external ROM 13 can be used.

Fifth Embodiment

An arrangement in which the external interface bus BUS2 of the host device 100, which is described in the first to fourth embodiments, and is used to make communications between the printer device 1 and host device 100 is removed, and the external interface bus BUS1 alone is used will be described below with reference to FIG. 6.

Figure 6:
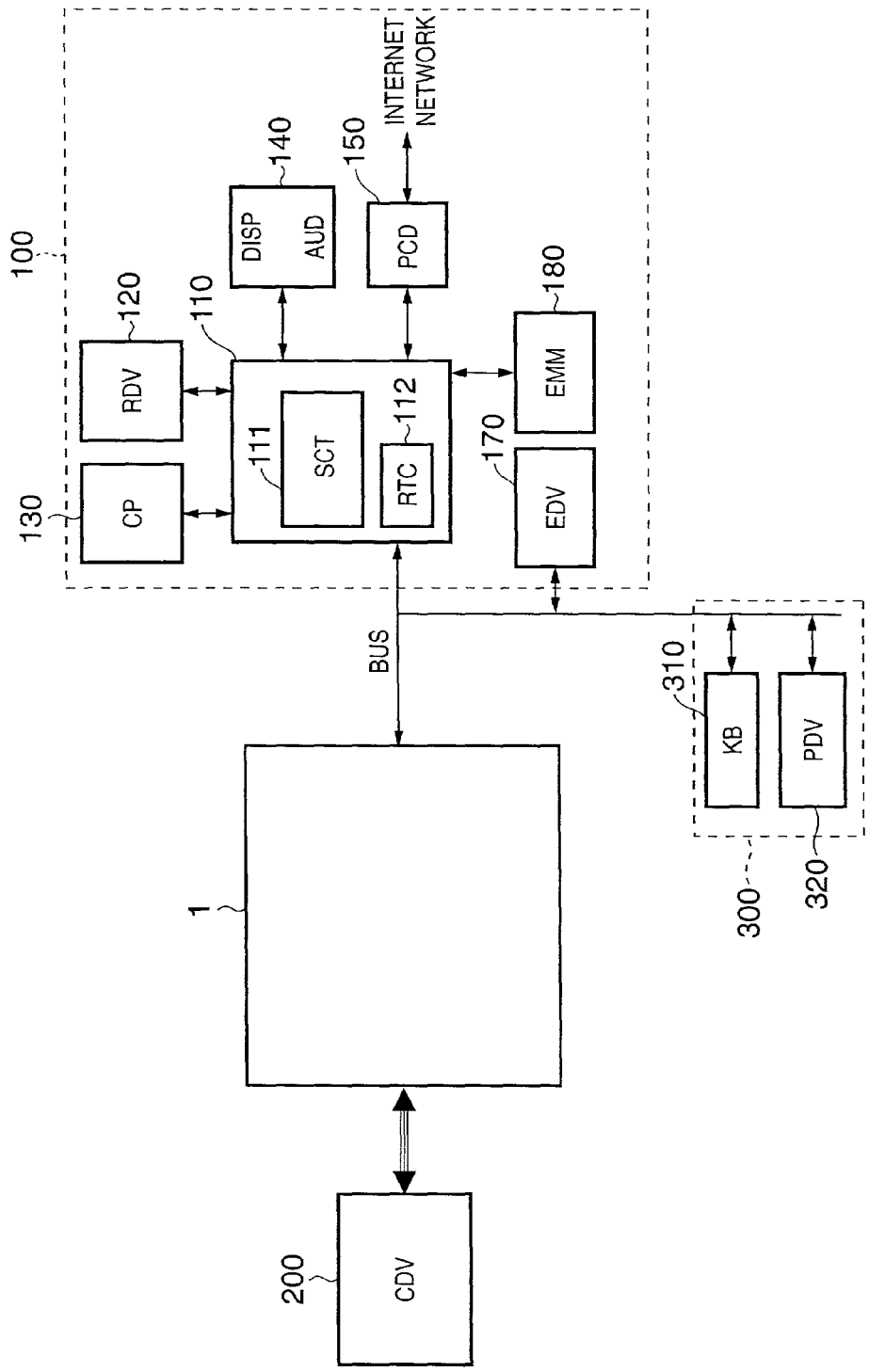
FIG. 6 is a block diagram for explaining the system arrangement of the sixth embodiment.

A BUS in FIG. 6 has the same functions as those of the BUS1, and can be a so-called external interface bus which can make bidirectional communications to connect the aforementioned EDV 170 (externally connected device). For example, this embodiment adopts an IEEE1394 compatible high-speed serial bus (maximum transfer rate=400 Mbits/sec). This bus can simultaneously connect, via a hub, the option devices 300 such as the KB 310 (keyboard input device) used to improve input operations of text and the like, a PDV 320 (pointing device) such as a mouse/touch pad or the like used to easily instruct an input position/GUI operation selection or the like, and the like, as in the BUS1.

In this embodiment, the SCT 111 (system controller) has an internal arrangement slightly different from that in the first to fourth embodiments described above.

Differences are that (1) the external interface controller 2 for controlling the external interface bus BUS2 that exchanges data with the printer device 1, option devices 300, and the like is removed, (2) the external interface controller 1 is changed to use the aforementioned external interface bus BUS1 as the BUS in FIG. 6, and to exchange data with the printer device, option devices 300, and the like in addition to data read/write with the EDV 170 (externally connected device), (3) the external interface controller that makes data communications with the host device 100 via the external interface bus BUS2 explained in the PCT 11 (printer control circuit) of the printer device 1 is replaced by an external interface controller that makes data communications with the host device 100 via the external interface bus BUS, and (4) the option devices 300 and the like are replaced by those which are compatible to the interface specification of the BUS.

Such arrangement can be applied to the image processing system of the present invention. According to the arrangement of this embodiment, since the external interface controller 2 is removed from the host device, and an interface connector and the like required to connect the BUS2 can also be removed, a cost reduction of the whole device can be achieved.

Also, for a user who need not connect a plurality of devices at the same time, since the connector of the external interface adopted in this embodiment allows easy insertion/removal, the need for even the hub can be obviated if only a required device is connected to the external interface bus BUS when necessary.

Sixth Embodiment

An arrangement in which the RTC 112 (real-time clock) which is arranged in the system main controller 110 of the host device 100 described in the first to fifth embodiments, and used to generate a time stamp upon saving information such as a file or the like in a memory, a timepiece/calendar function, and a print start time is removed will be described below.

The RTC 112 (real-time clock) comprises a secondary power supply such as a battery, and can accurately measure time even when no electric power is supplied to the host device. However, since a battery is used, it is used up sometime or other, and must be exchanged. Mainly in European countries, ecological control (e.g., the user must detach a built-in battery upon disposing a device) is projected to be applied.

As a measure to be taken against such control, a mechanical structure that allows the user to detach a battery for the RTC 112 (real-time clock) must be adopted. When the user can detach the battery, he or she may inadvertently detach the battery due to erroneous operation or the like. If the battery is detached, time information in the RTC 112 (real-time clock) may not keep accurate time.

To solve this problem, in this embodiment, since the host device 100 acquires a time casting or clock signal from a public radio wave or time information from a predetermined server which is connected to the Internet/network and keeps standard time as needed, the need for the RTC 112 (real-time clock) and its battery is obviated.

The host device 100 may acquire time information using given means at an appropriate timing, e.g., upon starting up the system (upon power ON), and may manage time using the internal timer controller, so that the time information is used by the entire system. Also, given means may occasionally acquire accurate standard time at a required timing to generate a time stamp upon saving/storing information such as a file or the like in a memory. Furthermore, time information may be acquired at the beginning of a print process and may be supplied to the printer device 1. The printer device 1 may compare this time information with the previous maintenance time to execute a cleaning process of a print head as needed.

To achieve such function, the device must be connected to the Internet or the like or to a device that can receive a public radio wave. However, since, for example, a home-use TV, a video recording/playback device, or the like normally comprises a timepiece or the like, time information can be acquired from such device.

With the arrangement of this embodiment, as described above, since the need for the RTC 112 (real-time clock) and its battery can be obviated without degrading or omitting the time management function, and the number of components and the area required for mounting these components of the host device 100 can be reduced, a cost reduction can be achieved. Also, an ecological device which can cope with the environmental problems mentioned above can be provided.

Seventh Embodiment

The communication path among the respective units described in the above embodiments will be explained below. In the arrangement shown in FIGS. 1 to 3, information exchange is made in the path of host device 100←→printer device 1←→CCT 30 (card controller)←→CDV 200 (card device). That is, (1) the host device 100 communicates with the printer device 1 via the external interface bus BUS2, (2) the printer device 1 communicates with the PCT 11 (printer control circuit) and CCT 30 (card controller) via the external interface bus BUS3, and (3) the CCT 30 (card controller) makes attachment/detachment detection, data exchange control, and communications with the device interface controller provided in the CCT 30 (card controller) and the CDV 200 (card device), thus exchanging desired data.

Figure 5:
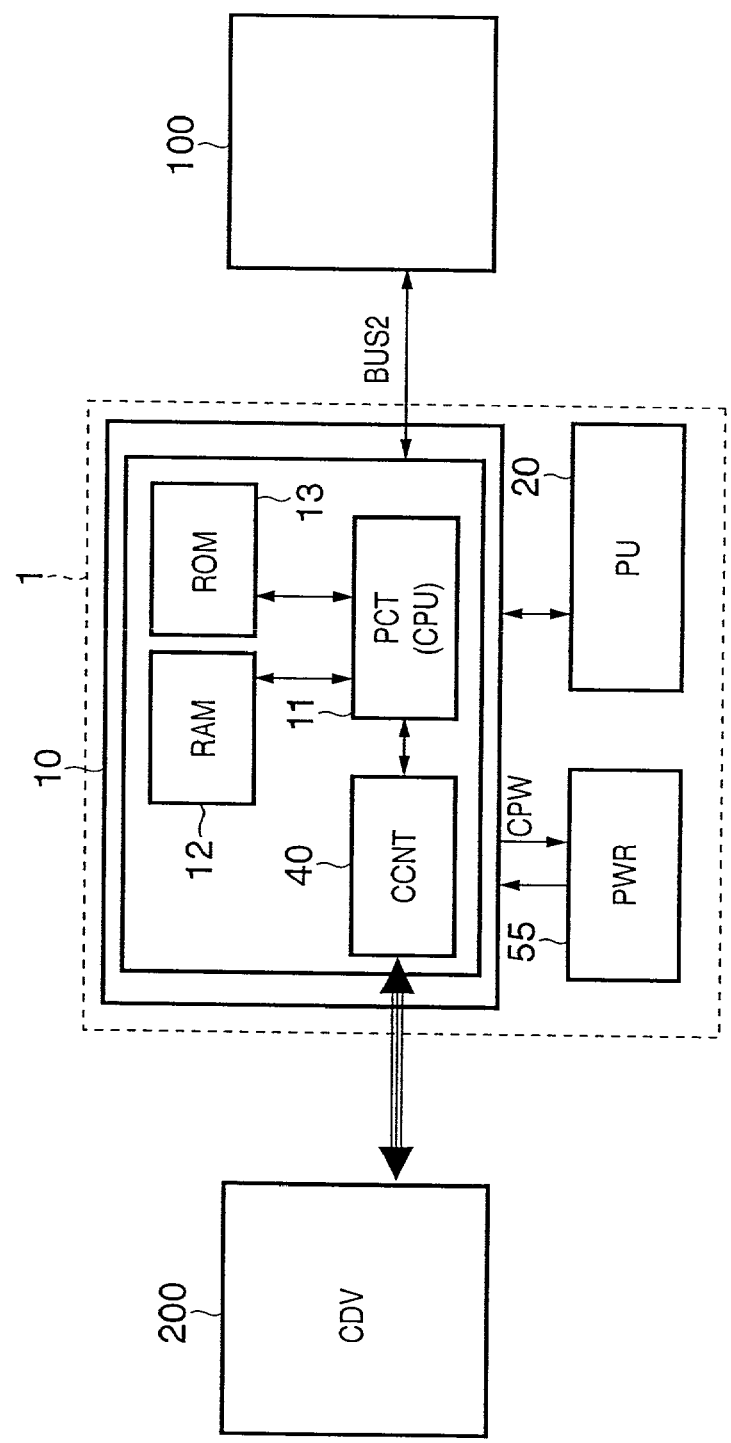
FIG. 5 is a block diagram for explaining the system arrangement of the fourth embodiment.

In the arrangement shown in FIGS. 4 and 5, information exchange is made in the path of host device 100←→printer device 1←→CCNT 40 (card control circuit) in PCT 11 (printer control circuit)←→CDV 200 (card device). That is, (4) the host device 100 communicates with the printer device 1 via the external interface bus BUS2, (5) the printer device 1 communicates with the CCNT 40 (card control circuit) via the internal bus of the PCT 11 (printer control circuit), and (6) the CCNT 40 (card control circuit) makes attachment/detachment detection, data exchange control, and communications with the CDV 200 (card device) via its internal device interface controller, thus exchanging desired data.

In the arrangement shown in FIG. 6, items (1) and (4) are replaced by "(7) the host device 100 communicates with the printer device 1 via the external interface bus BUS", and other items (2), (3), (5), and (6) remain the same.

Figure 7:
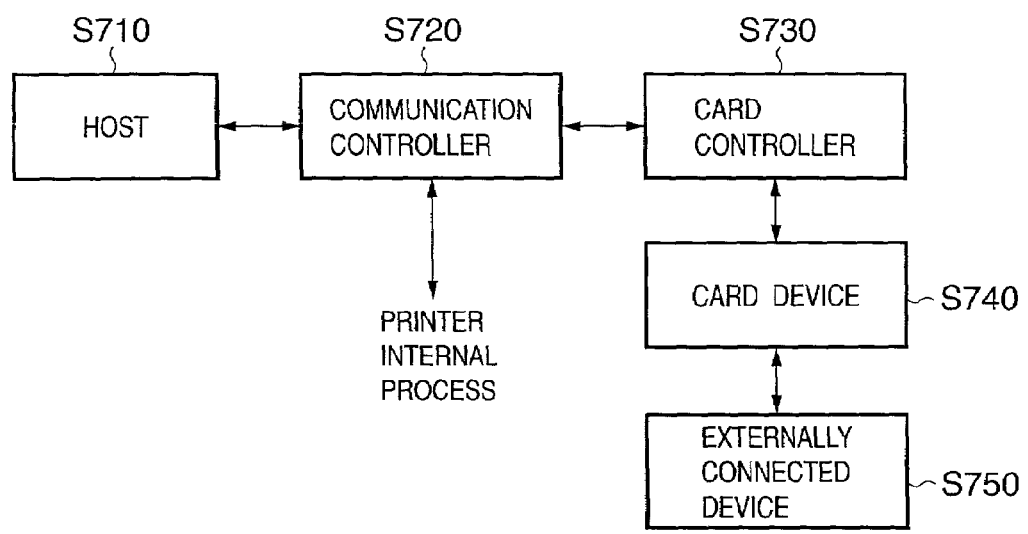
FIG. 7 is a block diagram for explaining a communication path of the seventh embodiment.

FIG. 7 is a diagram for explaining the above communication path, and arrows in FIG. 7 indicate data exchange. From the left side in FIG. 7, "Host" indicates a process in the host device 100 (S710). "Communication controller" pointed by the arrow on the right side of "Host" controls distribution of transmission/reception data in the printer device 1, and the arrow under "communication controller" indicates a process for processing received data inside the printer device 1 and printing out data upon receiving a print-related command/data (S720).

"Card Controller" pointed by the arrow on the left side of "communication controller" indicates a process in the CCT 30 (card controller) or CCNT 40 (card control circuit (S730). "Card Device" pointed by the arrow under "Card Controller" indicates a process in the CDV 200 (card device) (S740). "Externally connected device" pointed by the arrow under "Card Device" indicates a process in external communication devices 400 prepared as options by the user, as described with reference to FIG. 3 (S750). For example, this arrow indicates that information exchange can be made with the WKB 410 (wireless keyboard input device), WPDV 420 (wireless pointing device), WCP 440 (wireless control panel), CPH 430 (cellular phone), and the like via the CDV 200 (card device).

Eighth Embodiment

Figure 8:
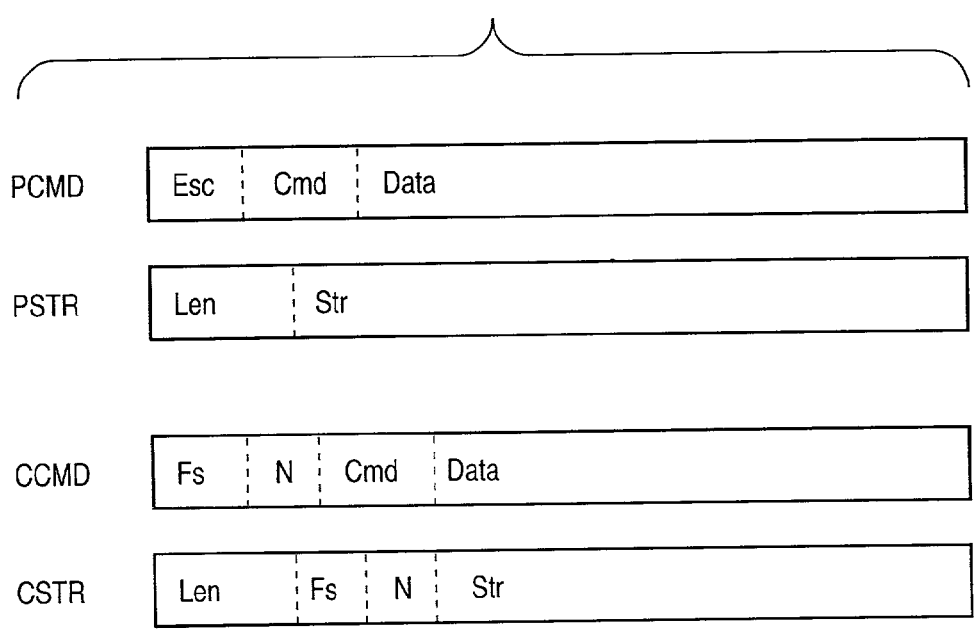
FIG. 8 is a view for explaining communication information of the eighth embodiment.

Communication information on the communication path described in the above embodiment will be explained below. FIG. 8 is a view for explaining the format of the communication information.

In this embodiment, communications are made using the packet format, and communication information can be roughly classified into four types: (1) a PCMD packet used to send a request associated with the print S function or the like to the printer device 1, (2) a PSTR packet used to send various kinds of status information associated with the print function of the printer device 1, or information such as a return value or the like associated with the print function, (3) a CCMD packet used to send a request associated with various functions of the CDV 200 (card device), and (4) a CSTR packet used to send various kinds of status information associated with the CDV 200 (card device) or transmission information such as a return value or the like.

Information in each packet will be explained below. The PCMD packet contains an expansion code "Esc" 1B (Hex) indicating a print function request at the head position. Subsequently, a variable-length character string "Cmd" which indicates a command that expresses details of the request using a predetermined character string follows. At the end of the packet, variable-length data "Data" is data associated with the command. "Data" is omitted depending on the type of command, and if data are available, data associated with the command are listed after 2-byte "length information" (not shown) indicating the information size in "Data". Note that "length information" of this embodiment expresses the number of bytes using 16 bits, in which the first byte designates lower 8 bits, and the next byte designates upper 8 bits. A "length information" value expresses the information size that follows the "length information" in the number of bytes. (PCMD packet example) Hex notation is 1B 5B 4B 02 00 41, 42, in which "Cmd" is 5B 4B, "Data" is 02 00 41 42, and "length information" indicates 2 bytes.

The PSTR packet contains "Len" which indicates the number of bytes of "Str" at the head position. Variable-length information "Str" represents various kinds of status information associated with the print function of the printer device or transmission information such as a return value or the like associated with the print value, and head information is given by characters other than "Fs" 1C (Hex).

Note that "Len" of this embodiment expresses the number of bytes using 2 bytes, in which the first byte designates lower 8 bits, and the next byte designates upper 8 bits. Furthermore, when the PSTR packet is sent back to the card device controller, the first byte value of "Len" is controlled not to assume 1C (Hex). If the first byte of "Len" assumes 1C (Hex) in association with the data length of "Str", 1 is added to "Len", and dummy NULL data is appended to the end of "Str". This is because the CCMD packet to be described below starts from an expansion code "Fs" 1C (Hex). In this way, the received data analysis process of the card device controller is facilitated.

(PSTR packet example) In Hex notation 03 00 30 31 32, "Len" is 03 00, "Str" is 30 31 32, and "Len" indicates 3 bytes.

The CCMD packet contains an expansion code "Fs" 1C (Hex) indicating a request that pertains to various functions of the CDV 200 (card device) at the head position. Then, 1-byte "N" indicating the request source follows. For example, the host device can be identified as the request source if "N"="H"; or the printer device if "N"="P". Subsequently, a variable-length character string "Cmd" which indicates a command that expresses details of the request using a predetermined character string follows. At the end of the packet, variable-length data "Data" is data associated with the command. "Data" is omitted depending on the type of command, and if data are available, data associated with the command are listed after 2-byte "length information" (not shown) indicating the information size in "Data".

Note that "length information" of this embodiment expresses the number of bytes using 16 bits, in which the first byte designates lower 8 bits, and the next byte designates upper 8 bits. A "length information" value expresses the information size that follows the "length information" in the number of bytes.

(CCMD packet example) In Hex notation 1C 48 41 31 01 00 35, "N" is 48 (the host device is the request source), "Cmd" is 41 31, "Data" is 01 00 35, and "length information" indicates 1 byte.

The CSTR packet contains 2-byte "Len" indicating the total number of bytes of "Fs", "N", and "Str" at the head position. Subsequently, an expansion code "Fs" 1C (Hex) that represents various kinds of status information associated with the CDV 200 (card device) or transmission information such as a return value or the like follows. "Fs" is followed by 1-byte "N" which indicates a destination. For example, the host device can be identified as the destination if "N"="H"; or the printer device if "N"="P". Variable-length information "Str" indicates the contents of various kinds of status information associated with the CDV 200 (card device) or transmission information such as a return value or the like.

Note that "Len" of this embodiment expresses the number of bytes using 16 bits, in which the first byte designates lower 8 bits, and the next byte designates upper 8 bits. Furthermore, the first byte of "Len" is controlled not to assume 1B (Hex). If the first byte of "Len" assumes 1B (Hex) in association with the data length of "Str", 1 is added to "Len", and dummy NULL data is appended to the end of "Str". This is because the format of the PCMD and PSTR packets uses standard specifications, and if addition of the CCMD and CSTR packets changes the specifications, the compatibility to the conventional format suffers.

(CSTR packet example) In Hex notation 05 00 1C 50 41 42 43, "Len" is 05 00, "N" is 50 (the printer device is the destination), "Str" is 41 42 43, and "Len" indicates 5 bytes.

Figure 9:
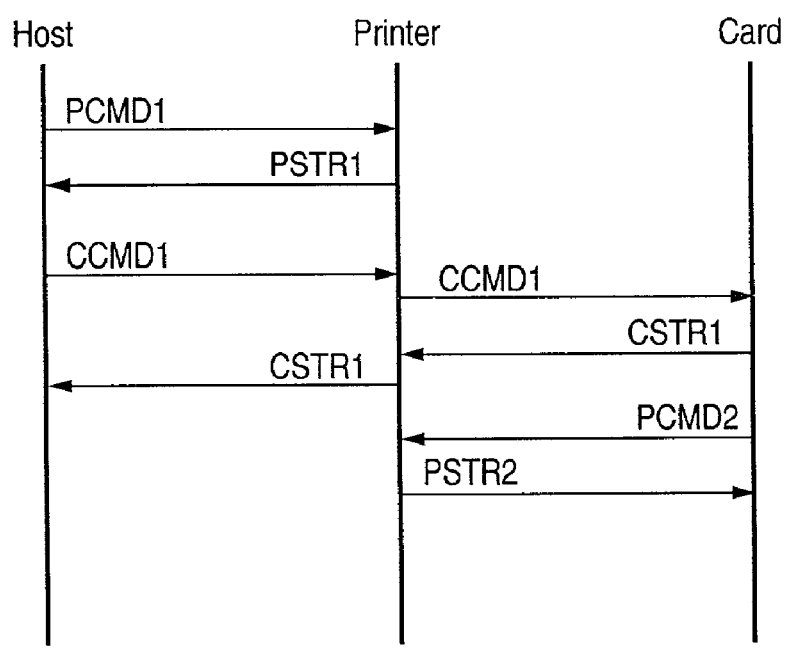
FIG. 9 is a chart for explaining an example of communication control of the eighth embodiment.

Communication control using the aforementioned packets will be explained below with reference to FIG. 9. Note that the vertical lines in FIG. 9 indicate communication points: "Host", "Printer", and "Card" respectively indicate the host device 100, the printer device 1, and the controller such as the CCT 30 (card controller) of the CDV 200 (card device) in turn from the left side.

(1) The host device requests the printer device to return status associated with the print function using PCMD1 in the PCMD packet format.

(2) Upon receiving this packet, since the head of the request packet is "Esc", the printer device interprets that the packet is a print-related request, and acquires internal status data of the printer to generate status information. The printer device sends back the status information to the host device using PSTR1 in the PSTR packet format.

(3) The host device then requests using CCMD1 in the CCMD packet format to return status associated with the card device.

(4) Upon receiving this packet, since the head of the request packet is "Fs", the printer device interprets that the request is associated with the card device, and transfers the received CCMD1 to the card device controller such as the CCT 30 (card controller) or the like via the aforementioned interface means.

(5) Since the head of the request packet is "Fs", the card device controller interprets that packet, and acquires the attachment state of the CDV 200 (card device), status data of the card device, internal status data of the card controller, and the like to generate status information in response to the request from the host device. The card device controller copies the "N" identifier in the received packet CCMD1 to that in CSTR1 to be sent back so as to return status information of the host device as the request source using CSTR1 in the CSTR packet format, and sends the CSTR1 packet to the printer device.

(6) Since the "N" identifier in CSTR1 sent from the card device controller is "H", the printer device transfers the CSTR1 packet to the host device. In this way, the host device can acquire status information from the card device controller via the printer device.

(7) The card device controller requests using PCMD2 in the PCMD packet format the printer device to return status associated with the print function.

(8) Upon receiving this packet, since the head of the request packet is "Esc", the printer device interprets that the packet is a print-related request, and acquires internal status data of the printer to generate status information. Since the request is received from the card device controller using PCMD2, the printer device sends back status information to the card device controller using PSTR2 in the PSTR packet format.

With the aforementioned communication control, the host device can smoothly exchange data with the card device via the printer device.

Ninth Embodiment

In the above embodiment, the communication control at three communication points has been explained. In such control method, as described in FIG. 9, when the communication point as the request source requires a reply from the request destination, the request source must wait until the reply returns from the request destination. If only the sequential communication control shown in FIG. 9 is used, when the communication control speed or the like among devices is high enough even by making control for exclusively using communications via the external interface bus BUS2 and communications via the interface bus BUS3 or the internal bus to the card control circuit CCNT in the arrangement described using FIGS. 1 to 6, the arrangement of the eighth embodiment suffices, thus simplifying the internal control circuit arrangement of the printer.

Even when the communication control speed must be increased, if the number of communication points is as small as three, an increase in communication control speed can be attained by controlling order management, packet type discrimination, and the like for intercommunications among devices without executing the aforementioned exclusive control.

However, in order to exchange information even with the external communication devices 400 (FIG. 3) which are prepared by the user as options and include, e.g., the WKB 410 (wireless keyboard input device), WPDV 420 (wireless pointing device), WCP 440 (wireless control panel), CPH 430 (cellular phone), and the like via the CDV 200 (card device), and to systematically use these devices on the system arrangement of the present invention, difficulties in order management, packet type discrimination, and the like for intercommunications among devices, and a low communication control speed are posed as technical problems. In this embodiment, a control method that allows smooth communication control among devices even when a large number of devices are connected will be explained below.

Figure 10:
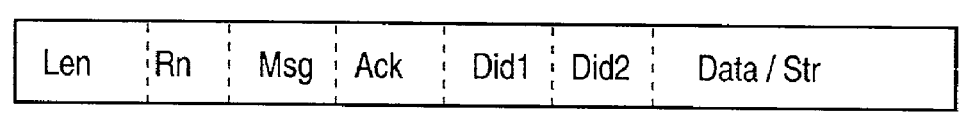

FIG. 10 is a view for explaining a packet used to communicate with devices connected in this embodiment. This packet is formed by seven fields, and functional purposes of these fields will be explained below. Note that fields "Len" to "Did2" have fixed lengths, and are indispensable in all request/reply messages.

(1) The field "Len" indicates the data length of the subsequent fields "Rn" to "Data/Str", and in this embodiment, the data length is expressed by the number of bytes using a 16-bit absolute value.

(2) The field "Rn" stores an identifier that the request source can use as needed, and this field can designate a request number. In this embodiment, the request number is expressed by 8 bits. If the value in this field is 0, it indicates that no request number is used; if the value ranges from 1 to 255, it can be used as the request number. Using the request number, the order of replies to requests can be managed.

(3) The field "Msg" is an identifier that roughly classifies the functions of request messages, and has meanings in Table 1 below. In this embodiment, the identifier is expressed by an 8-bit absolute value.

TABLE 1

Msg Field

| Name | Value | Request Function |
|---|---|---|
| MsgPacketSize | 0 | Packet size message |
| MsgDevConfig | 1 | Read out device configuration information |
| MsgDevStatus | 2 | Read out device status |
| MsgUI | 3 | UI control |
| MsgFile | 4 | File operation |
| MsgPrint | 5 | Print function |
| MsgPrintText | 6 | Simple print function |
| MsgCommand | 7 | Expansion command |
| . . . | . . . | . . . |
| Msgxxx | nnn | . . . |

In Table 1, ① "MsgPacketSize" is a request with which the request source makes the request destination confirm if it can receive a given message packet size before the source sends a packet with that size.

② "MsgDevConfig" requests to return Config information (device configuration information) in Table 4 to be described later.

③ "MsgDevStatus" requests to return Status information (device status information) in Table 5 to be described later, and can designate required detailed status items in the field "Data" using a character string in a list format of parameters which are specified by predetermined reserved words.

④ "MsgUI" requests a function that pertains to UI (user interface (operation)) resources together with a UI control command in Table 6 (to be described later) in the field "Data".

⑤ "MsgFile" requests a function that pertains to file operation together with a File control command in Table 8 (to be described later) in the field "Data".

⑥ "MsgPrint" requests all print-related functions.

⑦ "MsgPrintText" requests a function that pertains to a simple print process that can be done by the printer device alone without the intervention of the host device.

⑧ "MsgCommand" requests a function that pertains to expansion commands except for those described above.

(4) The field "Ack" contains information used to inform the presence/absence of a reply to a request message or OK/NG discrimination in a reply message, as shown in Table 2 below, and in this embodiment, information is expressed by an 8-bit absolute value.

TABLE 2

Ack Field

| Name | Value | Request Function |
|---|---|---|
| AckNoReply | 0 | Reply not required |
| AckWaitReply | 1 | Reply required |
| AckReplyOk | 2 | Reply message OK |
| AckReplyNg | 3 | Reply message NG |
| . . . | . . . | . . . |
| Ackxxx | Nnn | . . . |

In Table 2, ① "AckNoReply" instructs that no reply to a request message is required.

② "AckWaitReply" instructs that a reply to a request message is required.

③ "AckReplyOk" expresses return of a reply message to a message which is instructed by "AckWaitReply".

④ "AckReplyNg" expresses a state wherein a reply message to a message which is instructed by "AckWaitReply" cannot be returned, or some error has occurred with respect to a request message. Also, AckNoReply and AckWaitReply indicate request messages, and AckReplyok and AckReplyNg are reply messages.

(5) The field "Did1" expresses the device type of the request source, and in this embodiment, the device type is represented by an 8-bit absolute value. See Table 3 for device types.

(6) The field "Did2" expresses the device type of the request destination, and in this embodiment, the device type is represented by an 8-bit absolute value. See Table 3 for device types. Note that a reply message is returned from a device indicated by Did2 to a device indicated by Did1. In such case, the contents of Did1 and Did2 are not replaced.

TABLE 3

Device Type (Did1/Did2 Field)

| Name | Value | Target Device |
|---|---|---|
| DevSys | 0 | Host device 100 |
| DevPrt | 1 | Printer Device 1 |
| DevCct | 2 | Card controller CCT 30 |
| DevCp | 3 | Control panel CP 130 |
| DevDisp | 4 | Image input/output device DISP 140 |
| DevAud | 5 | Audio input/output device AUD 140 |
| DevEmm | 6 | External memory EMM 180 |
| DevKb | 7 | Keyboard input device KB 310 |
| DevPdv | 8 | Pointing device input device PDV 320 |
| DevWkb | 9 | Wireless keyboard WKB 410 |
| DevWpdv | 10 | Wireless pointing device WPDV 420 |
| DevWcp | 11 | Wireless control panel WCP 440 |
| DevDscm | 12 | Digital camera |
| DevDvcm | 13 | Digital video camera |
| DevDaud | 14 | Digital audio |
| DevCph | 15 | Cellular phone CPH 430 |
| DevCdv | 16 | Card device CDV 200 |
| DevCmm | 17 | Card device memory |
| ... | ... | ... |
| Devxxx | nnn | ... |

Intercommunications can be made among devices listed in Table 3, and the numbers for identifying device types are assigned for respective devices.

Note that the aforementioned devices themselves need not always physically comprise the aforementioned control means. For example, devices, which are directly connected to the host device 100 alone and cannot directly communicate with other devices in the arrangement described using FIGS. 1 to 6, e.g., DevCp (control panel CP 130), DevDisp (image input/output device DISP 140), DevAud (audio input/output device AUD 140), DevEmm (external memory EMM 180), need not individually comprise the communication control circuit and control means of the present invention. Those devices need only be controlled by the host device 100 by emulation or the like implemented by the control program or the like of the host device 100, so that these devices can be seen from externally connected devices upon communication control.

In this way, a cost reduction of the entire device can be achieved. Likewise, the printer device 1 can alternately execute communication control of devices such as DevCct (card controller CCT 30), DevCdv (card device CDV 200), DevCmm (card device memory), and the like. Of course, the aforementioned communication control means may be prepared in the card controller CCT 30 to execute communication control of devices such as DevCdv (card device CDV 200), DevCmm (card device memory), and the like. Also, the printer device 1, DevCct (card controller CCT 30), or DevCdv (card device CDV 200) can execute communication control of external devices such as DevWkb (wireless keyboard WKB 410), DevWpdv (wireless pointing device WPDV 420), DevWcp (wireless control panel WCP 440), and the like.

(7) The field "Data/Str" contains variable-length data used to exchange a detailed function instruction associated with a function instructed in the Msg field or additional information such as status information or the like. This field serves as a Data field that designates a parameter of a detailed command or the like of the request function in a request message, and as an Str field that returns a parameter such as a return value to a request in a reply message.

For example, ① when the Msg field indicates the MsgPacketSize request, this field instructs the packet size value.

② A reply message to the MsgDevConfig request returns Config information in Table 4 below.

③ A reply message to the MsgDevStatus request returns Status information in Table 5 below.

④ When the Msg field indicates the MsgUI request, this field instructs a UI control command in Table 6 below, and UI information or the like in Table 7 below as needed.

⑤ A reply message to the MsgUI returns UI information or the like in Table 7 below.

⑥ When the Msg field indicates the MsgFile request, this field instructs a File control command in Table 8 below, and the file name/write data or the like as needed.

⑦ A reply message to the MsgFile request returns a File control command in Table 8 below, and the file name/read data or the like as needed.

⑧ When the Msg field indicates the MsgPrint request, this field instructs print control information.

⑨ When the Msg field indicates the MsgPrintText request, this field instructs simple print control information.

⑩ When the Msg field indicates the MsgCommand request, this field instructs expansion function control information.

TABLE 4

Config Information

Device information
Device name
Device genre information
Device basic function information
Device function specification information
Device control version information
Device control ROM information
Device communication control information
...

The contents shown in Table 4 are stored in a ROM/RAM as storage means for respective devices, and form an information set used to inform another device of the device confirmation. ① "Device information" indicates a device type, and is 8-bit numerical value information corresponding to the device type in Table 3.

② "Device name" is character string information which expresses the device type and ends with NULL 00 (Hex), and can designate a maximum of 255 characters.

③ "Device genre information" is a 16-bit identification code that identifies the device genre, and is used to identify genres such as a printer device, digital home appliance, and the like.

④ "Device basic function information" is 16-bit flag information which identifies basic functions that the device can provide. One basic function is assigned to one bit position, and the presence/absence of that basic function is indicated by a bit value (1/0) at that position. For example, this information can be used to identify the presence/absence of basic functions such as a print function, file function, wireless function, and the like.

⑤ "Device function specification information" is 16-bit flag information which indicates function specifications associated with basic functions with bit values "1" in the "device basic function information", and flag information is assigned to each basic function. For example, when a given device has a print function, this information can be used to identify if a color print function, ink remaining amount detection function, and the like are available.

⑥ "Device control version information" is a 16-bit identification code which indicates the version of a control program in the device.

⑦ "Device control ROM information is a 32-bit identification code, which includes information indicating if the control program in the device is rewritable, the type of storage medium, storage medium size, the number of rewrite times, and the like.

⑧ "Device communication control information" is a 32-bit identification code, which represents the external interface type of the device, interface specification version information of each type, and interface performance such as the maximum transfer rate and the like.

TABLE 5

Status Information

Basic status information
Detailed status information
Error history information
. . .

The contents shown in Table 5 are stored in a RAM as storage means for each device, and form an information set which informs another device of device status. ① "Basic status information" is 16-bit flag information that identifies basic device status. A status item is assigned to each bit, and basic status is indicated by a bit value (1/0) at that position. For example, in case of the printer device, this information can be used to identify basic status, e.g., if the printer is ready or busy, if any errors have occurred, if detailed status information is present, if error history information is present, and so forth.

② "Detailed status information" is character string information which expresses requested detailed device status by a character string in the list format and ends with NULL 00 (Hex), and can designate a maximum of 255 characters. When the information size exceeds 255 characters, this information is sent back while being segmented into a plurality of reply packets.

③ "Error history information" is character string information which expresses error history information, if it is available, by a character string in the list format and ends with NULL 00 (Hex), and can designate a maximum of 255 characters. When the information size exceeds 255 characters, this information is sent back while being segmented into a plurality of reply packets.

TABLE 6

UI Control Command

| Name | Value | Request Function |
|---|---|---|
| UiConfig | 0 | Read out UI configuration |
| UiSelect | 1 | Reserve UI to be used |

TABLE 6-continued

UI Control Command

| Name | Value | Request Function |
|---|---|---|
| UiRead | 3 | Inform UI input information in use |
| UiWrite | 4 | Inform UI output information in use |

Table 6 summarizes UI control commands each of which instructs a detailed function of a UI control request when the contents of the Msg field are MsgUI, and this command is set at the head of the Data field. ① The "UiConfig" command requests to return configuration information of input operation/display output resources of the user interface (UI). In this case, after the UiConfig command, a resource item (input operation/display output) to be acquired is designated in the Data field using a character string in the list format of parameters specified by predetermined reserved words or the like. In case of a reply message, after the UiConfig command, a UI information item in Table 7 below is returned in the Str field using a character string in the list format of parameters specified by predetermined reserved words or the like.

② The "UiSelect" command requests use (reservation) of user interface resources. In this case, after the UiSelect command, a user request item of an input operation/display output resource to be used is designated in the Data field using a character string in the list format of parameters specified by predetermined reserved words or the like. Also, an event message that automatically informs detection of input operation, use of which has been reserved by the parameters, can also be designated. Upon detection of input operation, a reply message containing the UiRead command is returned.

③ The "UiRead" command requests to return input operation resource status designated in advance by the UiSelect command. In this case, after the UiRead command, a detection request item of a target input operation resource can be designated in the Data field using a character string in the list format of parameters specified by predetermined reserved words or the like. Also, upon detection of input operation, the event message of which has been designated by the UiSelect command, this reply message is sent back.

④ The "UiWrite" command requests a display output operation resource designated in advance by the UiSelect command to make desired display. In this case, after the UiWrite command, an output item to a display output resource to be used (information such as ON/OFF/flickering, and flickering period if the target resource is an LED indicator; buzzing frequency/buzzing start•stop/buzzing duration, the number of times, rhythm, and the like if the target resource is a buzzer•; audio output item/audio data, and the like if the target resource is an audio output; or display item/display character string, code page, color, size, and the like if the target resource is a text display) is designated in the Data field using a character string in the list format of parameters specified by predetermined reserved words or the like acquired by the UiConfig command.

TABLE 7

UI Information

UI input resource information
UI output resource information
. . .

Table 7 summarizes the configuration information of input operation/display output resources requested by the Msg field=MsgUI and the UiConfig command, and is stored in a ROM/RAM as storage means for each device. ① "UI input resource information" is information of input operation resources of a given device. This information expresses the input operation function type such as operation buttons, a keyboard, a ten-key pad, cursor keys, a joystick, or the like, various kinds of detectable operation event type information such as button input operation, key input operation, button depression, button release, key inputs, and the like of each of cursor keys, and the like, and usable conditions of each input resource indicating if that resource can be used, can be occupied, can be shared, and so forth, using a character string in the list format of parameters specified by predetermined reserved words.

② "UI output resource information" is the configuration information of display and audio output resources of a given device, that are associated with operation. This information expresses information of items that can be instructed (e.g., ON/OFF/flickering, and flickering period if the output resource is an LED indicator; buzzing frequency/buzzing start•stop/buzzing duration, the number of times, rhythm, and the like if the output resource is a buzzer•; audio output item/audio data, and the like if the output resource is an audio output; or display item/display character string, code page, color, size, and the like if the output resource is a text display), and usable conditions of each output resource indicating if that resource can be used, can be occupied, can be shared, and so forth, using a character string in the list format of parameters specified by predetermined reserved words.

TABLE 8

File Control Command

| Name | Value | Request Function |
|---|---|---|
| FileInfo | 0 | File information |
| FileOpen | 1 | Open file |
| FileClose | 2 | Close file |
| FileCreate | 3 | Create new file |
| FileDelete | 4 | Delete file |
| FileSeek | 5 | Change file operation position |
| FileRead | 6 | Read out file |
| FileWrite | 7 | Write file |
| FileFormat | 8 | Format |
| ... | ... | ... |
| Filexxx | Nnn | ... |

Table 8 summarizes File control commands each of which instructs the detailed function of a file operation request when the contents of the Msg field indicate MsgFile, and this command is set at the head of the Data field. ① The "FileInfo" command is a reply request of file information associated with File operation. After the FileInfo command, a request information item is designated in the Data field using a character string in the list format of parameters specified by predetermined reserved words or the like. In case of a reply message, after the FileInfo command, file information (e.g., file directory information), file attribute information of designated file information or the like (e.g., file name, data type, file size, modification information (read only, erase permitted/inhibited, copy permitted/inhibited, the presence/absence of visibility from the user, the presence/absence of password protection, and the like), free space size, and the like) are returned in the Str field using a character string in the list format of parameters specified by predetermined reserved words in correspondence with a request item.

② The "FileOpen" command requests to open a file prior to read/write access of a desired file. After the FileOpen command, the file name to be opened, password information, and the like are designated in the Data field using a character string in the list format of parameters specified by predetermined reserved words. In case of a reply message, after the FileOpen Command, a 16-bit value (if the value is more than 0, it indicates successful file open operation; if it is 0, it indicates unsuccessful file open operation) indicating the file handle number used to access the opened file, a 32-bit value indicating a file access position (file pointer), and target file attribute information (e.g., file name, data type, file size, modification information (read only, erase permitted/inhibited, copy permitted/inhibited, the presence/absence of visibility from the user, the presence/absence of password protection, and the like), free space size, and the like) are returned in the Str field using a character string in the list format of parameters specified by predetermined reserved words.

③ The "FileClose" command requests to close a file upon completion of read/write access of desired file contents. After the FileClose command, a 16-bit value indicating the file handle number to be closed is designated in the Data field. In case of a reply message, after the FileClose command, a 16-bit value indicating the requested file handle number, success/failure information of file close operation, and target file attribute information (e.g., file name, data type, file size, modification information (read only, erase permitted/inhibited, copy permitted/inhibited, the presence/absence of visibility from the user, the presence/absence of password protection, and the like), free space size, and the like) are returned in the Str field using a character string in the list format of parameters specified by predetermined reserved words.

④ The "FileCreate" command requests to create a new file prior to read/write access of a desired new file. After the FileCreate command, the file name to be created, data type, modification information, password information, and the like are designated in the Data field using a character string in the list format of parameters specified by predetermined reserved words. In case of a reply message, after the FileCreate command, a 16-bit value (if the value is more than 0, it indicates successful file open operation; if it is 0, it indicates unsuccessful file open operation) indicating the file handle number used to access the opened file, and target file attribute information (e.g., file name, data type, file size, modification information (read only, erase permitted/inhibited, copy permitted/inhibited, the presence/absence of visibility from the user, the presence/absence of password protection, and the like), free space size, and the like) are returned in the Str field using a character string in the list format of parameters specified by predetermined reserved words.

⑤ The "FileDelete" command requests to delete a desired file. After the FileDelete command, the file name to be deleted, password information, and the like are designated in the Data field using a character string in the list format of parameters specified by predetermined reserved words. In case of a reply message, success/failure information of file delete operation, and target file attribute information (e.g., file name, data type, file size, modification information (read only, erase permitted/inhibited, copy permitted/inhibited, the presence/absence of visibility from the user, the presence/absence of password protection, and the like), free space size, and the like) are returned in the Str field using a character string in the list format of parameters specified by predetermined reserved words.

⑥ The "FileSeek" command requests to designate the read/write position (file pointer) of a desired file. After the FileSeek Command, a 16-bit value indicating the file handle number to be accessed, and a 32-bit value indicating the target file access position (file pointer) are designated in the Data field. In case of a reply message, after the FileSeek command, a 16-bit value indicating the requested file handle number, a 32-bit value indicating the updated file access position (file pointer), success/failure information of requested access, and target file attribute information (e.g., file name, data type, file size, modification information (read only, erase permitted/inhibited, copy permitted/inhibited, the presence/absence of visibility from the user, the presence/absence of password protection, and the like), free space size, and the like) are returned in the Str field using a character string in the list format of parameters specified by predetermined reserved words.

⑦ The "FileRead" command requests to read out from a desired file. After the FileRead command, a 16-bit value indicating the file handle number to be accessed, and a 16-bit value indicating the target read size are designated in the Data field. In case of a reply message, after the FileRead command, a 16-bit value indicating the requested file handle number, a 32-bit value indicating the updated file access position (file pointer), and a 16-bit value indicating the actual read size are returned in the Str field.

⑧ The "FileWrite" command is a write request in a desired file. After the FileWrite command, a 16-bit value indicating the file handle number to be accessed, a 16-bit value indicating the target write size, and data to be written in the file are designated in the Data field. In case of a reply command, a 16-bit value indicating the requested file handle number, a 32-bit value indicating the updated file access position (file pointer), and a 16-bit value indicating the actual write completion size are returned in the Str field.

⑨ The "FileFormat" command requests to initialize (completely erase) the file system of a device. After the FileFormat command, the volume name, password, and the like are designated in the Data field using a character string in a list format of parameters specified by predetermined reserved words or the like. In case of a reply message, after the FileFormat command, success/failure information of file format, the created volume name, free space size information, and the like are returned in the Str field using a character string in the list format of parameters specified by predetermined reserved words or the like.

Figure 11:
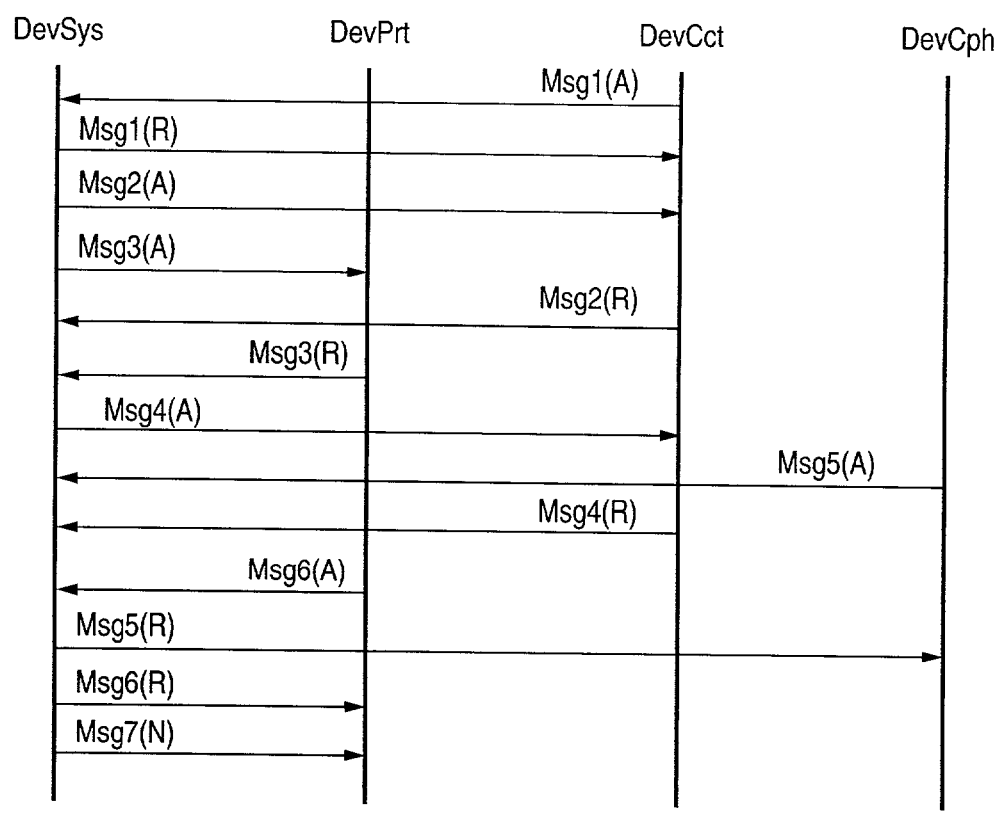
FIG. 11 is a chart for explaining an example of communication control of the ninth embodiment.

Communication control using the aforementioned packet format in FIG. 10 will be explained below with reference to FIG. 11. Note that the vertical lines in FIG. 11 indicate communication points, and Devxxx indicates the device type explained using Table 3: "DevSys", "DevPrt", "DevCct", and "DevCph" in turn from the left side respectively exemplify the host device 100, printer device 1, the controller such as the CCT 30 (card controller) of the CDV 200 (card device), and the CPH 430 (cellular phone) as one of external devices connected via the WCT (card device communication controller) which is provided on the CDV 200 (card device) and makes wireless communications. In FIG. 11, MsgX(A) and MsgX(N) are request messages, and MsgX(R) is a reply message to MsgX(A) (X=1 to 7).

In the following description, [MsgVVV, AckWWW, DevXXX, DevYYY, Z . . . Z] indicates the packet contents of a message, and the Msg, Ack, Did1, Did2, and Data/Str fields in FIG. 10 respectively contain MsgVVV, AckWWW, DevXXX, DevYYY, and a detailed command or reply parameter having contents Z . . . Z.

(1) When the CDV 200 (card device) is inserted in a card device insert port of the printer device, DevCct (card controller) sends a request message Msg1(A) [MsgCommand, AckWaitReply, DevCct, DevSys, card device attachment message] packet to the PCT 11 (printer control circuit) via the interface or internal bus so as to inform DevSys (host device) of insertion of the card device.

Since the Ack field is AckWaitReply and the Did2 field is DevSys, the printer controller transfers this packet to the host device. Since the Ack field is AckWaitReply and the Did2 field is DevSys, i.e., since that request is addressed to the host device, the host device interprets the packet contents, and recognizes that the card device has been attached.

(2) Since the Ack field is AckWaitReply, the host device sends a reply message Msg1(R) [MsgCommand, AckReplyok, DevCct, DevSys, card device attachment message] packet to the printer device via the external interface to return that packet to the request source (DevCct (card controller)). Since the Ack field is AckReplyOk and the Did1 field is DevCct, the printer device transfers that packet to DevCct (card controller) via the interface or internal bus. Since the Ack field is AckReplyOk, DevCct (card controller) determines that the host device can correctly recognize attachment of the card device.

(3) The host device sends a request message Msg2(A) [MsgDevStatus, AckWaitReply, DevSys, DevCct, card device type message] packet to be sent to DevCct (card controller) to the printer device via the external interface so as to acquire the attached card device type. Since the Ack field is AckWaitReply and the Did2 field is DevCct, the printer device transfers this packet to DevCct (card controller) via the interface or internal bus.

(4) The host device then sends a request message Msg3 (A) [MsgDevStatus, AckWaitReply, DevSys, DevPrt, detailed status information (host requires)] packet to the printer device via the external interface so as to acquire the printer device status.

(5) DevCct (card controller) checks the card device to generate card device type information in accordance with the request in (3). Since the Ack field of the request message is AckWaitReply, DevCct sends a reply message Msg2(R) [MsgDevStatus, AckReplyOk, DevSys, DevCct, card device type information] packet to the printer device via the interface or internal bus so as to return that message to the host device as the request source. Since the Ack field is AckReplyOk and the Did1 field is DevSys, the printer device transfers the packet to the host device via the external interface. Since the Ack field is AckReplyOk and the Did1 field is DevSys, i.e., since that reply is addressed to the host device, the host device interprets the packet contents. As a result, the host device can normally recognize the type of card device attached.

(6) The printer device generates requested detailed status information in accordance with the request in (4). Since the Ack field of the request message is AckWaitReply, the printer device sends a reply message Msg3(R) [MsgDevStatus, AckReplyOk, DevSys, DevPrt, (requested) detailed status information] packet to the host device as the request source via the external interface. Since the Ack field is AckReplyOk and the Did1 field is DevSys, i.e., since the reply is addressed to the host device, the host device interprets the packet contents. As a result, the host device can normally recognize the printer device status.

(7) The host device sends a request message Msg4(A) [MsgFile, AckWaitReply, DevSys, DevCct, FileInfo (file information message)] packet to be sent to DevCct (card controller) to the printer device via the external interface so as to acquire file information on the card device. Since the Ack field is AckWaitReply and the Did2 field is DevCct, the printer device transfers that packet to DevCct (card controller) via the interface or internal bus.

(8) When the user turns on the power switch of the CPH 430 (cellular phone), the wireless communication controller of the CPH 430 (cellular phone) informs the wireless communication controller on the CDV 200 (card device) of that message. Upon receiving this message, the card device also informs DevCct (card controller) of that message. Since DevCct (card controller) controls packet communications in place of the cellular phone, it sends a request message Msg5(A) [MsgCommand, AckWaitReply, DevCph, DevSys, cellular phone connection message] packet to the PCT 11 (printer control circuit) via the interface or internal bus so as to inform the host device of connection of the cellular phone. Since the Ack field is AckWaitReply and the Did2 field is DevSys, the printer controller transfers this packet to the host device via the external interface. Since the Ack field is AckWaitReply and the Did2 field is DevSys, i.e., since that request is addressed to the host device, the host device interprets the packet contents, and recognizes that the cellular phone has been connected.

(9) DevCct (card controller) reads out file information on the card device in accordance with the request in (7). Since the Ack field of the request message is AckWaitReply, DevCct sends a reply message Msg4(R) [MsgFile, AckReplyok, DevSys, DevCct, FileInfo (file information)] packet to the printer device via the interface or internal bus so as to return that reply to the host device as the request source. Since the Ack field is AckReplyOk and the Did1 field is DevSys, the printer device transfers that packet to the host device via the external interface.

Since the Ack field is AckReplyOk and the Did1 field is DevSys, i.e., since that reply is addressed to the host device, the host device interprets the packet contents. As a result, the host device can normally recognize file information on the card device.

(10) The printer device sends a request message Msg6(A) [MsgUI, AckWaitReply, DevPrt, DevDisp, UiConfig, output resource alone message] packet to the host device via the external interface so as to acquire output resource information of the display DIS 140 of the host device as a preliminary process for outputting a message or the like to the display of the host device.

(11) Since the Ack field of the request in (8) is AckWaitReply, the host device sends a reply message Msg5(R) [MsgCommand, AckReplyok, DevCph, DevSys, cellular phone connection message] packet to the printer device via the external interface so as to return that reply to the request source DevCph (cellular phone). Since the Ack field is AckReplyOk and the Did1 field is DevCph, the printer device transfers the packet to DevCct (card controller) via the interface or internal bus. Since the Ack field is AckReplyok and the Did1 field is DevCph, and DevCct (card controller) controls packet communications in place of the cellular phone (although that packet is addressed to the cellular phone), it interprets the packet contents, and grants the radio communication controller on the CDV 200 (card device) and cellular phone permission to connect (if necessary).

(12) Since the host device executes packet communication control of the DISP 140, and the Ack field in the request in (10) is AckWaitReply, it sends a reply message Msg6(R) [MsgUI, AckReplyOk, DevPrt, DevDisp, UiConfig, output resource information] packet to the printer device via the external interface. As a result, the printer device can acquire the configuration information of the display resources of the host device.

(13) In order to make the printer device print out the file information acquired in (9), the host device sends a request message Msg7(N) [MsgPrint, AckNoReply, DevSys, DevPrt, print control command] packet to the printer device via the external interface. The printer device starts the requested print operation. Since the Ack field is AckNoReply, no reply message is returned.

With the aforementioned communication control, even when a large number of devices are connected, smooth communication control can be done among devices.

10th Embodiment

Figure 12:
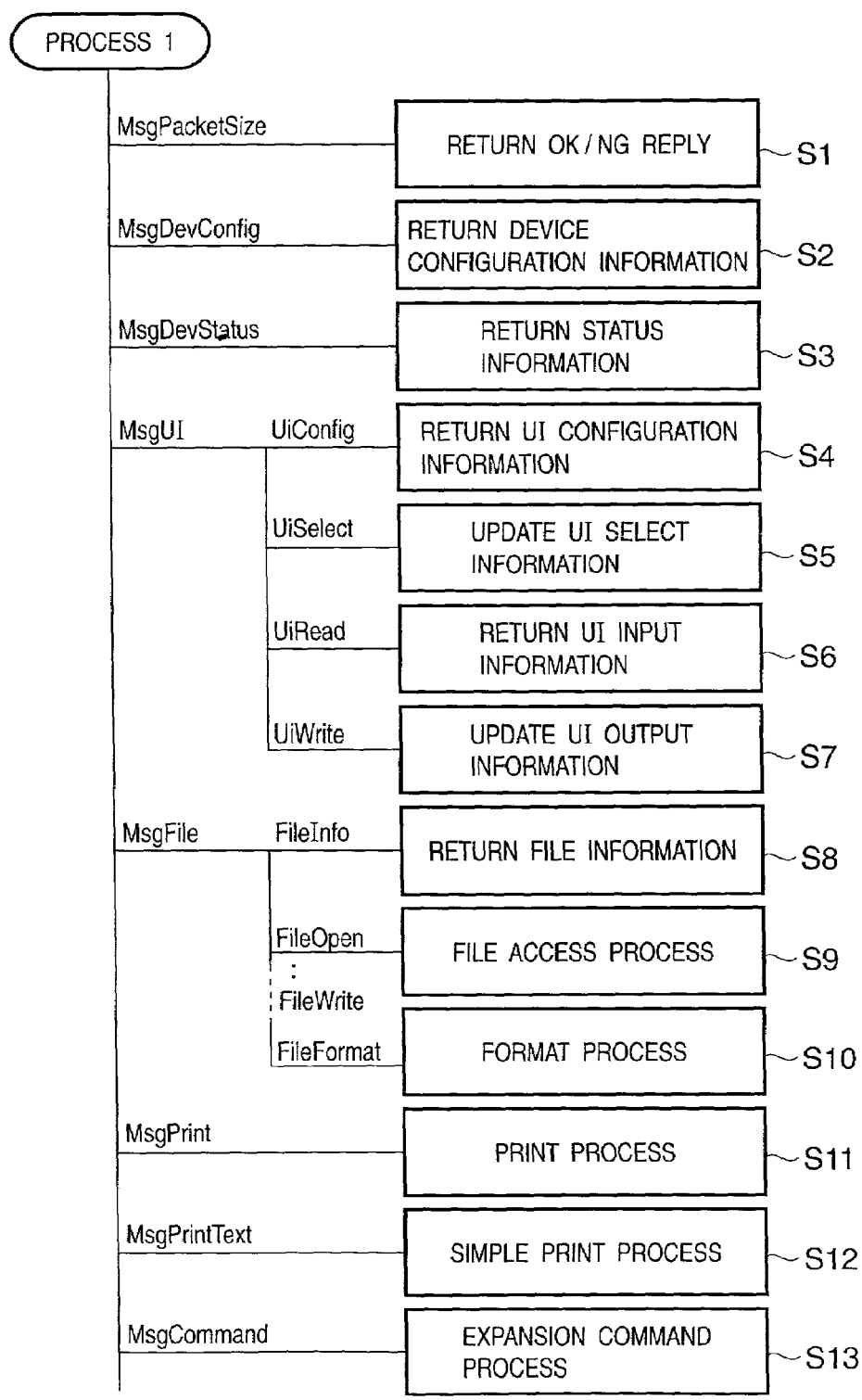
FIG. 12 is a control block diagram for explaining a communication control program of the 10th embodiment.

A request message interpretation control program using the packet format described using FIG. 10 is shown in FIG. 12, and will be explained below. Note that this control program is stored in storage means of respective devices such as a RAM in the STC 111 (system controller) of the host device 100, the ROM 13 of the printer device 1, the ROM 33 in the card device controller CCT 30, and the like. This embodiment will explain details of request message interpretation control of devices DevSys (host device 100) DevPrt (printer device 1), DevCct (card controller CCT 30), DevCp (control panel CP 130), DevDisp (image input/output device DISP 140), DevAud (audio input/output device AUD 140), DevEmm (external memory EMM 180), DevKb (keyboard input device KB 310), and DevPdv (pointing device input device PDV 320) described in Table 3. Note that the host device 100 of this embodiment corresponds to seven different devices DevSys, DevCp, DevDisp, DevAud, DevEmm, DevKb, and DevPdv, and comprises seven sets of process 1 to be described below.

Process 1 shown in FIG. 12 is a request message interpretation control program process which starts when each device type receives a request message to the self device. That is, when the Ack field of a packet is AckNoReply or AckWaitReply, and the Did2 field is the self device type, the request contents in the Msg field described using Table 1 are interpreted, and processing steps S1 to S13 corresponding to MsgPacketSize to MsgCommand requests described in Table 1 are executed.

(1) If the Msg field contains MsgPacketSize, it is checked in step S1 if the packet size requested in the Data field can be received. If the requested packet size can be received, a reply message is sent back to the Did1 device while setting AckReplyOk in the Ack field and the requested packet size in the Str field. On the other hand, if the request packet size cannot be received, a reply message is sent back to the Did1 device while setting AckReplyNg in the Ack field and the receivable packet size in the Str field.

(2) If the Msg field contains MsgDevConfig, a reply message in which AckReplyOk is set in the Ack field and Config information in Table 4 is set in the Str field is sent back to the Did1 device in step S2.

(3) If the Msg field contains MsgDevStatus, and if the request contents include no errors, a reply message in which AckReplyok is set in the Ack field, and basic status information in Table 5 and detailed status information of an item designated by the Data field are set in the Str field is sent back to the Did1 device in step S3. If the request contents include an error, a reply message in which AckReplyNg is set in the Ack field, and basic status information in Table 5, and an extracted error of a parameter designated by the Data field are set in the Str field is sent back to the Did1 device.

(4) If the Msg field contains MsgUI and the Data field starts from UiConfig in Table 6, and if the request contents include no errors, a reply message in which AckReplyOk is set in the Ack field, and one of input operation resource configuration information alone/output resource configuration information alone/input and output resource configuration information of user interface resources of the self device described using Table 6 is set in the Str field in correspondence with the request in the Data field is sent back to the Did1 device in step S4. If the request contents include an error, a reply message in which AckReplyNg is set in the Ack field and an extracted error of a parameter designated by the Data field is set in the Str field is sent back to the Did1 device.

(5) If the Msg field contains MsgUI and the Data field starts from UiSelect in Table 6, and if the request contents include no errors, it is checked in step S5 if a resource corresponding to the use request in the Data field can be used. If the resource can be used, it is stored as operation resource use management information to indicate that the requested input operation or output resource is reserved by the device type of Did1. In addition, a reply message in which AckReplyok is set in the Ack field and information of the input/output operation resource which is granted permission to use is set in the Str field is sent back to the Did1 device. If the resource cannot be used, a reply message in which AckReplyNg is set in the Ack field and information of the input/output operation resource which cannot be used is set in the Str field is sent back to the Did1 device. If the request includes an error, a reply message in which AckReplyNg is set in the Ack field and an extracted error of a parameter designated by the Data field is set in the Str field is sent back to the Did1 device. Furthermore, if input operation designated with an event message in the request is granted permission to use, when that operation is detected later, a predetermined reply message (MsgUI +UiRead) indicating detection of the operation can be automatically sent to the Did1 device.

(6) If the Msg field contains MsgUI and the Data field starts from UiRead in Table 6, if the request contents include no errors, and if the request item is registered in the operation resource management information stored by the UiSelect command in (4), a reply message in which AckReplyok is set in the Ack field and the status of the input operation resource requested by the Data field is set in the Str field is sent back to the Did1 device in step S6. If the request includes an error, or if the request item is not contained in the operation resource management information, a reply message in which AckReplyNg is set in the Ack field and an extracted error of a parameter designated by the Data field is set in the Str field is sent back to the Did1 device.

(7) If the Msg field contains MsgUI and the Data field starts from UiWrite in Table 6, if the request contents include no errors, and if the request item is registered in the operation resource management information stored by the UiSelect command in (4), display or audio output according to an item requested by the Data field is made, and a reply data set with AckReplyOk in the Ack field is sent back to the Did1 device in step S7. If the request includes an error, or if the request item is not contained in the operation resource management information, a reply message in which AckReplyNg is set in the Ack field and an extracted error of a parameter designated by the Data field is set in the Str field is sent back to the Did1 device.

(8) If the Msg field contains MsgFile and the Data field starts from FileInfo in Table 8, a reply message is sent back to the Did1 device in step S8. In this message, AckReplyok is set in the Ack field, and information corresponding to a request item described in ① in Table 8 in the Data field, e.g., file directory information, or file attribute information of designated file information or the like (e.g., file name, data type, file size, modification information (read only, erase permitted/inhibited, copy permitted/inhibited, the presence/absence of visibility from the user, the presence/absence of password protection, and the like), free space size, and the like) is set in the Str field.

If the request includes an error, a reply message in which AckReplyNg is set in the Ack field and an extracted error of a parameter designated by the Data field is set in the Str field is sent back to the Did1 device.

(9) If the Msg field contains MsgFile and the Data field starts from one of FileOpen to FileWrite in Table 8, and if the request contents include no errors, a reply message in which AckReplyOk is set in the Ack field and information associated with file access upon executing a file access process described in ② to ⑧ in Table 8 in accordance with the request in the Data field is set in the Str field is sent back to the Did1 device in step S9.

If the request includes an error, a reply message in which AckReplyNg is set in the Ack field, and an extracted error of a parameter designated by the Data field is set in the Str field is sent back to the Did1 device.

(10) If the Msg field contains MsgFile and the Data field starts from FileFormat in Table 8, and if the request contents include no errors, a reply message in which AckReplyOk is set in the Ack field and information associated with a format process upon executing a file format process described in ⑨ in Table 8 in accordance with the request in the Data field is set in the Str field is sent back to the Did1 device in step S10. If the request includes an error, a reply message in which AckReplyNg is set in the Ack field and an extracted error of a parameter designated by the Data field is set in the Str field is sent back to the Did1 device.

(11) If the Msg field contains MsgPrint, and if the request contents include no errors, a print operation is executed in accordance with the request in step S11. If the request operation is successfully done, and if the Ack field of the request message is AckWaitReply, a response message set with AckReplyOk in the Ack field is sent back to the Did1 device. On the other hand, if the request operation is not successfully done, and if the Ack field of the request message is AckWaitReply, a reply message in which AckReplyNg is set in the Ack field and operation error information is set in the Str field is sent back to the Did1 device.

If the request contents include an error, and if the Ack field of the request message is AckWaitReply, a reply message in which AckReplyNg is set in the Ack field and an extracted error of a parameter designated by the Data field is set in the Str field is sent back to the Did1 device.

(12) If the Msg field contains MsgPrintText, and if the request contents include no errors, a simple print operation is executed according to the request in step S12. If the request operation is successfully done, and if the Ack field of the request message is AckWaitReply, a response message set with AckReplyOk in the Ack field is sent back to the Did1 device. On the other hand, if the request operation is not successfully done, and if the Ack field of the request message is AckWaitReply, a reply message in which AckReplyNg is set in the Ack field and operation error information is set in the Str field is sent back to the Did1 device. If the request contents include an error, and if the Ack field of the request message is AckWaitReply, a reply message in which AckReplyNg is set in the Ack field and an extracted error of a parameter designated by the Data field is set in the Str field is sent back to the Did1 device.

(13) If the Msg field contains MsgCommand, and if the request contents include no errors, an expansion function according to the request is executed in step S13. If the request operation is successfully done, and if the Ack field of the request message is AckWaitReply, a response message set with AckReplyOk in the Ack field is sent back to the Did1 device. On the other hand, if the request operation is not successfully done, and if the Ack field of the request message is AckWaitReply, a reply message in which AckReplyNg is set in the Ack field and operation error information is set in the Str field is sent back to the Did1 device. If the request contents include an error, and if the Ack field of the request message is AckWaitReply, a reply message in which AckReplyNg is set in the Ack field, and an extracted error of a parameter designated by the Data field is set in the Str field is sent back to the Did1 device.

In each of the processes (steps S1 to S13), if the device itself does not support the requested function (e.g., DevPrt does not support MsgFile function), a reply message in which AckReplyNg is set in the Ack field and parameters requested by the Data field are set in the Str field is sent back to the Did1 device. If the Ack field of the request message is AckNoReply, no such reply is returned basically. However, if the purpose of the requested function is attained by only returning information, e.g., the request MsgPacketSize, MsgDevConfig, MsgDevStatus, UiConfig of MsgUI, UiRead of MsgUI, and the like is received, the aforementioned reply is returned even when AckNoReply is designated.

11th Embodiment

Examples of control programs that can be applied to the arrangement of the first to 10th embodiments mentioned above will be explained in detail below with reference to the flow charts.

Figure 13:
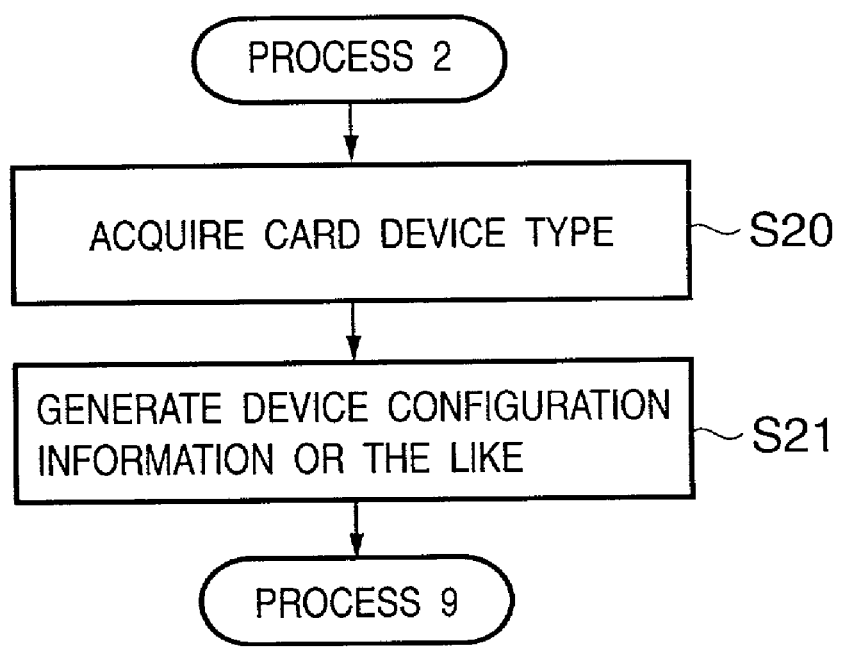
FIG. 13 is a flow chart for explaining an example of a control program (process 2) of a card controller in the 11th embodiment.

Process 2 in FIG. 13 is one of control programs of the card controller CCT 30 or card control circuit CCNT 40. The program is stored in the ROM 33 of the card controller CCT 30 or the ROM 13 of the printer controller 10, and objective control can be implemented when the CPU reads out and executes the program at an appropriate timing as needed.

This control program is executed when the card device CDV 200 is inserted in the card device insert port of the printer device 1 and the card controller CCT 30 or card control circuit CCNT 40 recognizes attachment of the card device by an interrupt signal or the like.

The type of card device CDV 200 attached is read out in step S20, and card device connection message information such as hardware configuration information or the like of the attached card device is generated in step S21. In process 9 to be described later, the card device connection message information is sent to the host device 100 via the interface or internal bus and the printer device 1, thus ending this control program.

Figure 14:
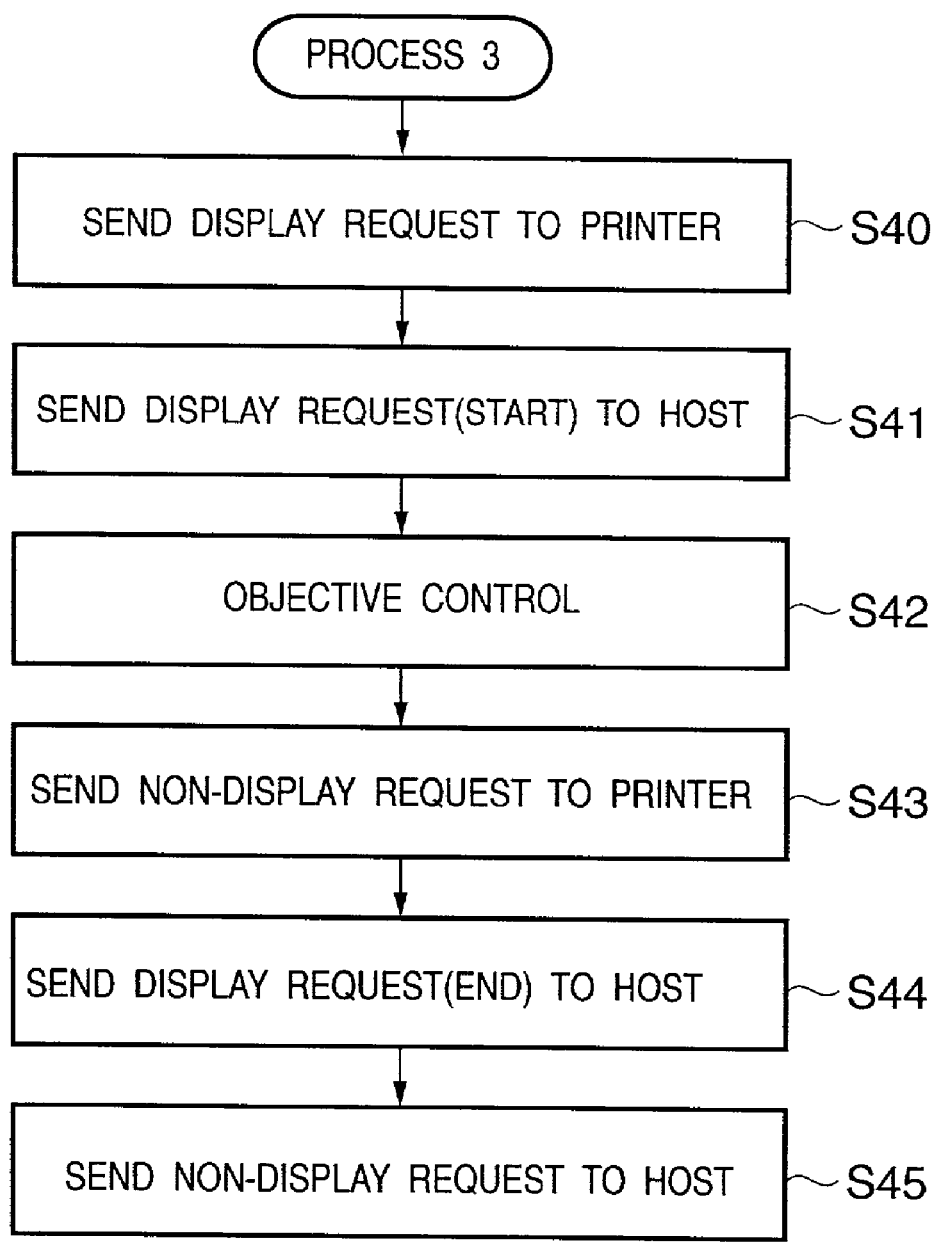
FIG. 14 is a flow chart for explaining an example of a control program (process 3) of the card controller in the 11th embodiment.

Process 3 in FIG. 14 is also one of control programs of the card controller CCT 30 or card control circuit CCNT 40. The program is stored in the ROM 33 of the card controller CCT 30 or the ROM 13 of the printer controller 10, and objective control can be implemented when the CPU reads out and executes the program at an appropriate timing as needed.

This control program is a control program example, which is executed when the card device CDV 200 is inserted in the card device insert port of the printer device 1 and the card controller CCT 30 or card control circuit CCNT 40 recognizes attachment of the card device by an interrupt signal or the like, or when an external communication device such as the CPH 430 (cellular phone) or the like is connected via the card device communication controller of the card device 200, and which allows the card controller to use an indicator such as an LED or the like of the printer device 1 and display output of the DISP 140 of the host device using the MsgUI request described in the ninth embodiment.

In step S40, the LED indicator of the printer device 1 (DevPrt device) is controlled to flicker so as to inform the user that device connection confirmation of the card device, cellular phone, or the like is in progress. In step S41, a message or an image such as an icon or the like which informs the user that device connection confirmation is in progress is displayed on the display output device DISP 140 (DevDisp device) of the host device, or a voice message indicating that device connection confirmation is in progress is output from the audio output device AUD 140 (DevAud device). In step S42, an objective process, for example, process 2 mentioned above if the card device is connected, a device connection confirmation procedure if an external communication device such as the CPH 430 (cellular phone) or the like is connected, or the like is executed.

Upon completion of the objective process, LED flickering of the printer device that has started in step S41 is stopped in step S43, and the message displayed in step S41 is cleared, a message indicating completion of the device connection procedure is displayed for a predetermined period of time, or a voice message indicating completion of the device connection procedure is output in step S44. In step S45, the message or the like displayed in step S44 is cleared, thus ending this control program.

Figure 15:
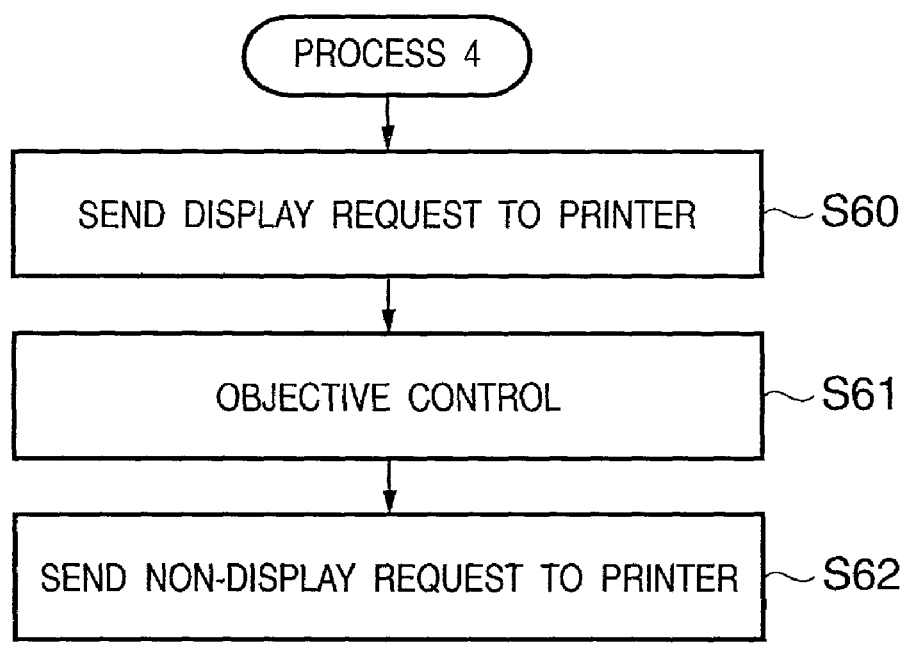
FIG. 15 is a flow chart for explaining an example of a control program (process 4) of a host device in the 11th embodiment.

Process 4 in FIG. 15 is one of control programs of the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This control program is a control program example which is executed when the host device makes file access to the card device CDV 200 attached to the printer device 1, and which allows the host device to use an indicator such as an LED or the like of the printer device 1 using the MsgUI request described in the ninth embodiment.

In step S60, the LED indicator of the printer device 1 (DevPrt device) is controlled to flicker so as to inform the user that the card device is being accessed. In step S61, target file access to a memory in the card device, e.g., file read/write access or the like, is made. Upon completion of such objective process, LED flickering of the printer device that has started in step S60 is stopped in step S62, thus ending this control program.

Figure 16:
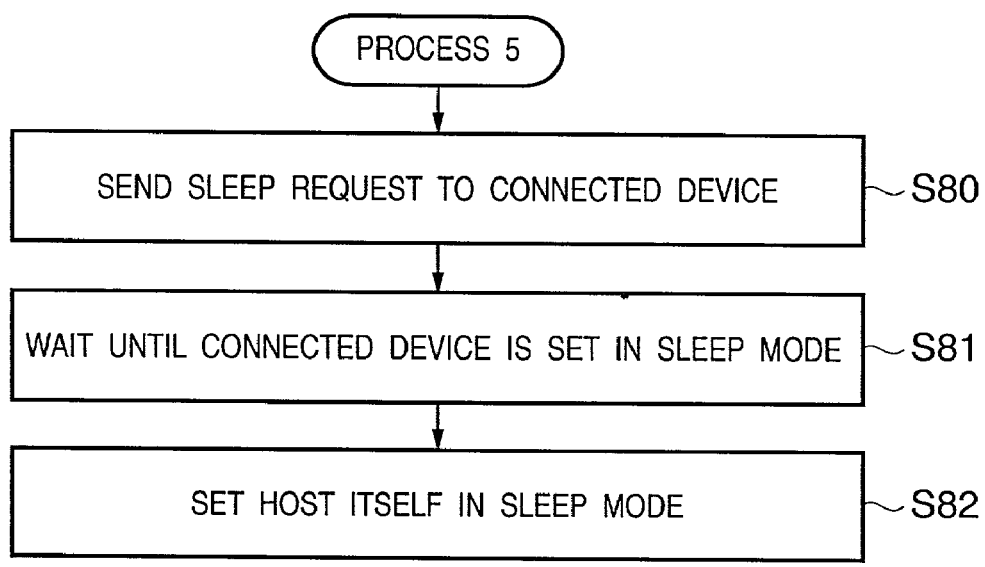
FIG. 16 is a flow chart for explaining an example of a control program (process 5) of the host device in the 11th embodiment.

Process 5 in FIG. 16 is also one of control programs of the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This control program is a control program example executed when the host device shifts to a power saving mode by user operation or after no operation is made for a predetermined period of time or more.

In step S80, a transition request to the power saving mode is sent to the devices connected such as the printer device 1 and the like using a predetermined command and the like. In step S81, the control waits until all request destination devices have shifted to the power saving mode. After it is confirmed that all request destination devices have shifted to the power saving mode, the host device itself shifts to the power saving mode in step S82, thus ending this control program.

Figure 17:
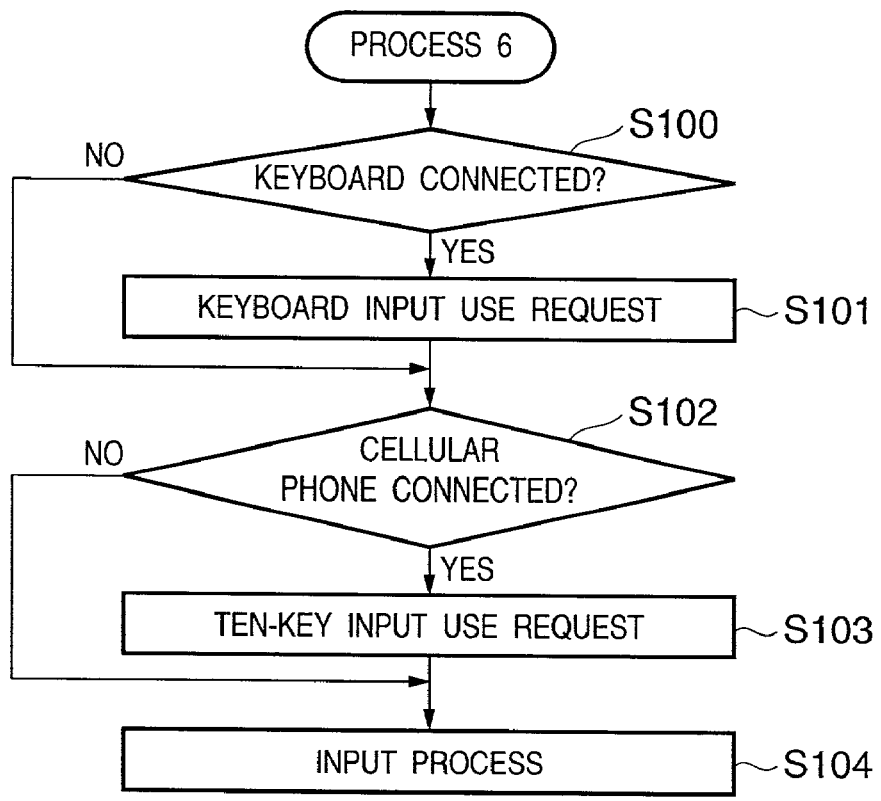
FIG. 17 is a flow chart for explaining an example of a control program (process 6) of the host device in the 11th embodiment.

Lastly, process 6 in FIG. 17 is also one of control programs of the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This control program is a control program example which allows the host device to acquire a character input from the keyboard input device (KB 310), wireless keyboard input device (WKB 410), cellular phone (CPH 430), or the like connected.

In step S100, a usable keyboard input device connected to the system is checked and confirmed, and if at least one usable keyboard input device is found, an input operation resource use request is issued to the found keyboard input device and the control waits for a use permission message from the request destination in step S101. The flow then advances to step S102.

If no usable keyboard input device is found as a result of step S100, the flow jumps to step S102 without issuing any input operation resource use request in step S101. In step S102, another device which comprises a usable ten-key input device and is connected to the system, e.g., the cellular phone (CPH 430) or the like, is checked and confirmed. If at least one usable device is found, an operation resource use request of, e.g., a ten-key input operation, a character input operation using a ten-key operation, or the like is issued, and the control waits for a use permission message from the request destination in step S103. The flow then advances to step S104. If no useable device is found as a result of step S102, the flow jumps to step S104 without issuing any input operation resource use request in step S103.

In step S104, the control waits for a character input from the device designated by the use request, and if a character input is detected, input character information or the like is provided to an application program or the like that requires the character input. If an input device is found in neither of steps S100 and S102, a character input function by means of at least conventional character input means (for example, 51 hiragana letters, 52 alphabetical letters (capital and small letters), numerals, symbols, and the like are selectively displayed on the DISP 140 as the display output device of the host device by select operations using cursor keys/buttons on the control panel (CP 130), and characters are input by repeating character select/determine operations using cursor keys/buttons on the control panel (CP 130)) is provided in step S104. When character input operation is complete, this control program ends.

As described above, resources such as input operation means, LED indicators, text/image output devices, and the like of devices connected to the system can be used by another device as needed, and the status data of connected devices can be acquired by another device as needed. By utilizing such functions, the need for adding indicators such as LED indicators, operation buttons, and the like for the purpose of improving operability of the device can be obviated or minimized. Also, when the display device and audio output device of the host device are used, an image processing system with high operability that can be easily understood and used even by a beginner using color display, icons, visual and audible messages, and the like can be provided. In the aforementioned control program examples, an example wherein the printer device uses input/output resources of other devices has not been explained. For example, when an error such as out of print sheets or the like has occurred during a print process in the printer, a message "Printer is out of sheets!" may be displayed using the display of the cellular phone connected.

12th Embodiment

Control program examples associated with error processes, which can be applied to the arrangements of the first to 10th embodiments will be described in detail below with reference to the flow charts.

When the printer device of the system cannot communicate with the host device, for example, when the power switch of the host device is OFF or when an interface cable that connects the printer and host devices is not connected, even when the user inserts a card device into the printer device, the card controller CCT 30 and the printer device cannot communicate with the host device. In such state, the function of automatically detecting attachment of the card device by the host device cannot be provided.

Such problems are mainly caused by careless operations of a user "who does not turn on the power switch of the host device or does not connect an interface cable", and troubleshooting of such problems is taken care of in the column of "helpless reasons in some sense" in operation manuals. However, since most of users of the home-use system that the present invention provides are beginners, it is important for the sake of high operability to inform solutions of such careless operations, which are possibly simplest and easiest to understand without requiring the users to read manuals.

Hence, this embodiment will explain (1) "a method of at least informing the user of operation errors using the indicator/buzzer or the like of the printer device when the host device issues a request associated with the card device to the printer device but the printer device cannot communicate with the card device", (2) "a method of at least informing the user of operation errors using the indicator/buzzer or the like of the printer device when the printer device cannot communicate with the host device", and (3) "a method in which when the printer device cannot communicate with the host device, it stores requests or the like to the host device caused by user operations as an error history, and when the host and printer devices can communicate with each other later, the host device reads out the error history from the printer device, interprets the contents and order of erroneous operations, and offers operation guides by means of text, icons, voice messages, and the like on the screen", in a state wherein at least the printer device receives power supply.

Figure 18:
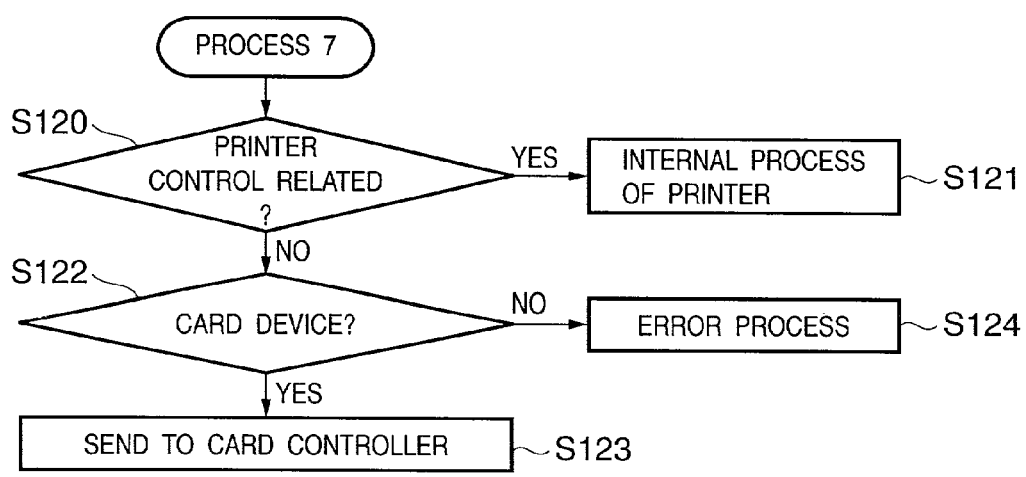
FIG. 18 is a flow chart for explaining an example of a control program (process 7) of a printer device in the 12th embodiment.

Process 7 of FIG. 18 is a flow chart for explaining the control program of method (1). Note that this control program is one of control programs of the printer device. The program is stored in the ROM 13 of the printer controller 10 in the printer device, and objective control can be implemented when the CPU reads out and executes the program at an appropriate timing as needed.

This control program is a reception control program executed when the host device sends request information to the printer device 1 via the external interface.

It is checked in step S120 by the means explained in the eighth or ninth embodiment if information received from the host device is a request for, e.g., a print function or the like of the printer device. If YES in step S120, conventional print operation control or the like of the printer device is executed in step S121, and this control program ends.

On the other hand, if it is determined in step S120 that the input information is a request associated with card control, it is checked in step S122 if a card device is attached. If YES in step S122, the request information from the host device is transferred to the card controller CCT 30 or card control circuit CCNT 40 via the interface or internal bus in step S123, thus ending this control program. On the other hand, if it is determined in step S122 that no card device is attached, the LED of the printer device is turned on or flickered, or its buffer (if available) is driven to inform the user that an operation error has occurred, and an error termination message of the request is sent to the host device via the external interface in step S124, thus ending this control program.

Figure 19:
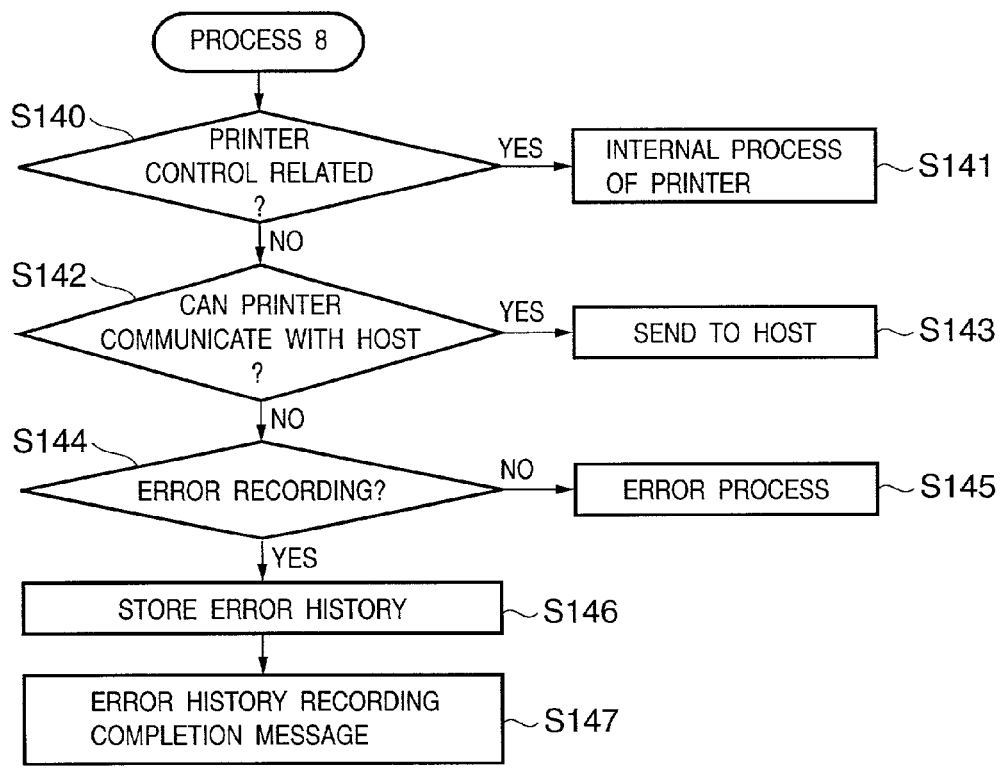
FIG. 19 is a flow chart for explaining an example of a control program (process 8) of the printer device in the 12th embodiment.

Process 8 of FIG. 19 is a flow chart for explaining a control program of methods (2) and (3). Note that this control program is one of control programs of the printer device. The program is stored in the ROM 13 of the printer controller 10 in the printer device, and objective control can be implemented when the CPU reads out and executes the program at an appropriate timing as needed.

This control program is a reception control program executed when the card controller CCT 30 or card control circuit CCNT 40 sends request information or the like to the printer device 1 via the interface or internal bus by user operation associated with the card device 200 or user operation at an externally connected device that can communicate with the card device communication controller 210 of the card device 200.

It is checked in step S140 by the means explained in the eighth or ninth embodiment if information received from the card controller CCT 30 or card control circuit CCNT 40 via the interface or internal bus is request information for a print function or the like of the printer device. If YES in step S140, conventional print operation control or the like of the printer device is executed in step S141, and this control program ends.

On the other hand, if it is determined in step S140 that the input information is a request associated with card control, it is checked in step S142 if the printer device can communicate with the host device. If YES in step S142, the request information from the card controller CCT 30 or card control circuit CCNT 40 is transferred to the host device via the external interface, thus ending this control program.

However, if it is determined in step S142 that the printer device cannot communicate with the host device, it is checked in step S144 if an error history can be recorded or need not be recorded. If an error history cannot be recorded or need not be recorded, in step S145 the LED of the printer device is turned on or flickered, or its buffer (if available) is driven to inform the user that an operation error has occurred. Furthermore, an error termination message of the request is sent to the card controller CCT 30 or card control circuit CCNT 40 via the interface or internal bus, thus ending this control program.

On the other hand, if an error history can be recorded in step S144, the request information from the card controller CCT 30 or card control circuit CCNT 40 is recorded as error history information in the RAM 12, a nonvolatile memory, or the like in step S146, and a message indicating that "the request information cannot be sent to the host device and is stored in an error history" is sent to the card controller CCT 30 or CCNT 40 via the interface or internal bus in step S147, thus ending the control program. To promptly inform the user of an operation error, "a process for turning on or flickering the LED or the printer device or driving the buzzer (if available)" to inform the user that an operation error has occurred can be added to step S147. Note that the error history information recorded in step S146 can use only part of the received request information. That is, information that allows the host device to determine only the operation error sequence upon analyzing the error history information later suffices.

Figure 20:
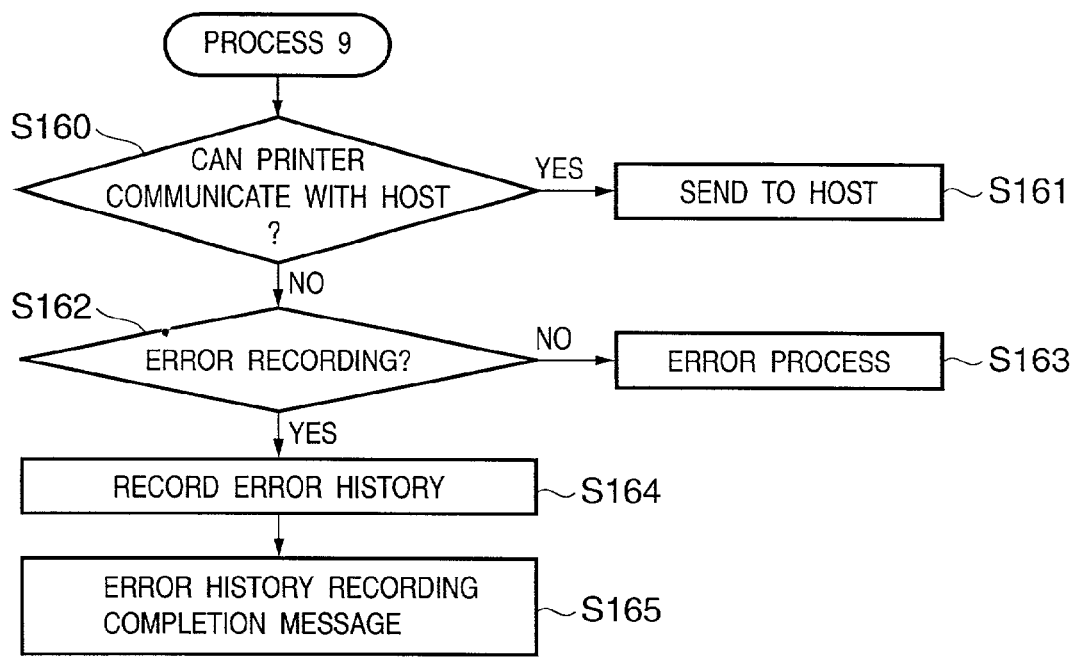
FIG. 20 is a flow chart for explaining an example of a control program (process 9) of a card controller in the 12th embodiment.

Process 9 of FIG. 20 is a flow chart for explaining a control program of methods (2) and (3), which is different from process 8. Note that this control program is one of control programs of the card controller CCT 30 or card control circuit CCNT 40. The program is stored in the ROM 33 in the card controller or the ROM 13 of the printer controller 10, and objective control can be implemented when the CPU reads out and executes the program at an appropriate timing as needed.

This control program is a transmission control program executed when the card controller CCT 30 or card control circuit CCNT 40 sends request information or the like to the printer device 1 via the interface or internal bus by user operation associated with the card device 200 or user operation at an externally connected device that can communicate with the card device communication controller 210 of the card device 200.

It is checked in step S160 if the printer device can communicate with the host device. If YES in step S160, the request information is sent from the card controller CCT 30 or card control circuit CCNT 40 to the host device via the printer device in step S161, thus ending this control program.

However, if it is determined in step S160 that the printer device cannot communicate with the host device, it is checked in step S162 if an error history can be recorded or need not be recorded. If an error history cannot or need not be recorded, a "request for turning on or flickering the LED or the printer device or driving the buzzer (if available)" is issued via the interface or internal bus to inform the user that an operation error has occurred in step S163, thus ending this control program.

On the other hand, if an error history can be recorded in step S162, the request information which is scheduled to be sent is recoded in the RAM 32 (or the RAM 12 in the arrangement of FIGS. 4 and 5), a nonvolatile memory, or the like as error history information in step S164, and a message indicating that "request information cannot be sent to the host device and is recorded in the error history" is sent to the card controller CCT 30 or CCNT 40 in step S165, thus ending this control program.

To promptly inform the user of an operation error, "a process for requesting to turn on or flicker the LED or the printer device or to drive the buzzer (if available)" to inform the user that an operation error has occurred can be added to step S165. Note that the error history information recorded in step S164 can use only part of the received request information. That is, information that allows the host device to determine only the operation error sequence upon analyzing the error history information later suffices.

Figure 21:
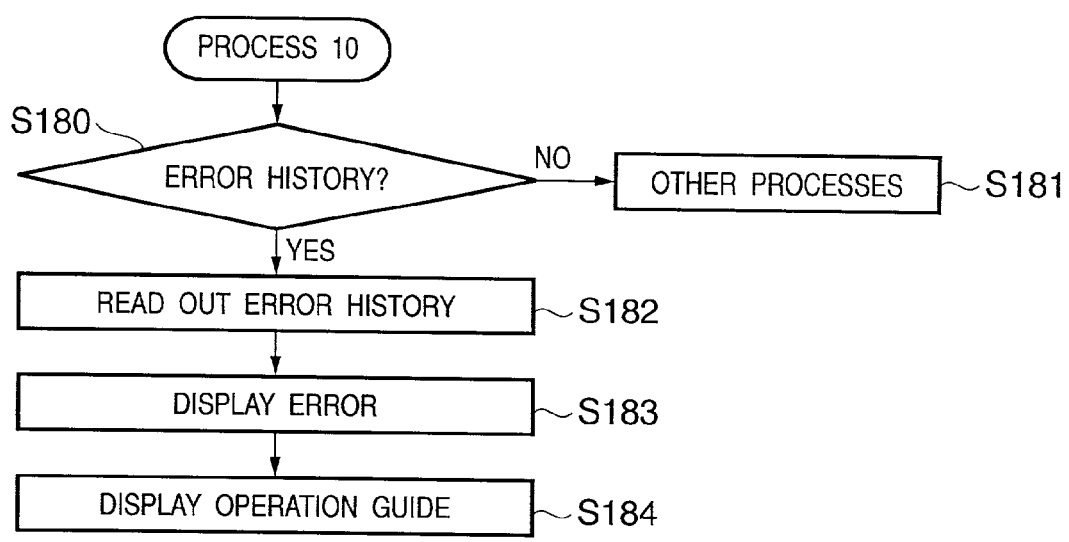
FIG. 21 is a flow chart for explaining an example of a control program (process 10) of a host device in the 12th embodiment.

Lastly, process 10 of FIG. 21 is a flow chart for explaining a control program of method (3). Note that this control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This control program is an error operation guide control program executed when the host device recognizes connection with the printer device and is ready to communicate.

It is checked in step S180 by acquiring status of the printer apparatus or card controller if error history information stored in step S146 in process 8 or step S164 in process 9 is present. If NO in step S180, another normal process is executed (step S181). On the other hand, if error history information is present, the error history information is read out from the printer device or card controller in step S182, and the display output device DISP 140, audio output device AUD 140, or the like is controlled to make an output that at least indicates that an operation error has occurred so as to inform the user of the operation error in step S183. In step S184, the error history information is analyzed to output an operation guide by means of text, icons, voice message, or the like which explain the operation sequence in correspondence with the order errors occurred and causes of the errors using the display output device DISP 140, audio output device AUD 140, or the like. If the user cancels the operation guide by predetermined operation or the like, this control program ends.

For example, when the contents of the error history information are ① a card device attachment message, an operation guide message like "Turn on the power switch of the device main body. Then set the card in the printer." can be output.

13th Embodiment

Control program examples associated with print control, which can be applied to the arrangements of the aforementioned embodiments, will be described in detail below with reference to the flow charts.

Figure 22:
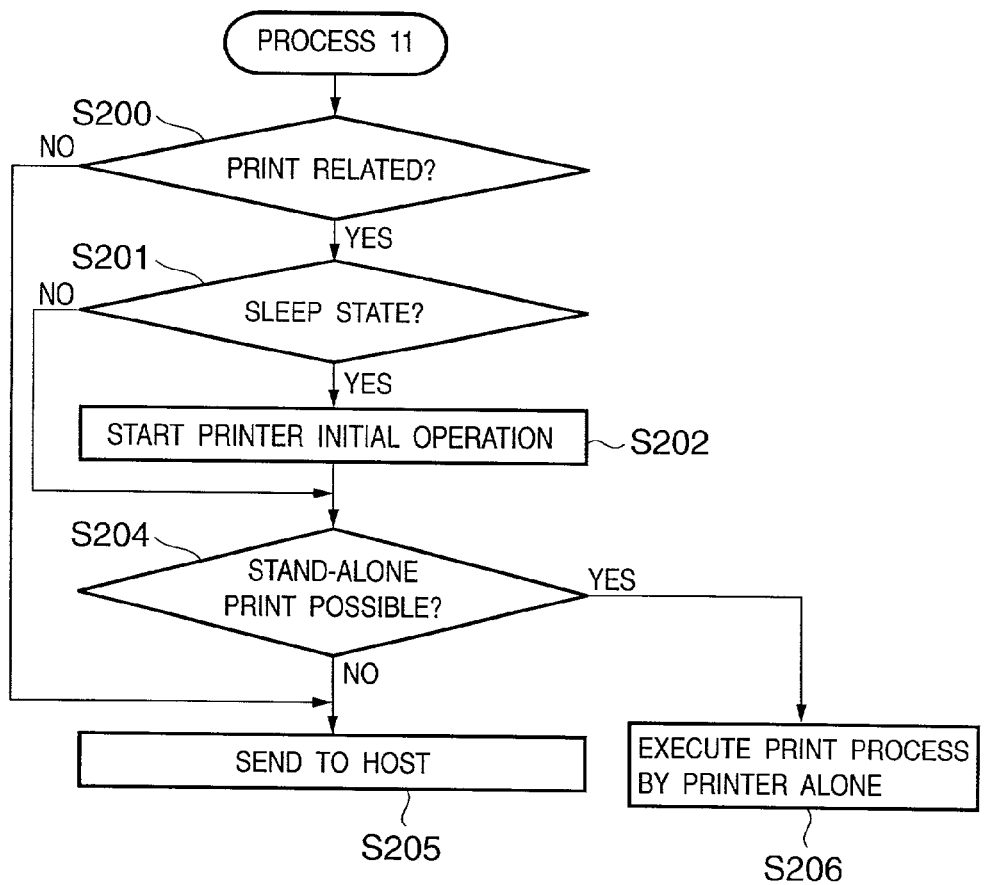
FIG. 22 is a flow chart for explaining an example of a control program (process 11) of a printer device in the 13th embodiment.

Process 11 of FIG. 22 is a flow chart for explaining a control program associated with print control of the printer device.

Note that this control program is one of control programs of the printer device. The program is stored in the ROM 13 of the printer controller 10 in the printer device, and objective control can be implemented when the CPU reads out and executes the program at an appropriate timing as needed.

This control program is a reception control program executed when the card controller CCT 30 or card control circuit CCNT 40 sends a request or the like to the printer device 1 via the interface or internal bus by user operation associated with the card device 200 or user operation at an externally connected device that can communicate with the card device communication controller 210 of the card device 200.

It is checked in step S200 by the means explained in the eighth or ninth embodiment if information received from the card controller CCT 30 or card control circuit CCNT 40 via the interface or internal bus is request information for a print function. If YES in step S200, it is checked in step S201 if the printer device is in a sleep state such as the power saving mode or the like. If YES in step S201, and if the mechanism of the printer unit PU 20 of the printer device must be initialized, a printer initial operation is started in step S202 to prepare for a print process so that a print operation which starts in response to a print request from the host device to the printer device or a simple print operation in which the printer alone can print like the MsgPrintText request explained in the above embodiment can start as early as possible. The flow then advances to step S204.

On the other hand, if the printer device is not in a sleep state in step S201, since the printer has already completed an initial operation and the like and is ready to print anytime, and the printer initial operation in step S202 is not required, the flow jumps to step S204. It is checked in step S204 if the request information pertains to a simple print function in which the printer alone can print like the MsgPrintText request. If YES in step S204, a simple print process such as text print or the like is executed in accordance with the request information in step S206, thus ending this control program.

On the other hand, if the request is a normal print request via the host device in step S204, the request information is transferred to the host device via the external interface in step S205, thus ending this control program. Also, if the request information is other than the print function in step S200, since the printer device need not be ready to print in step S202 even when the printer device is in a sleep state such as the power saving mode or the like, the request information is similarly transferred to the host device in step S205, thus ending this control program. Note that the control for transferring the request information to the host device in step S205 can use process 8 in FIG. 19.

Figure 23:
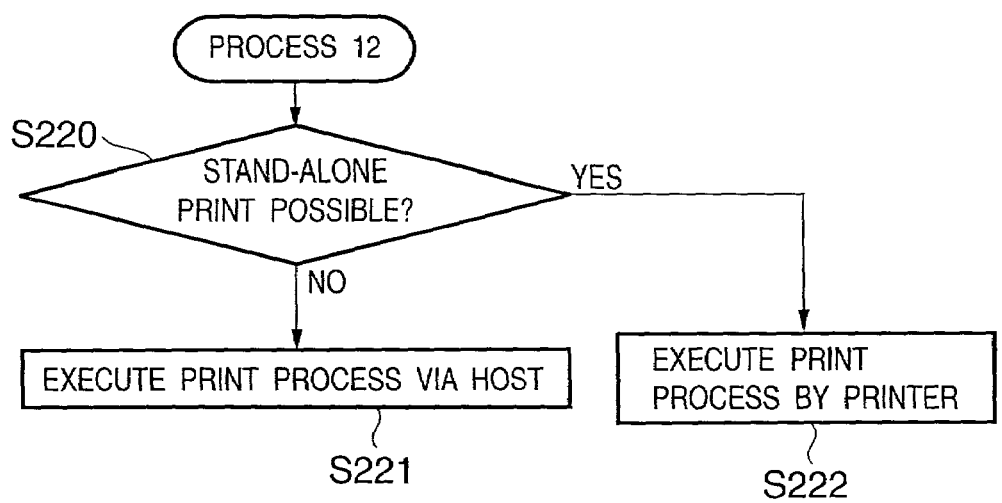
FIG. 23 is a flow chart for explaining an example of a control program (process 12) of a card controller in the 13th embodiment.

Process 12 of FIG. 23 is one of control programs of the card controller CCT 30 or card control circuit CCNT 40. This control program is stored in the ROM 33 of the card controller CCT 30 or the ROM 13 of the printer controller 10, and objective control can be implemented when the CPU reads out and executes the program at an appropriate timing as needed.

This control program is a print control program example of the card controller, which is associated with a function of printing data on the card device or printing a received mail message requested by an externally connected device such as a cellular phone or the like while the card device CDV 200 is attached or an externally connected device such as the CPH 430 (cellular phone) or the like is connected via the card device communication controller of the card device 200.

Note that this control program is launched when text print or the like is instructed by predetermined operation.

In step S220, the print performance of the printer device 1 is checked by the aforementioned device configuration/device status read means or the like to acquire, from the printer device, information indicating if the printer device has font information such as CG or the like, if the printer has an emulation function, and so forth. If desired print information is made up of simple image/text information alone, and the printer has image/text print functions of such information, it is determined that the print process can be done by the printer alone, and print control is made using print control information (e.g., using the aforementioned MsgPrintText request message) that allows the printer alone to print in step S222. On the other hand, if desired print information contains a high-quality image or the like, and cannot be printed by only the functions of the printer, a print process is done by passing data required for the print process to the host device via the printer device, and sending print control information that controls the printer to print a desired image from the host device to the printer device in step S221.

Figure 24:
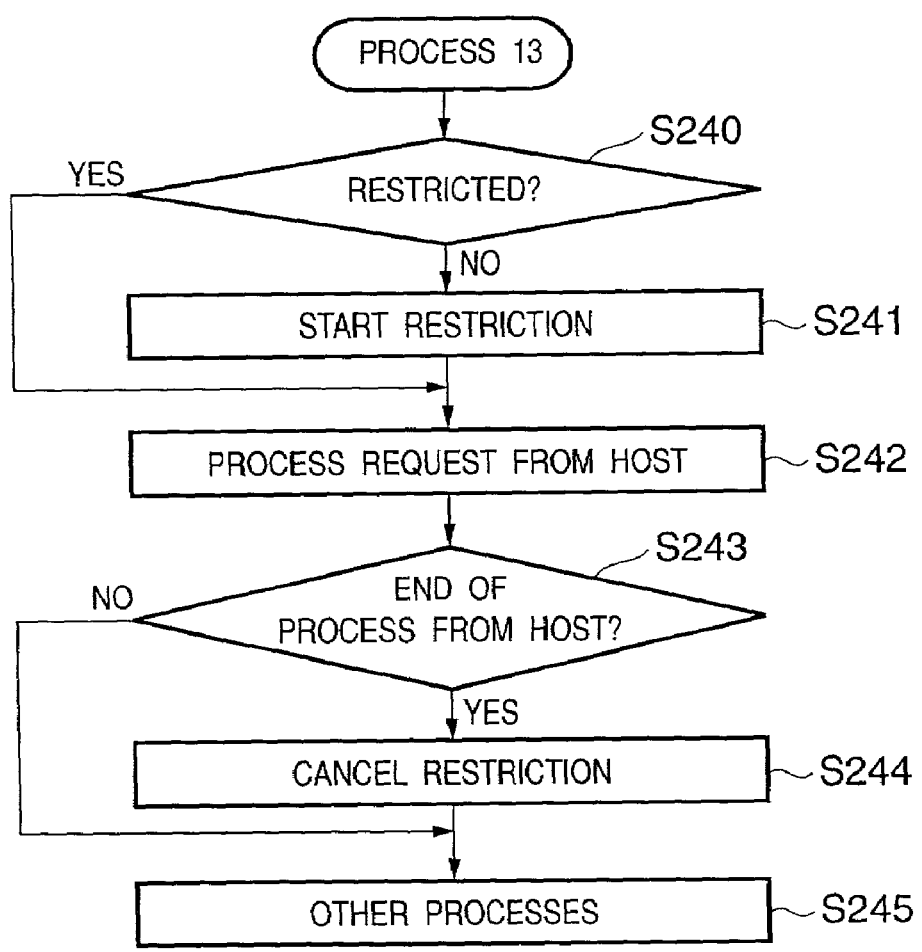
FIG. 24 is a flow chart for explaining an example of a control program (process 13) of the printer device in the 13th embodiment.

Process 13 of FIG. 24 is a flow chart for explaining a control program associated with communication control of the printer device described in the arrangement of the eighth embodiment. Note that this control program is one of control programs of the printer device, the program is stored in the ROM 13 of the printer controller 10 in the printer device, and objective control can be implemented when the CPU reads out and executes the program at an appropriate timing as needed.

This control program is a communication control program that exclusively controls the external interface bus BUS2 which connects the host device and printer device, and interface bus BUS3 that connects the printer controller in the printer device and the card controller especially in the system arrangement shown in FIGS. 1 to 3.

Upon receiving large-size request information such as print control information or the like from the host device via the external interface bus BUS2, this control program is launched. It is checked in step S240 if communications on the interface bus BUS3 have already been restricted in step S241. If YES in step S240, the flow jumps to step S242. On the other hand, if communications are not restricted, communication control restriction of the interface bus BUS3 that connects the card controller and printer controller starts in step S241.

Note that restriction may simply set the interface bus BUS3 in a busy state to physically inhibit communications with the card controller, or may control the card controller to retard large-size data communications when the protocol means or the like between the card controller and printer controller declares that the printer device is communicating with the host device.

In step S242, a print process or the like starts in response to a request such as print control information received from the host device. It is checked in step S243 if print control that requires large-size request information such as print control information or the like from the host device is complete (e.g., completion of a print job). If NO in step S243, restriction continues, and the flow jumps to step S245. If the print control is complete, communication restriction of the interface bus BUS3 that connects the card controller and printer controller is canceled to allow normal communications in step S244, and the flow advances to step S245. In step S245, other required conventional processes such as a post process and the like are executed, and this control program ends.

As described above, while large-size data is transferred via one interface bus, communications on the other interface bus are temporarily restricted. In this way, since the printer controller can restrict data communications from the card controller during the print operation from the host device, the printer can concentrate on control associated with the print operation. With this arrangement, since the circuit arrangement of the printer controller can be simplified, and the processing performance of the CPU can be suppressed, a cost reduction of the whole device can be achieved.

If the card device has, e.g. only a memory function, the application function using the card device controls in the following sequence: ① the host device reads out file information or the like on the card device; and ② the host device generates print control information from the file information and controls the printer apparatus to print. Hence, even when the arrangement of this embodiment is adopted, the performance of the system never drops.

14th Embodiment

Device control program examples that can be applied to the arrangements of the aforementioned embodiments will be explained in detail below with reference to the flow charts.

Figure 25:
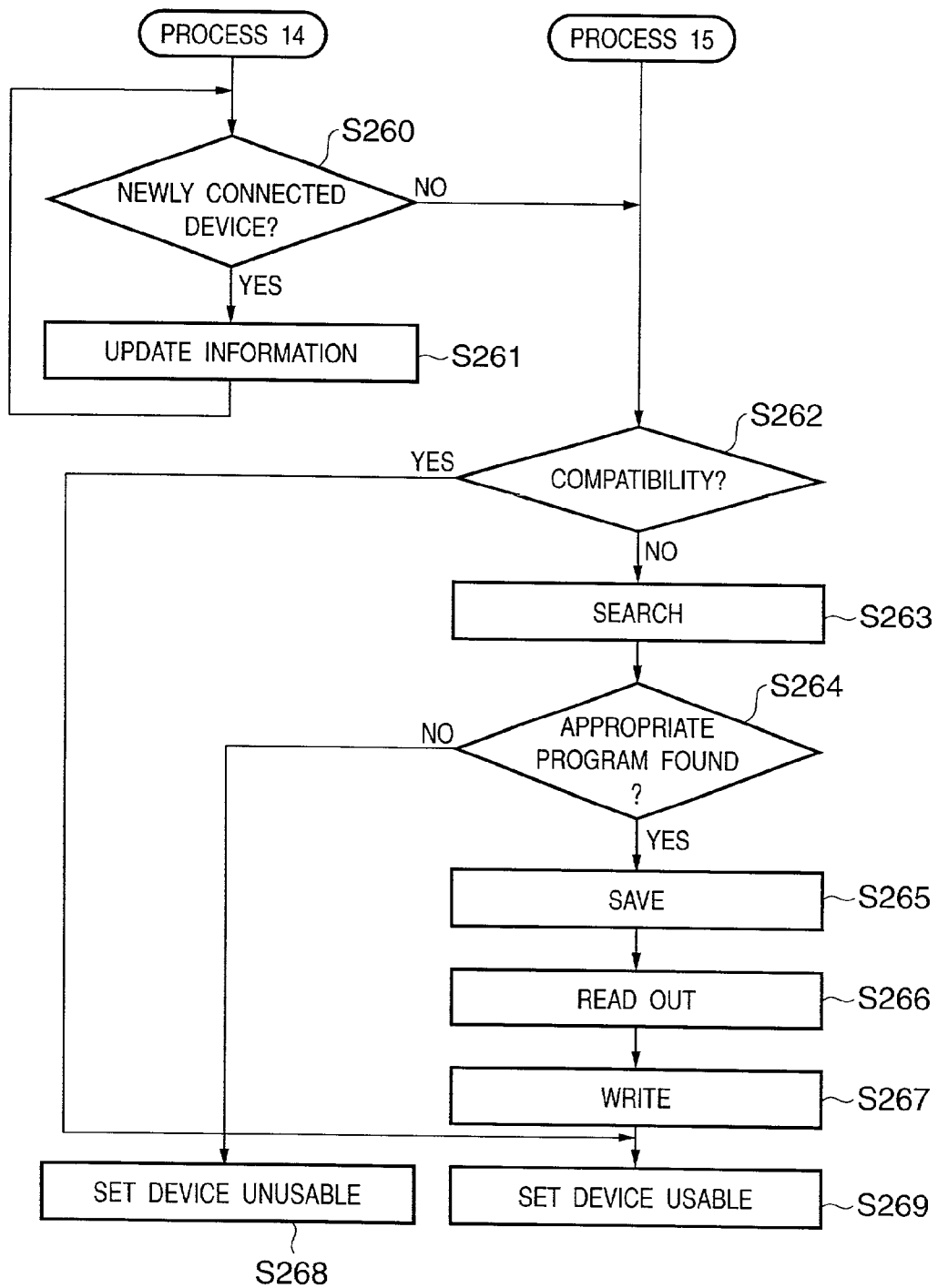
FIG. 25 is a flow chart for explaining an example of a control program (processes 14, 15) of a host device in the 14th embodiment.

Processes 14 and 15 of FIG. 25 correspond to one of control programs of the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This control program is a management control program of device control which allows the host device to use devices connected to the system.

This control program is launched when the system of the host device is started up or an application program is launched. In step S260, all detachable, usable devices connected to the system are recognized. If a newly connected device is found, a device control program of the found device is searched for and read out in the following sequence, and is stored in the RAM or the like of the STC 111 (system controller) in the host device or device connection management information is updated in step S261. In the search/read sequence of the device control program, if the RDV (read-only storage device) of the host device is ready to be read, the RDV is searched, and if an appropriate control program is found, the search ends. On the other hand, if the RDV is not ready to be read (e.g., no storage medium is set in the RDV), or if no appropriate program is found from the RDV as a result of the search, the EMM (expansion memory) is searched. If an appropriate program is found, the search ends.

Furthermore, if no EMM is attached, or if no program is found as a result of the search, it is checked if the target connected device stores a control program. If a control program is found, the search ends. If no program is found even after that search, it is checked if the device is connected to the Internet/network. If the device is connected to the Internet/network, a predetermined external server is searched. If an appropriate program is found, the search ends.

If the device is not connected to the Internet/network, or if no appropriate program is found from the external server as a result of the search, storage means of other devices connected to the system are searched. If an appropriate program is found, the search ends.

If no appropriate program is found even after the aforementioned search processes, it is determined that no program is found, and the search ends. If a target device control program is found as a result of the search, the device control program is read out from the location where it was found. If no program is found, the target device is disabled.

If another newly connected device is found in step S260, the device driver search/read process is executed again, and the device connection management information is updated in step S261. Upon completion of recognition of all devices connected, the flow advances to process 15.

In process 15, matching between device control programs of connected devices and a target device control program are checked in step S262. If all connected devices match the respective device control programs, the flow jumps to step S269 to enable all connected devices, thus ending this control program. If a mismatch connected device is detected in step S262, and if the corresponding control program of the device is not rewritable, a search result "not found" is set in step S263, and the flow advances to step S264. On the other hand, if the control program is rewritable, an optimal control program is searched for.

Upon searching, it is checked first if the target connected device stores a control program. If a control program is found, the search ends. If no program is found, and if the RDV (read-only storage device) of the host device is ready to be read, the RDV is searched. If an appropriate control program is found, the search ends.

On the other hand, if the RDV is not ready to be read (e.g., no storage medium is set in the RDV), or if no appropriate program is found from the RDV as a result of the search, the EMM (expansion memory) is searched. If an appropriate program is found, the search ends. Furthermore, if no EMM is attached, or if no program is found as a result of the search, it is checked if the device is connected to the Internet/network. If the device is connected to the Internet/network, a predetermined external server is searched. If an appropriate program is found, the search ends.

If the device is not connected to the Internet/network, or if no appropriate program is found from the external server as a result of the search, storage means of other devices connected to the system are searched. If an appropriate program is found, the search ends. If no appropriate program is found even after the aforementioned search processes, it is determined that no program is found, and the search ends.

In step S246, the search result in step S263 is checked. If the search result is "not found", the target device is disabled, and an error message indicating this is displayed on the screen or the like in step S268, thus ending this processing. On the other hand, if an appropriate control program can be found, the current control program information is read out from the target device and is stored in a nonvolatile memory such as the EMM or the like as needed in step S265.

Note that the control program information can be stored in all other devices which are connected to the system and comprise nonvolatile storage means that can store and rewrite their contents, e.g., a card device, an external storage device connected on the Internet/network, and the like. In step S266, the optimal control program is read out from the location where that program was found as a result of the search. In step S267, the control program of the target device is rewritten by the optimal control program. In step S269, only matching connected devices are set as usable devices, and this processing ends. Note that an alert message "Program updating of connected device is in progress. Do not shut down power supply!" may be displayed on the display in steps S265 to S267.

Figure 26:
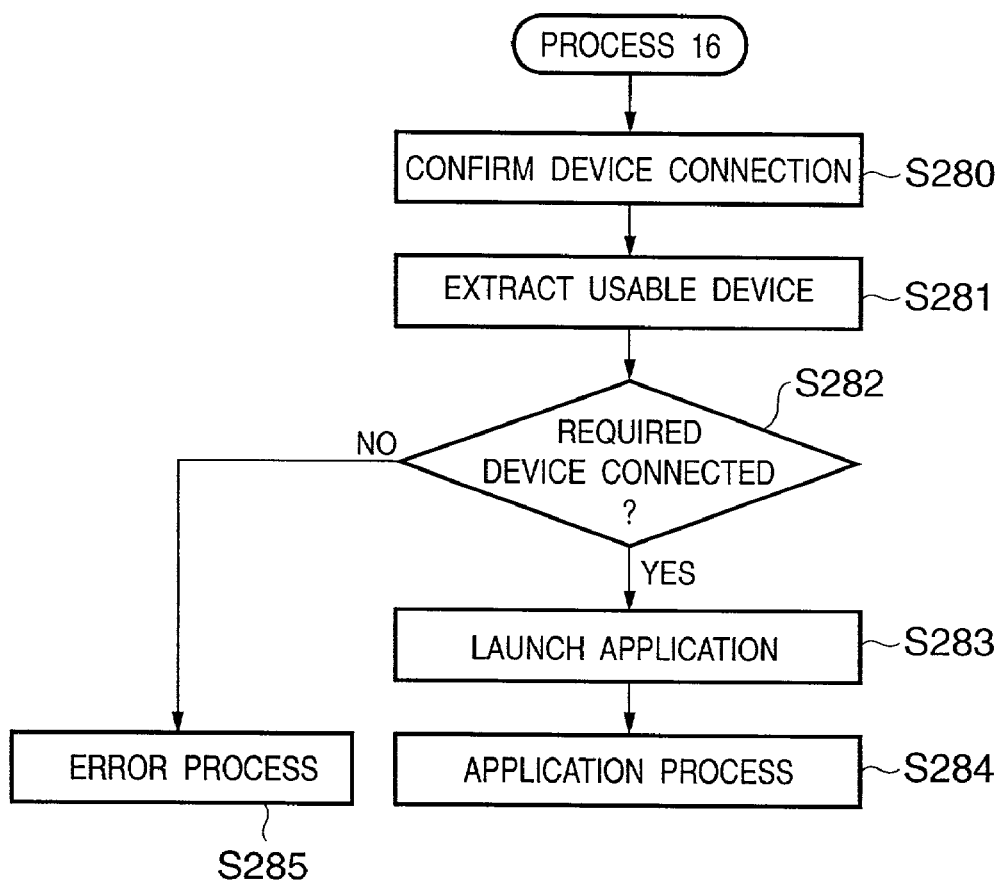
FIG. 26 is a flow chart for explaining an example of a control program (process 16) of the host device in the 14th embodiment.

Process 16 of FIG. 26 is one of control programs of the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This control program is a management control program of device control which allows the host device to enable devices connected to the system.

This control program is launched when the system of the host device is started up or an application program is launched. In step S280, available device information is acquired from process 14 described above. In step S281, devices required for an application program to be launched are extracted with reference to management information such as header information or the like recorded on the same recording medium as the application program to be launched. It is checked in step S282 if at least one of the devices extracted in step S281 are connected. If none of devices required for the application program are connected, an error message (for example, when the application to be launched requires a device card, a message "Set card in printer") is output in step S285.

On the other hand, if even at least one of the required devices is connected in step S282, and at least one of functions that the application program provides is available using only the connected device, the selected application program is launched in step S283, and an application program process is executed in step S284.

Figure 27:
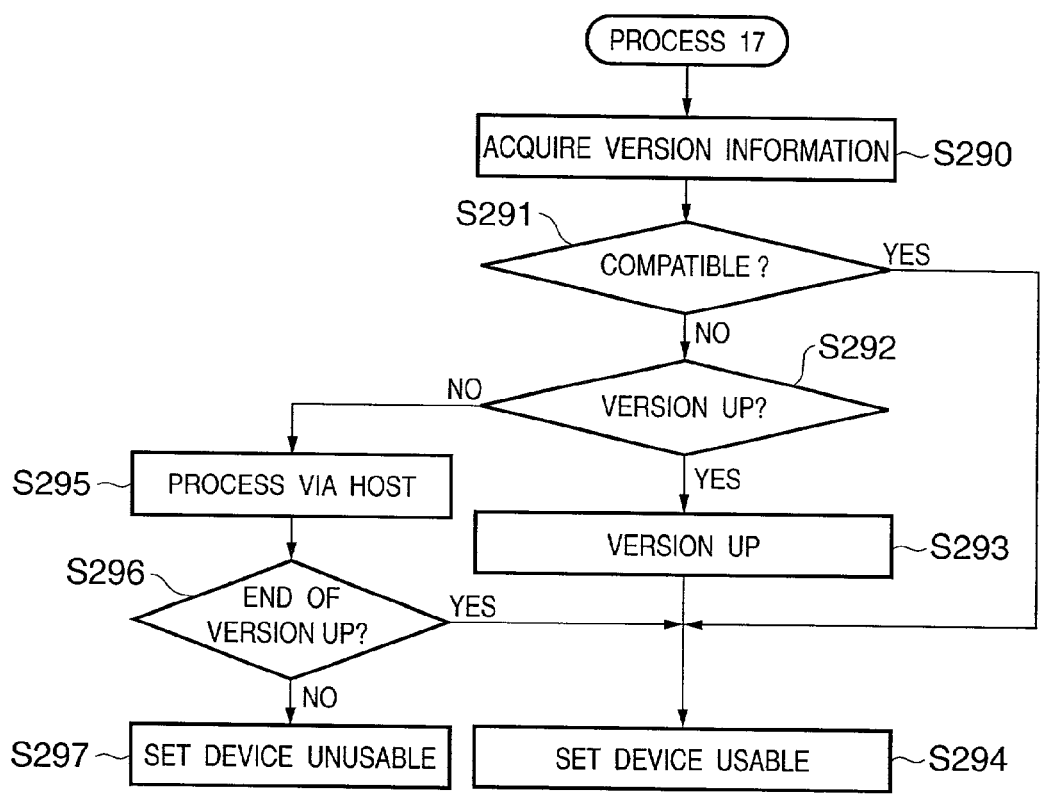
FIG. 27 is a flow chart for explaining an example of a control program (process 17) of a card controller in the 14th embodiment.

Process 17 of FIG. 27 is one of control programs of the card controller CCT 30 or card control circuit CCNT 40. The program is stored in the ROM 33 of the card controller CCT 30 or the ROM 13 of the printer controller 10, and objective control can be implemented when the CPU reads out and executes the program at an appropriate timing as needed.

This control program is a matching control program between the card device and card controller, which is executed when the card device CDV 200 is attached, and the card controller CCT 30 or card control circuit CCNT 40 recognizes attachment of the card device.

Function version information of the card device is acquired in step S290, and is compared with that of the card controller stored in the ROM 33 of the card controller CCT 30 or the ROM 13 of the printer controller 10 in step S291. If compatibility/matching upon function control is found, the card device is enabled in step S294, and a card device connection message or the like is sent to the host device, thus ending this processing.

On the other hand, if no compatibility/matching is found in step S291, it is checked in step S292 if control program information for the card controller having compatibility/matching such as addition of new functions is present on the card device. If such program information is found, the control program information on the card device is read out to partially or entirely rewrite the control program stored in the ROM 33 of the card controller CCT 30 or the ROM 13 of the printer controller 10 in step S293. In step S294, the card device is enabled, and a card device connection message or the like is sent to the host device, thus ending this processing.

If no control program information for the card controller having compatibility/matching such as addition of new functions is present on the card device in step S292, a request is issued to the host device to make it rewrite the control program of the card controller under the control like in process 15 in step S295. If the host device can successfully update the control program having compatibility/matching with the card device in step S296, the card device is enabled, and a card device connection message or the like is sent to the host device in step S294, thus ending this processing.

On the other hand, if the host device cannot update the control program either in step S296, the connected card device is disabled, and a card device incompatible message or the like is sent to the host device in step S297. Upon receiving this message, the host device can output an error message such as an alert message "This card cannot be used. Please contact the card manufacturer." on the display or the like.

With the aforementioned control of this embodiment, the need for installation processes and the like can be obviated upon using devices connected to the system. Expandable devices such as the card device and the like may have advanced functions by updating them. However, at the time of delivery of a printer device that can receive the card device to the user, it is difficult to provide full compatibility to every card devices that will come into existence in the near future by expecting all such advanced functions. This embodiment can flexibly solve such problem, and the user can use functionally upgraded card devices without any installation processes.

That is, if the card device itself has functionally upgraded control program information of the card controller with compatibility upon functionally upgrading the card device, the present invention allows the user to use the functionally upgraded card device by only inserting it into the printer (without any version-up processes).

15th Embodiment

A print control program example which can be applied to the arrangements of the aforementioned embodiments will be explained in detail below with reference to the flow chart.

Figure 28A:
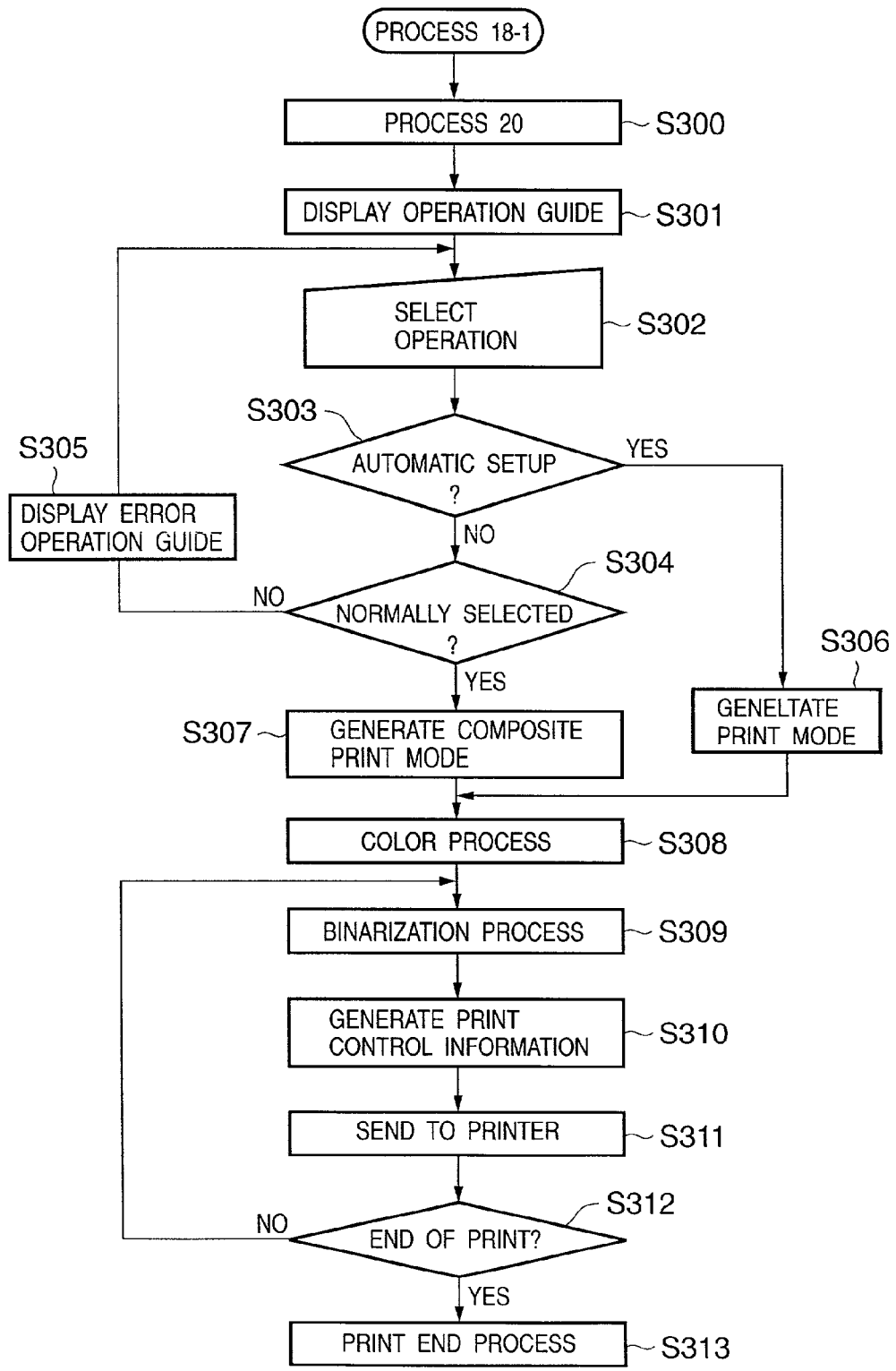
FIG. 28A is a flow chart for explaining an example of a control program (process 18-1) of a host device in the 15th embodiment.

Process 18-1 of FIG. 28A is one of control programs of the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This control program is launched in response to a print instruction or the like input by predetermined operation from a running application program or the like. The application program can arbitrarily designate text/image data to be printed, setups of select items in a print operation menu in steps S301 and S302 (to be described later), and their default values. Note that this control program is comprised of a first control program part (steps S300 to S307) for receiving image data and operation menu setup items from the application program, and controlling to generate print mode parameters and to enlarge/reduce image data in accordance with the operation select contents and upon receiving a print start instruction by predetermined operation, and a second control program part (steps S308 to S313) for executing a print image generation process in accordance with the image data and print mode parameters passed from the first control program part, and controlling the printer device to print.

It is confirmed in step S300 if the printer device which is to print out is connected (in the same manner as process 20 to be described later). In step S301, a print operation menu and the like are displayed on the display or the like in accordance with an instruction from the application program. In step S302, required select items on the print operation menu are selected (if only one paper type to be printed is available, some application does not make the user select at least the paper type), and a print start instruction is issued by predetermined operation. Then, if a paper select instruction by the application is detected in step S303, print mode setup parameters optimal to the data type of image information and the designated paper type are determined in step S306, and the image data and print mode setup information are passed to the second control program part starting from step S308.

On the other hand, if it is determined in step S303 that print items are arbitrarily selected by the user, it is checked in step S304 if conflicting items are not selected. If NO in step S304, an error message "Wrong selected parameters" or the like is output to the display or the like as needed in step S305, and the flow returns to step S302. On the other hand, if it is determined in step S304 that no conflicting items are selected, print mode setup parameters are determined in accordance with designated select items in step S307, and the image data and print mode setup information are passed to the second control program part starting from step S308. The second program control part executes a color process suitable for the image information (RGB multi-leveled information) and print mode information passed from the first control program part in step S308, converts the RGB multi-leveled information into CMY(K) binary information suitable for the printer device by error diffusion or the like in step S309, generates print control information corresponding to the printer device connected on the basis of the CMY(K) information in step S310, and sends that information to the printer device in step S311. Then, steps S309 to S312 repeat themselves until it is determined in step S312 that print operation is complete. In step S313, a print end process for, e.g., outputting a print end message on the display for a predetermined period of time is done as needed, thus ending this processing. Even when the printer of the aforementioned system arrangement has no function associated with the card device, this embodiment can be applied.

16th Embodiment

An application program example which can be applied to the arrangements of the aforementioned embodiments will be described in detail below with reference to the flow chart.

Figure 28B:
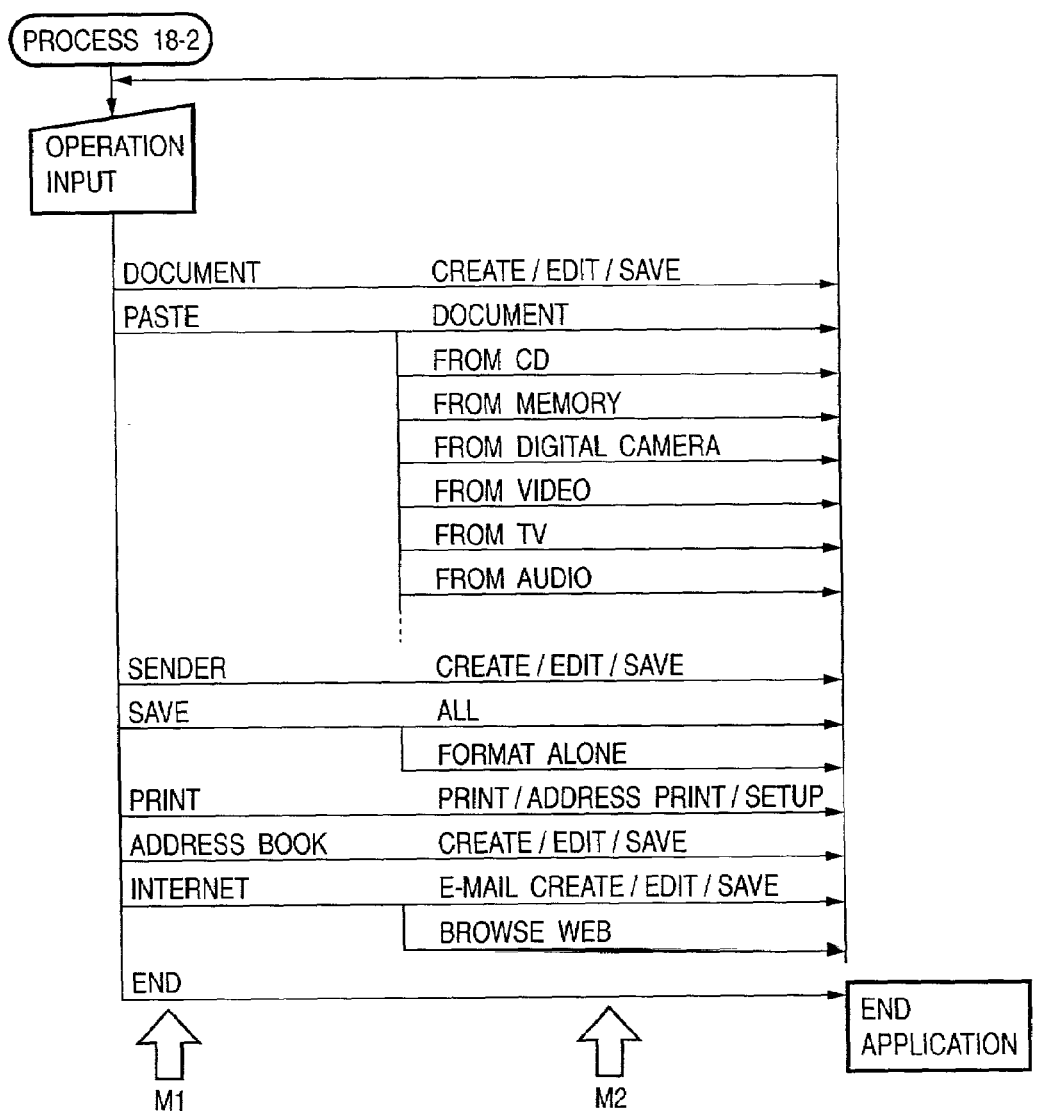
FIG. 28B is a flow chart for explaining an example of a control program (process 18-2) of the host device in the 15th embodiment.

Process 18-2 of FIG. 28B is one of application programs which can run on the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This program starts a read process from the RDV to the RAM in response to predetermined operation (e.g., upon setting a storage medium that stores this application program in the RDV, select instruction operation on a predetermined operation window, or the like).

Figure 29:
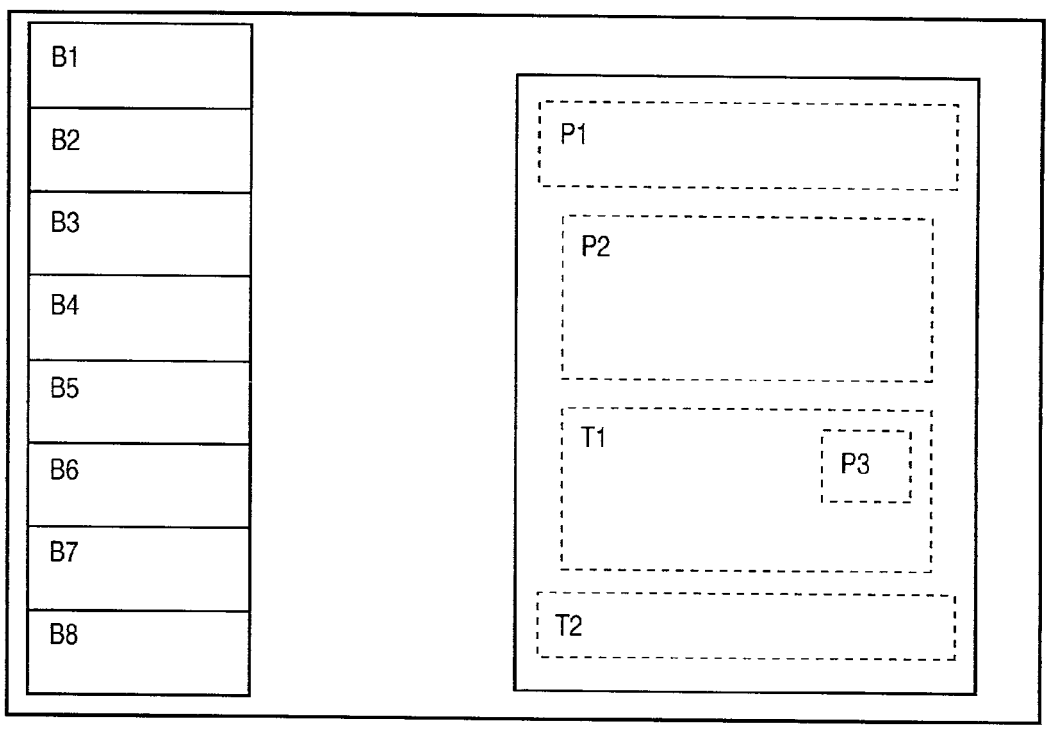
FIG. 29 is a view for explaining an operation screen (1) of a host device in the 16th embodiment.

When this application program is launched, an operation window of a GUI (graphical user interface) operation environment shown in FIG. 29 is displayed on the DISP 140. Buttons B1 to B8 of the GUI (graphical user interface) operation environment, which are on the left side in FIG. 29, correspond to basic functions in a column of arrow M1 illustrated at the bottom of FIG. 28B; buttons B1, B2, B3, B4, B5, B6, B7, and B8 respectively represent a document function, paste function, sender function, save function, print function, address book function, Internet function, and end function.

When the application is launched, the control waits for an operation input, thus allowing button select operations using cursor keys/various buttons on the control panel (CP 130) or wireless control panel (WCP 440), button select/character input operations by cursor keys/character input keys on the keyboard input device (KB 310) or wireless keyboard input device (WKB 410), or input position pointing operation/button select operations by the pointing device (PDV 320) or wireless pointing device (WPDV 420).

The functions of the buttons B1 to B8 respectively have detailed functions in a column indicated by arrow M2 at the bottom of process 18-2 in FIG. 28B, and these functions will be described in detail below.

The document function of the button B1 includes document create/edit/save functions, and allows to create, edit, and save an arbitrary document.

The paste function of the button B2 allows to paste a document, to paste a text object, document object, image object, audio object, and the like stored on a CD-ROM (compact disk ROM: a read-only storage medium of the RDV), to paste a text object, document object, image object, audio object, and the like stored on a memory of the card device or the external memory (EMM 180), to paste an image object from a connected video camera, to paste an image object output on the TV, to paste an audio object of a connected digital audio device, and so forth.

Upon pasting a document, text, or image object, the paste position, paste object size (enlargement/reduction), rotation/reverse paste, depth ordering (layers) of objects to be pasted, and the like can be freely changed by input operation. Although an audio object is not directly related to a print-out process, a pasted audio object may be reproduced upon printing data created in this way, or data may be sent as an e-mail message via the Internet or the like, and a pasted audio object may be reproduced when the receiver opens that e-mail message. Note that the object paste information has contents shown in FIG. 31, which will be referred to as paste management information hereinafter.

For example, when objects P1, P2, T1, P3, and T2 are pasted, as illustrated in the right side of FIG. 29, the object name (object file name, object acquisition source), object type (indicating a data format), object paste position (X-Y coordinate position), enlargement/reduction information (%), rotation (rotational angle)/reverse information (right or left/up or down), and layer information (the largest numerical value indicates the frontmost position) of each pasted object are stored, as shown in FIG. 31.

The sender function of the button B3 has sender information create/edit/save functions, and the created sender information can be used upon printing out a letter or sending an e-mail message via the Internet or the like.

The save function of the button B4 has functions of saving all/saving the format alone. The function of saving the format alone saves only the paste management information alone shown in FIG. 31 without any pasted objects. On the other hand, the function of saving all saves pasted objects and the format.

An arbitrary saving destination can be designated to record desired data as long as it is located on rewritable nonvolatile storage means of a device connected to the system. For example, the card device, expansion memory (EMM), cellular phone (CPH), digital camera, and a device connected to the Internet/network can be designated as the saving destination. Note that the saving function included in detailed functions of other functions can also save data at an arbitrary location.

The print function of the button B5 has print/address print/setup functions, and allows to print currently open data, to print addresses on postcards with reference to the address book, and to set print options.

The address book function of the button B6 has create/edit/save functions, and can create, edit, and save arbitrary address information.

The Internet function of the button B7 has e-mail create/receive/send functions, and a function of browsing home pages on the Internet.

Finally, the end function of the button B8 ends this application.

Figure 32:
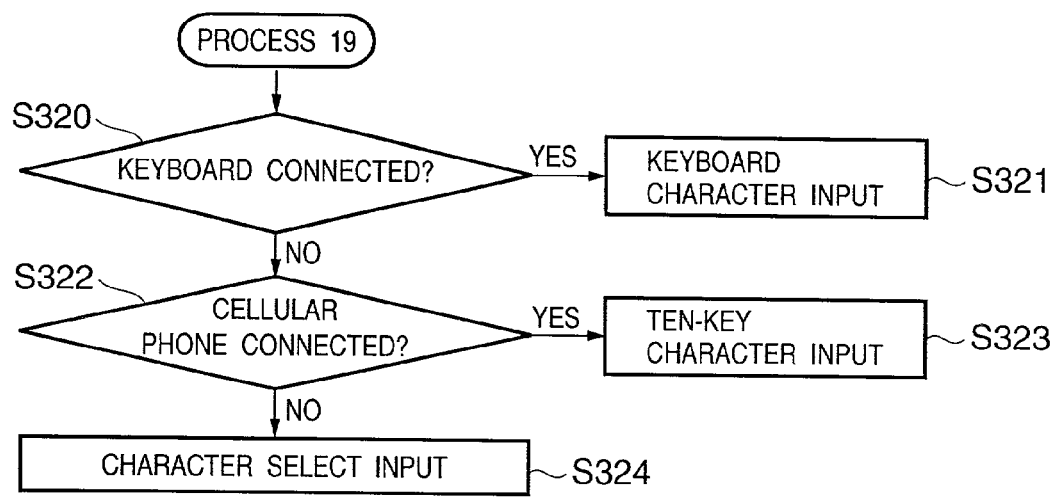
FIG. 32 is a flow chart for explaining an example of a control program (process 19) of the host device in the 16th embodiment.

Process 19 of FIG. 32 is one of application library programs which can run on the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This program is launched when each function of the application requires character input. It is checked in step S320 if the keyboard input device (KB 310) or wireless keyboard input device (WKB 410) is connected to the system. If either of these keyboard input devices is connected, a character input from that keyboard device is obtained in step S321.

In this case, an operation guide message like "Input characters from keyboard" is displayed on the operation window. On the other hand, if neither of these keyboard input devices are connected in step S320, it is checked in step S322 if the cellular phone (CPH 430) is connected. If YES in step S322, a character input is obtained by ten-key operation or character input operation by means of ten-key operation as a standard function of the cellular phone (CPH 430). In this case, an operation guide message "Input characters from portable telephone" can be displayed on the operation window, or a message "Character input in progress" may be displayed on an LED display or the like of the cellular phone. On the other hand, if no cellular phone (CPH 430) is connected in step S322, a character input function by means of at least conventional character input means (for example, 51 hiragana letters, 52 alphabetical letters (capital and small letters), numerals, symbols, and the like are selectively displayed on the DISP 140 as the display output device of the host device by select operations using cursor keys/buttons on the control panel (CP 130), and characters are input by repeating character select/determine operations using cursor keys/buttons on the control panel (CP 130)) in step S324.

An operation example will be described in detail below with reference to FIG. 30.

Figure 30:
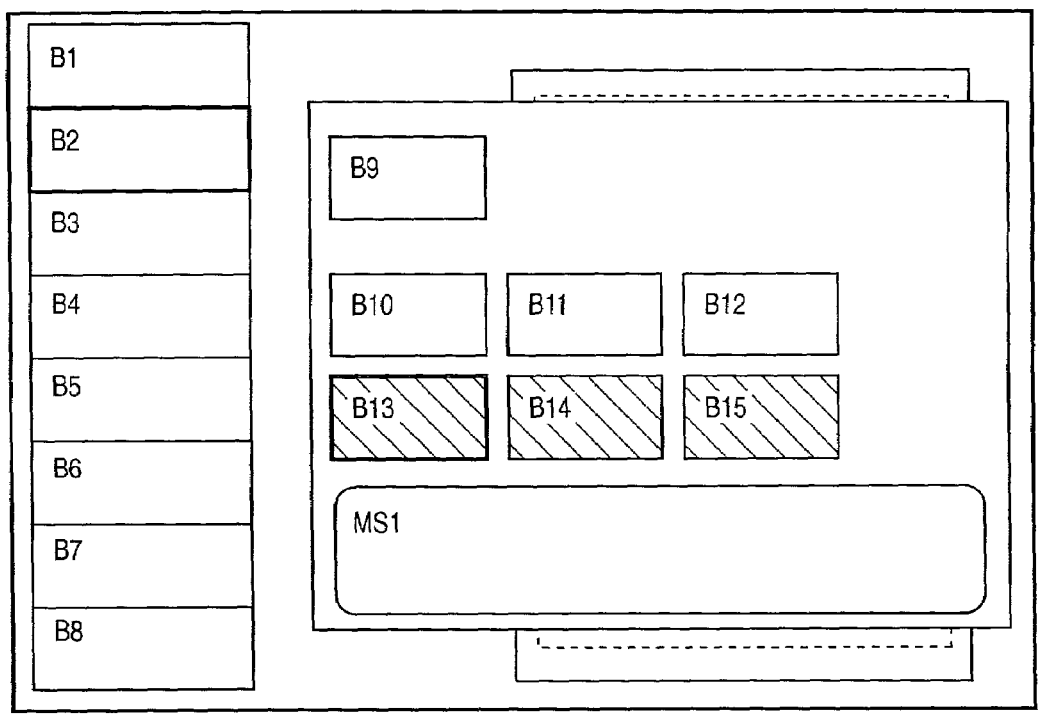
FIG. 30 is a view for explaining an operation screen (2) of the host device in the 16th embodiment.

The operation window shown in FIG. 30 corresponds to a state wherein the button B2, i.e., the paste function is selected, and a submenu box which pops up above the window has buttons B9 to B15, which respectively correspond to detailed functions of the paste functions: buttons B9, B10, B11, B12, B13, B14, and B15 are respectively used to paste a document, to paste a text object, document object, image object, audio object, and the like stored on a CD-ROM (compact disk ROM: a read-only storage medium of the RDV), to paste a text object, document object, image object, audio object, and the like stored on a memory of the card device or the external memory (EMM 180), to paste an image object from a connected video camera, to paste an image object output on the TV, and to paste an audio object of a connected digital audio device.

In FIG. 30, hatched buttons B13 to B15 indicate that devices corresponding to these buttons are not available.

That is, in this example, none of a video camera, a TV having a video capture/output function, and a digital audio device are connected, or are available. Also, in this example, the function button B13 which corresponds to an unavailable device is selected. At this time, an operation guide like "connect video camera" or the like is displayed on a box MS1.

Figure 33:
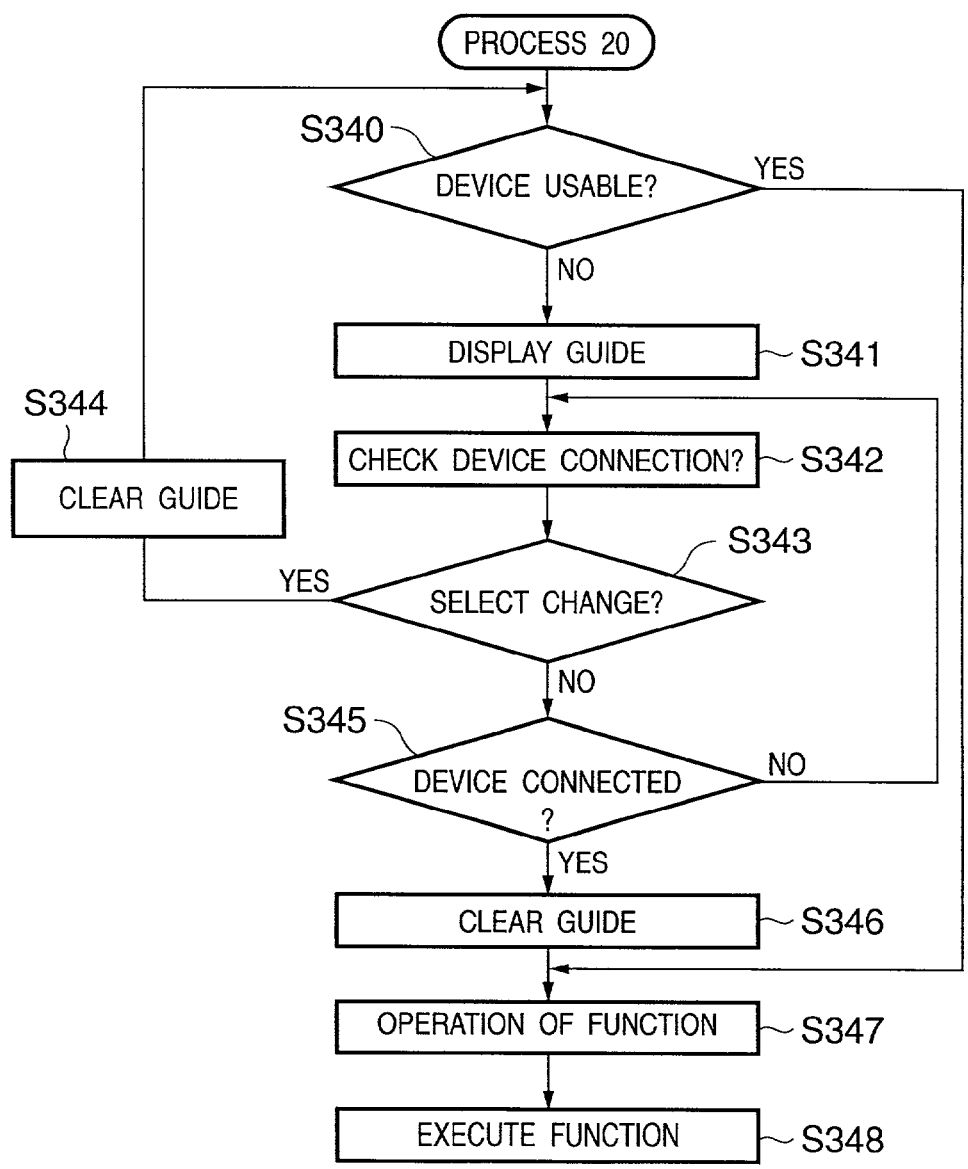
FIG. 33 is a flow chart for explaining an example of a control program (process 20) of the host device in the 16th embodiment.

Process 20 in FIG. 33 is one of application library programs which can run on the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This program is launched when button or menu select operation on the GUI is required for each function of the application. This process starts when a function select button, menu item, or the like on the operation window is selected by cursor key operation of the control panel, keyboard, or the like, or operation of the pointing device. It is checked in step S340 if the selected button or menu item is associated with an externally connected device. If the selected function does not depend on the externally connected device or a device the selected function requires is available, the selected button or menu item is allowed to be used in step S347, and the selected function is executed in step S348.

On the other hand, if a device that the selected function requires is not available in step S340, an operation guide message is output in step S341. For example, as in the aforementioned operation window example in FIG. 30, when no video camera is connected upon selecting the button B13, an operation guide like "connect video camera" or the like is displayed on the box MS1. It is checked in step S342 if the target device is connected, and it is checked in step S343 if the select operation has been changed. If YES in step S343, the operation guide displayed in step S341 is cleared in step S344, and the relationship between the currently selected function and the connected device is checked in step S340.

On the other hand, if the select operation has not been changed in step S343, the device connection state checked in step S342 is examined in step S345. If no desired target device is connected yet, the flow returns to step S342 to check again if a target device is connected. If the target device is connected, the operation guide displayed in step S341 is cleared in step S346, the selected button or menu item is allowed to be used in step S347, and the selected function is executed in step S348.

Figure 34:
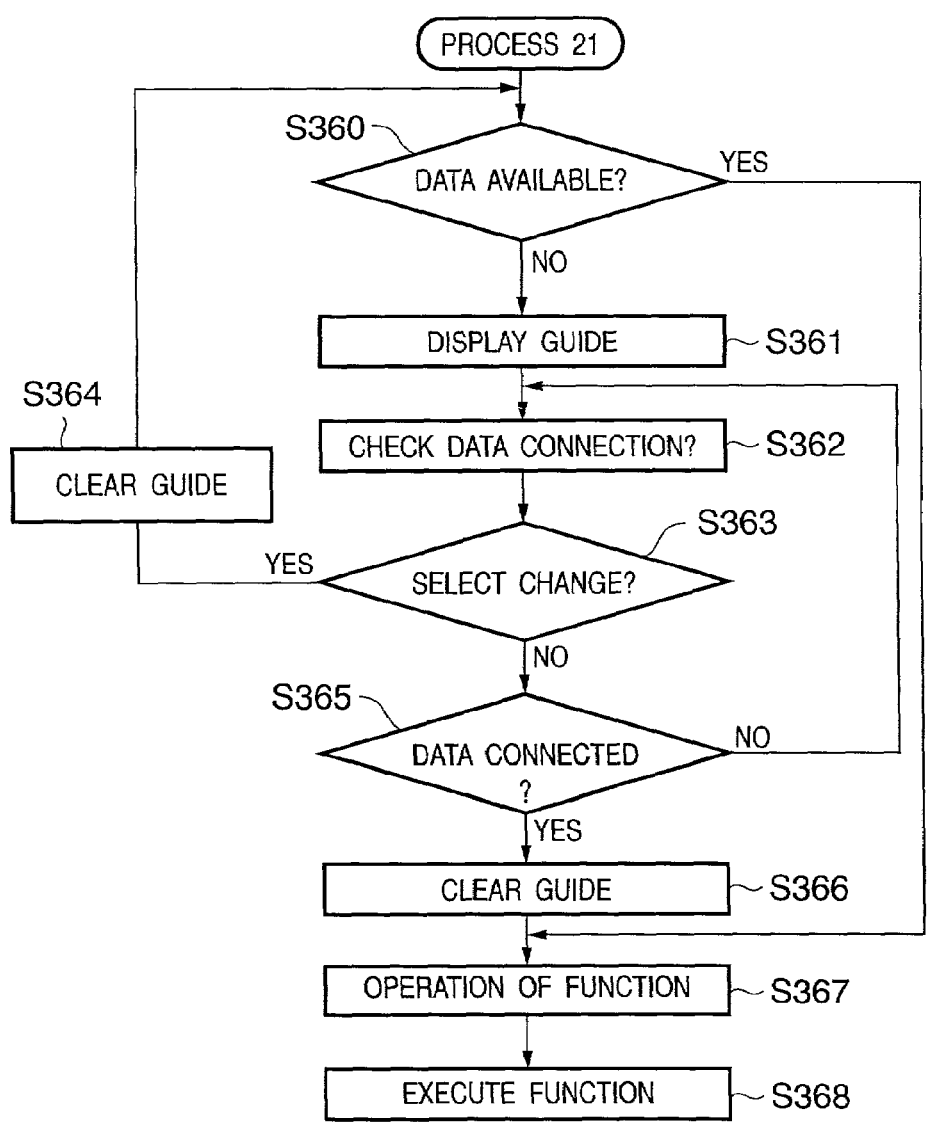
FIG. 34 is a flow chart for explaining an example of a control program (process 21) of the host device in the 16th embodiment.

Process 21 in FIG. 34 is one of application library programs which can run on the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This program is launched when button or menu select operation on the GUI is required for each function of the application. This process starts when a function select button, menu item, or the like on the operation window is selected by cursor key operation of the control panel, keyboard, or the like, or operation of the pointing device, and process 20 in FIG. 33 mentioned above is executed and reaches step S347. It is checked in step S360 if the data type the button or menu item expects is present on the selected connected device. If YES in step S360, the selected button or menu item is allowed to be used in step S367, and the selected function is executed in step S368.

On the other hand, if the data type the selected function requires is not present in step S360, an operation guide message is output in step S361. For example, when the button B11 is selected on the operation window in FIG. 30, and no image data is present on the card device, an operation guide "no image data is found on card" or the like is displayed. It is then checked in step S362 if a target device is connected, and the target data type is present, and it is checked in step S363 if the select operation has been changed. If YES in step S363, the operation guide displayed in step S361 is cleared in step S364, and the relationship between the currently selected function and the data type on the connected device is checked in step S360. On the other hand, if the select operation has not been changed in step S363, the presence/absence of the data type checked in step S362 is examined in step S365, and if no desired data type is present yet, the flow returns to step S362 to check if the target data type is present. If the presence of the target data type is confirmed, the operation guide displayed in step S361 is cleared in step S366, the selected button or menu item is allowed to be used in step S367, and the selected function is executed in step S368.

As described above, when the application programs described in this embodiment are provided to the system arrangement of the present invention, a home-use image processing system which has high operability and can obviate the need for installation processes of application programs and device drivers can be provided.

17th Embodiment

Utility program examples which can be applied to the arrangements of the above embodiments will be explained in detail below with reference to the flow charts.

Figure 35:
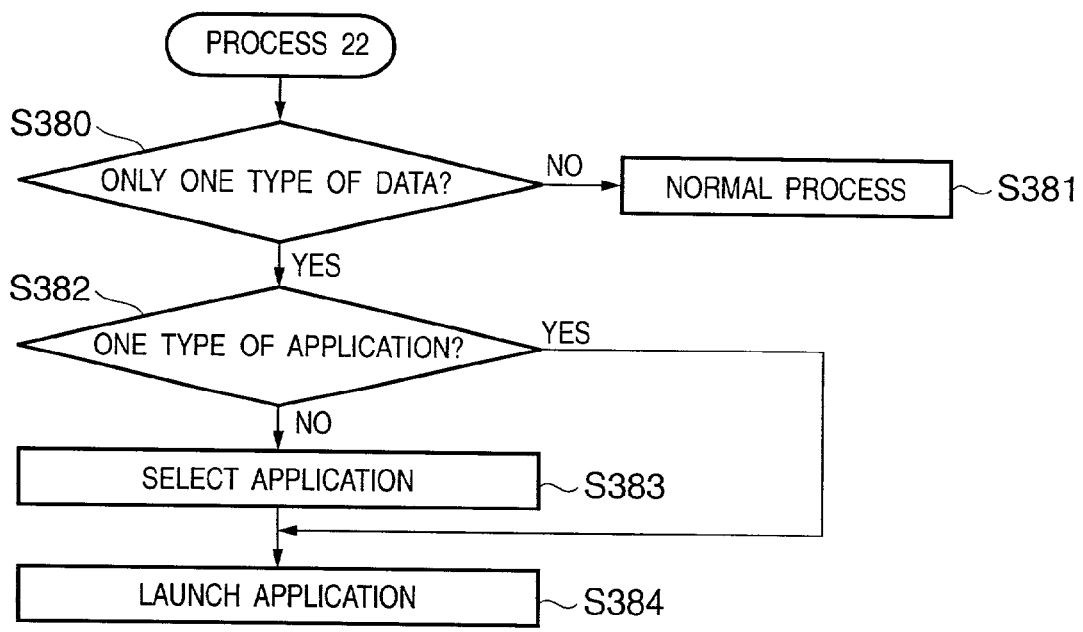
FIG. 35 is a flow chart for explaining an example of a control program (process 22) of a host device in the 17th embodiment.

Process 22 of FIG. 35 is one of utility programs which can run on the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This program is an automatic application launch management control program, which is launched when a device is connected to the system.

When it is confirmed that a device is connected to the system, this process starts. File information or the like of the connected device is read out, and if a plurality of data types are found in step S380, the flow advances to step S381 to start, e.g., application select operation without automatically launching an application. On the other hand, if only one data type is found in step S380, pre-set automatic launch management information is checked in step S382. If only one application is set to be automatically launched, that application is automatically launched in accordance with the automatic launch management information. On the other hand, if two or more applications to be automatically launched are found in step S382, an operation window that prompts the user to select one of applications which are set to be automatically launched is displayed, and the control waits for a user select instruction in step S383. If an application is selected, the selected application is launched in step S384. The automatic launch management information can be set/changed by the user, and setup contents are saved in a nonvolatile memory.

Figure 36:
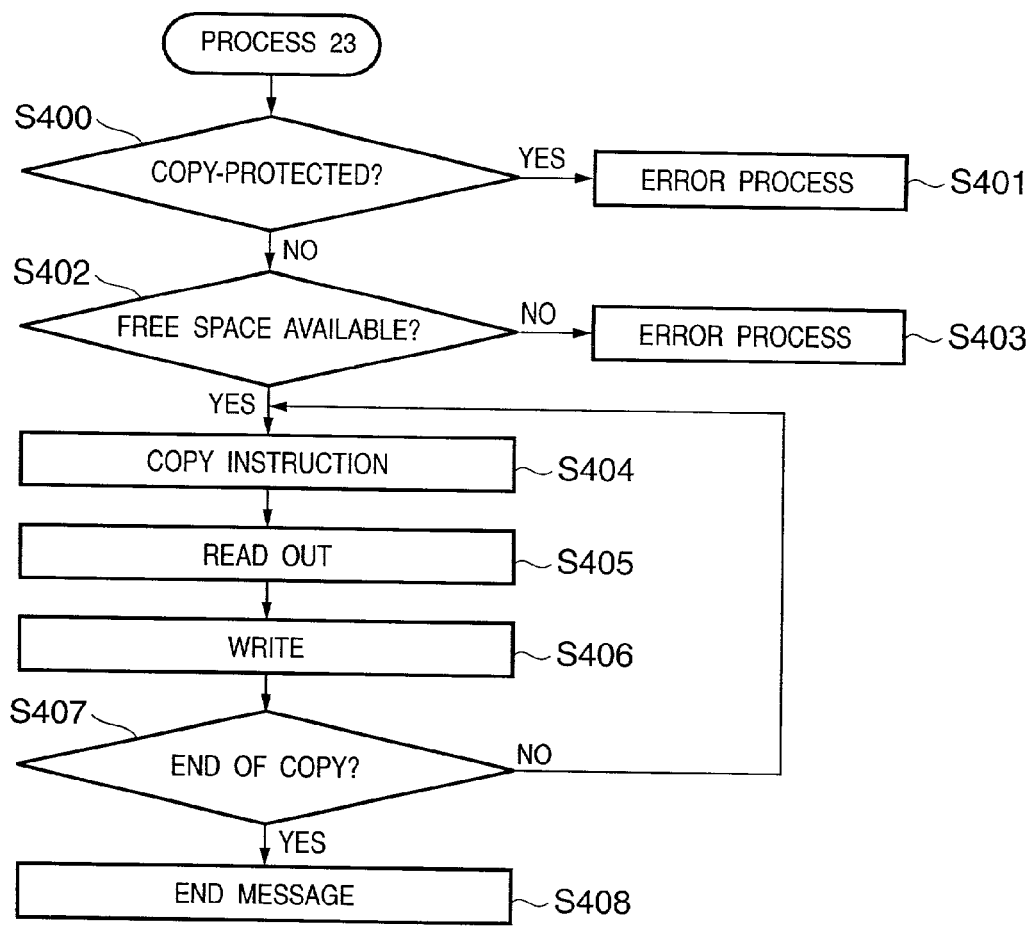
FIG. 36 is a flow chart for explaining an example of a control program (process 23) of the host device in the 17th embodiment.

Process 23 of FIG. 36 is a flow chart for explaining a utility program of the host device and an assistant utility program of the printer device. Note that the control program on the host device side is loaded from the read-only storage device (RDV) of the host device onto the RAM of the system controller (SCT) as needed or is pre-stored in the ROM or the like, and objective control can be implemented when the CPU reads out and executes the program at an appropriate timing as needed. On the other hand, the control program on the printer device side is one of control programs of the printer device, the program is stored in the ROM 13 of the printer controller 10 in the printer device, and objective control can be implemented when the CPU reads out and executes the program at an appropriate timing as needed.

This control program is a utility program which allows the host device to copy the memory contents on the card device 200 onto another card device using the printer device.

This process starts in response to a predetermined operation instruction. The host device acquires file information of the card device as the copy source, and checks in step S400 if the file to be copied is a copy-protected. If YES in step S400, an error message "This information is copy-protected" or the like is output in step S401. Note that copy-protected information includes, e.g., copyrighted control programs/data, pay information, or free information.

If the file to be copied is not copy-protected in step S400, the format information or serial number of the current card device (copy source) is stored as copy source information, a message "Insert copy destination card" or the like is output, and the control waits until the card device is exchanged. After the card device is exchanged, it is checked in step S402 if the card device as the copy destination has a free space. If the free space size is insufficient, an error message "Copy destination card has insufficient free space" or the like is displayed on the screen in step S403.

On the other hand, if the free space size is sufficient in step S402, the format information or serial number of the card device (copy destination) is stored as copy destination information in step S404, a message "Insert copy source card" or the like is displayed, and the control waits until the copy source card is inserted. That is, the control waits until the card device having the same copy source information as the stored information is inserted. If the card device as the copy source is recognized, a message "Copy in progress. Do not remove card." or the like is output on the screen. The host device then inquires of the printer device about a maximum memory size that can be used for a copy process, and requests the printer device to read out a file together with copy target file information that can be read out at one time. The printer device reads out designated information from the card device in accordance with the request from the host device, temporarily stores the readout information in its RAM, and sends a read end message to the host device in step S405.

Upon receiving this message, in step S406 the host device outputs a message "Insert copy destination card" or the like on the screen, and waits until the card device is exchanged. If the device card is exchanged correctly, the host device outputs a message "Copy in progress. Do not remove card." on the screen, and requests the printer device to write the readout information on the card device. In response to this request, the printer device writes all the information read out in step S405 in the card device, and sends a write end message to the host device upon completion of the write process. The host computer checks in step S407 if all files to be copied have been copied. If files to be copied remain, the flow returns to step S404. Steps S404 to S407 are repeated, and if it is determined in step S407 that all files to be copied have been copied, a message "Copy onto card is successful" or the like is output on the screen and the control waits for predetermined operation in step S408, thus ending this processing.

As described above, since the copy process between two card devices is done using the storage means such as the RAM of the printer device, information to be copied in practice need not be sent from the card device to the host device, and need not be written from the host device in another card device, thus shortening the copy time.

Figure 37:
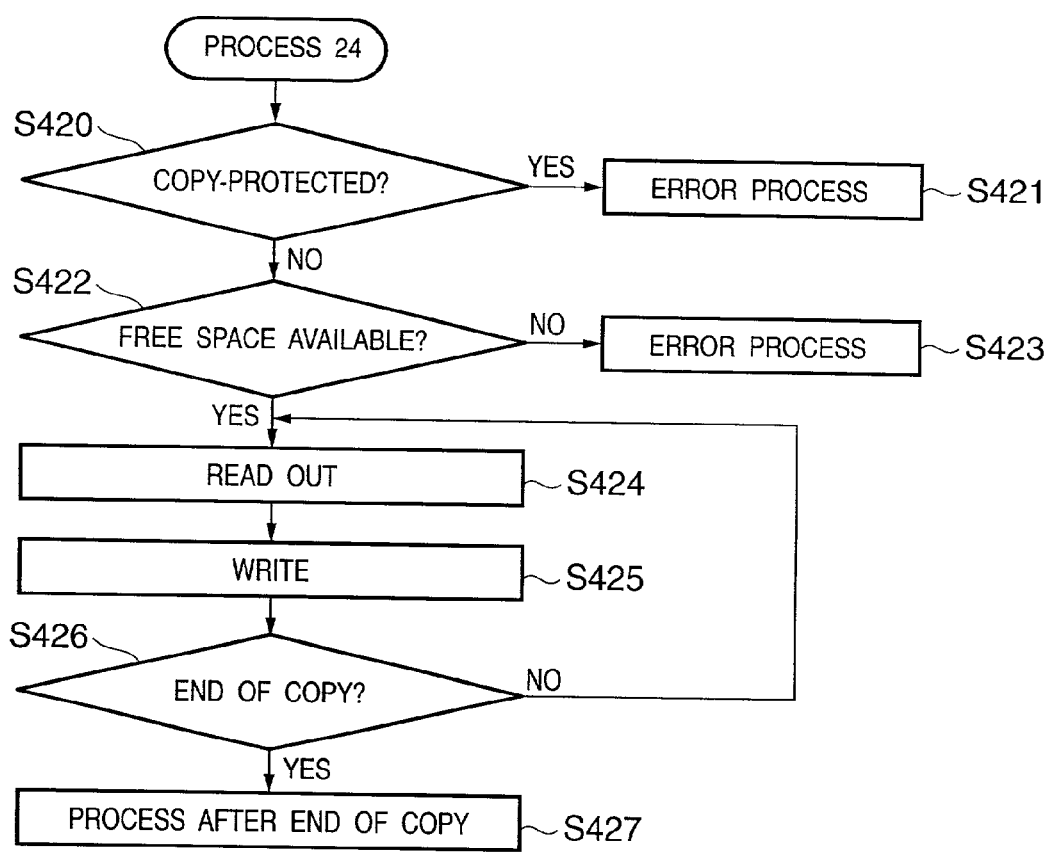
FIG. 37 is a flow chart for explaining an example of a control program (process 24) of the host device in the 17th embodiment.
Figure 38:
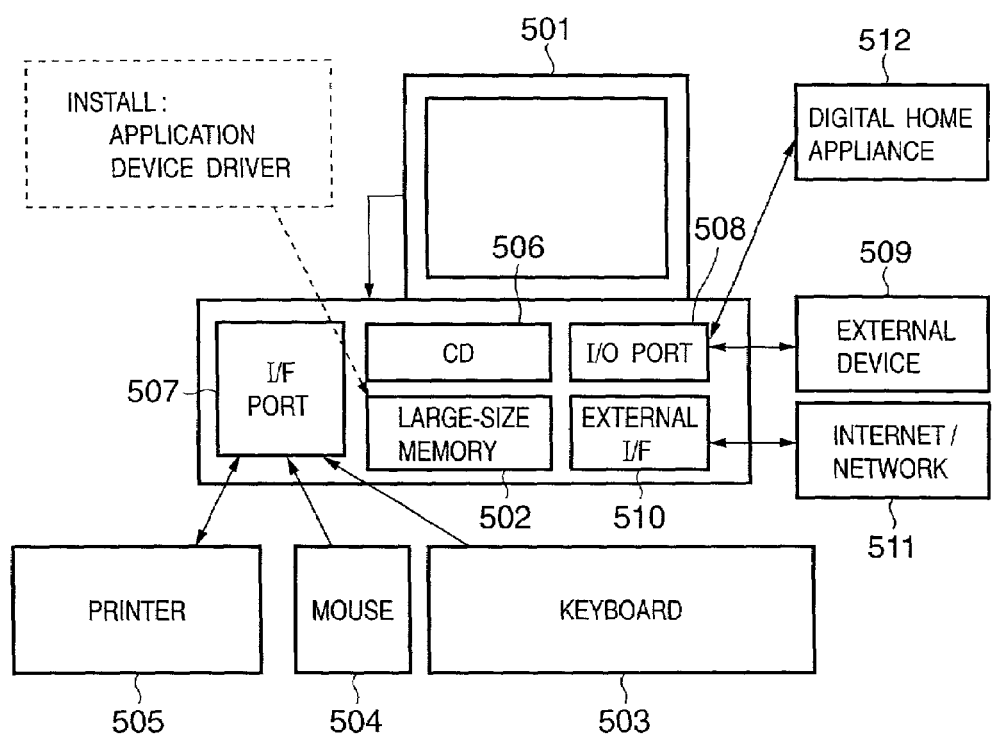
FIG. 38 is a diagram for explaining the first prior art.
Figure 39:
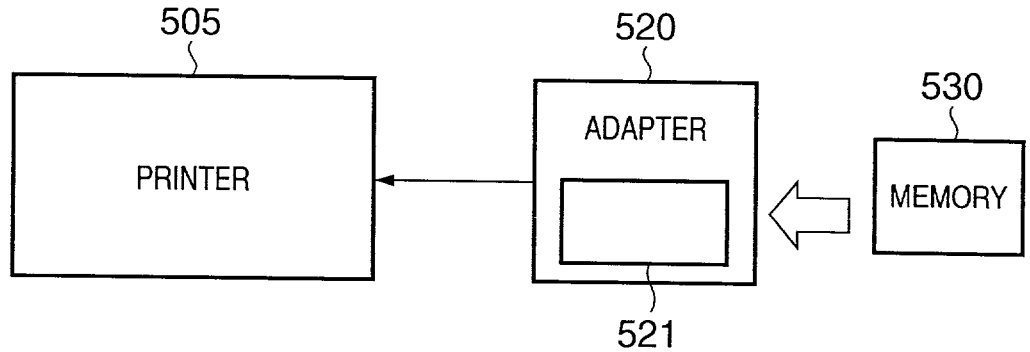
FIG. 39 is a diagram for explaining the second prior art.
Figure 40:
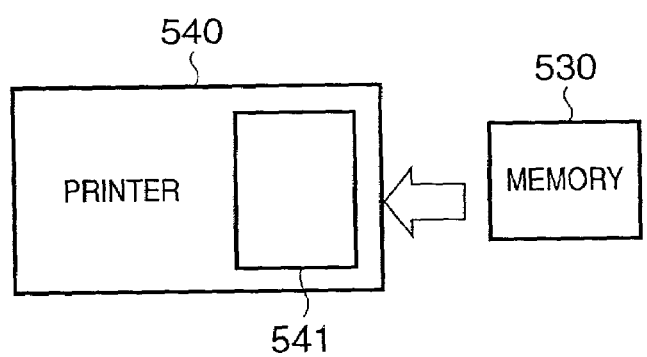
FIG. 40 is a diagram for explaining the third prior art.

Process 24 in FIG. 37 is a flow chart for explaining a utility program of the host device. This control program is loaded from the read-only storage device (RDV) of the host device onto the RAM of the system controller (SCT) as needed or is pre-stored in the ROM or the like, and objective control can be implemented when the CPU reads out and executes the program at an appropriate timing as needed.

This control program is a utility program which allows the host device to copy information from an arbitrary one of devices connected to the system to another arbitrary one.

This process starts in response to a predetermined operation instruction. The host device acquires file information of a device as the copy source, and checks in step S420 if the file to be copied is a copy-protected. If YES in step S420, an error message "This information is copy-protected" or the like is output in step S421.

Note that copy-protected information includes, e.g., copyrighted control programs/data, pay information, or free information. If the file to be copied is not copy-protected in step S420, a message "Select copy destination device" or the like is output on the screen, and the control waits until a copy destination device is selected. If a copy destination device is selected, it is checked in step S422 if the copy destination device has a sufficient free space. If the free space is insufficient, an error message "Copy destination device has insufficient free space" or the like is output on the screen in step S423. On the other hand, if the free space is sufficient in step S422, a message "Copy in progress. Please wait." or the like is output on the screen. The file to be copied is read out from the copy source device in step S424, and is written in the copy destination device in step S425. It is checked in step S426 if all files to be copied have been copied. If files to be copied remain, the flow returns to step S424.

Steps S424 to S426 are repeated, and if all files to be copied have been copied in step S426, a message "Copy is successful" or the like is output on the screen, and the control waits for predetermined operation in step S427, thus ending this process.

Note that an arbitrary copy source device can be designated to read out desired data as long as it is a device connected to the system and has storage means. For example, a card device, expansion memory (EMM), cellular phone (CPH), digital camera, and a device connected to the Internet/network can be designated as the copy source device. Also, an arbitrary copy device can be designated to record desired data as long as it is connected to the system and has rewritable nonvolatile storage means.

As described above, according to this embodiment, information can be smoothly exchanged among devices connected to the system. For example, the user can easily perform data management for collecting desired file information on a single device.

As described above, according to the present invention, one of the following effects can be obtained.

(1) Each device which has a control panel (to be referred to as UI hereinafter) unit connected to the system arrangement via interface means has UI resource information, and a device connected to the system has control means that can use a UI resource of another device. Furthermore, each device connected to the system has status information, and has control means that can acquire status information of another device. Hence, high operability can be assured without especially adding input operation/display means or the like to devices connected to the system.

(2) The printer device in the system arrangement has detection means for detecting if the printer device can communicate with the host device, communication means for, when the printer device cannot communicate with the host device, and the communication controller receives a request to be sent from the card controller to the host device, saving the request as error history information in internal storage means of the printer device or storage means in the card controller in place of sending the request to the host device, and for, when the printer device can communicate with the host device later, informing the host device of the presence of the error history information in the printer device, and another communication means for returning the error history information to the host device in response to a request from the host device. Hence, in at least a state wherein the printer device receives electric power, operation environments ① "a method of at least informing the user of operation errors using the indicator/buzzer or the like of the printer device when the host device issues a request associated with the card device to the printer device but the printer device cannot communicate with the card device", ② "a method of at least informing the user of operation errors using the indicator/buzzer or the like of the printer device when the printer device cannot communicate with the host device", and ③ "a method in which when the printer device cannot communicate with the host device, it stores requests or the like to the host device caused by user operations as an error history, and when the host and printer devices can communicate with each other later, the host device reads out the error history from the printer device, interprets the contents and order of erroneous operations, and offers operation guides by means of text, icons, voice messages, and the like on the screen" can be provided. Hence, even when the user forgets to connect a cable or the like, means which informs a sequence which is easy for the user to understand and makes him or her easily solve the problem can be provided, thus improving operability.

(3) The printer device in the system arrangement has a power saving function, and comprises control means for, when the card controller sends a print-related request to be sent to the host device to the communication controller, and the printer device is in a power saving mode, preparing for a print request from the host device after an initial operation of a mechanism of the printer device starts, and for, when a request other than the print-related request is sent, sending the request to the host device without starting the initial operation. Hence, when no print process is required, even when the printer device is in the power saving mode, the initial operation can be prevented from starting, thus saving electric power consumed by the printer device.

(4) The card controller in the system arrangement has control means that can acquire performance information of the printer device, and means for checking based on the performance information if a target printout can be obtained by the printer device alone, and also comprises output control means for, when it is determined that the target printout can be obtained by the printer device alone, controlling the printer device alone to print without sending any request to the host device. Hence, a text print process can be printed out without the intervention of the host device, and when the host device uses a function other than the print function, a desired text print (simple print) process can be executed without interrupting that function.

(5) The host device in the system arrangement has detection means for recognizing the presence/absence and type of a device connected via interface communication means, and means for searching for and reading out a control program such as an optimal device driver, library, or the like in accordance with the detection output, and the control program is pre-stored on a storage medium such as a CD-ROM/ROM/external memory, or the like which can be read out by a device directly connected to the host device, storage means on the printer device and card device, or a storage device or the like of a device on the Internet/network connected via an external interface. In this arrangement, the host device comprises control means for searching for, reading out, and executing an optimal control program in accordance with at least the printer device and card device connected upon launching an application so as to allow to use the connected device. Hence, when the user connects a desired device as needed and inserts a recording medium such as a CD-ROM or the like, which stores an application and the like, into the device depending on a function he or she wants to use, he or she can immediately use that function without any conventional troublesome processes such as installation processes and the like.

(6) The card device in the system arrangement has output means for outputting version information, storage means for storing an optimal control program/data of the latest version in the card device as needed, and another output means for outputting information indicating the presence/absence of a control program, and the card controller has detection means for detecting if the card device is attached, read-out means for acquiring version information of the card device that the control program/data stored in the card controller or printer device can support, and at least three pieces of information from the card device, and determination means for, when the card controller detects that the card device is attached, comparing the version information that the control program/data can support, and the version information of the card device to check compatibility. The card controller also comprises means for, when the card device stores the optimal control program/data of the latest version, reading out that control program/data from the card device, and for, when the card device does not store any optimal control program/data of the latest version, sending a message indicating this to the host device, which supplies a control program suitable for the card device to the printer device to replace some or all of control program/data stored in the card controller or printer device so as to update control to that suitable for the card device. Hence, upon using a functionally upgraded card device, the user can immediately use a desired upgraded function without any troublesome processes such as version-up processes, installation processes, and the like.

(7) In the system arrangement, the host device has means for detecting the type of at least the printer device connected, and selection means for reading out a print control program/data, which is optimal to the printer device connected, and is pre-stored in a storage medium, in accordance with the detection result, and comprises control means for controlling the selection means to read out an optimal print control program/data from the storage medium upon receiving a print instruction, and executing the print control program to control the printer device to print out desired text/image data. Even upon printing, since the user need only connect the printer and issue a print instruction from an application, he or she can immediately obtain a printout without any troublesome operations such as installation processes and the like. Note that the same effect can be obtained even when the printer in the system arrangement does not have any function associated with the card device.

(8) The system arrangement has control means, which has a first control program for executing a desired image print operation in accordance with a user operation instruction/select operation from an application program running on the host device, and a second control program for generating print control data to be printed by the printer device in accordance with contents requested by the first control program, and which outputs print control data generated by the second control program to the printer device. Input information from the first control program to the second control program has at least image information, and print mode information parameters for designating a printout speed and quality, the select operation does not include at least a select item of a print paper medium type, and the first control program passes image information and print mode information which is automatically generated in accordance with the type of image data to be printed or the print paper medium type designated by the application program, and another select information designated by user operation to the second control program. In this manner, a paper sheet used in a print process can be specified in correspondence with the function of an application, and when a print paper sheet that can be used in the print process is limited by the function of the application, a printout can be obtained without making any setups that pertain to a paper sheet, print mode, and the like upon print operation.

(9) The system arrangement has control means by means of an application program for generating and saving composite image data obtained by combining image data, text data, and the like selected from a plurality of pieces of information obtained by arbitrarily reading out text information, image information, audio information, and the like stored in respective devices connected to the system, and processing them via control programs plug-in applets, application libraries, and the like as needed, in accordance with a user operation instruction via screen output means and operation input means (the generated data can be saved at an arbitrary location on a device having (rewritable) storage means in/from which user information can be saved/read out), displaying the generated data on the screen, or printing out the generated data via the printer device. Hence, an image processing system which can easily use a print function or the like even in a living room of home can be provided.

(10) In the system arrangement, management information of the types of connected devices and the data types, which can be used by each application program, is stored as header information of an application program which runs on the host device. The host device has detection means for detecting if each device connected to the system can be used, and determination means for comparing the output from the detection means with the management information indicating the type of connected device, which is to be used by a given application program, and comprises suppression control means for, when none of devices to be used are available, inhibiting the application program from being launched, and for, when at least one device to be used is available, and the data type which can be used by the available device is present, launching the application program, and inhibiting a function corresponding to an unavailable connected device and a function corresponding to an available connected device, for which no data type that the device can use is present, of those of the application program from being launched. Furthermore, the host device comprises control means for displaying icons, menu items, and the like on the screen used to select the corresponding application program in a selection-inhibited state, for, when the user selects selection-inhibited icons, menu items, and the like, outputting an operation guide such as an alert, operation sequence, and the like indicating at least that a device that can be used is not connected by means of text, image, audio, or the like, and for, when the user connects the device that can be used in accordance with the operation guide, and status detection means of the connected device detects that the device can be used during selection, clearing the operation guide or the like, displaying icons, menu items, and the like in a selectable state, and launching an application program of user's choice. Hence, the user need only operate an application function he or she wants to use, and if a connected device required for the selected function is not available, an operation guide that is easy for the user to understand is presented, thus providing a device with high operability.

(11) In the system arrangement, the host device comprises detection means for detecting the types of information that can be acquired from the card device, and control means for, when only one type of information can be acquired from the card device, launching a predetermined application program, and for, when a plurality of application programs are set in advance for each information type, outputting a select screen of these application program, making the user select a desired application program, and launching the selected application program, and also comprises operation means for creating, editing, and saving information which is set in advance for each information type, and storage control means for saving information, which is set in advance for each information type, at an arbitrary location of storage means in accordance with a user instruction in each of devices which are connected to the system and have (rewritable) storage means in/from which user information can be saved/read out. Hence, the user can use a desired application function by only setting the card device in the printer, and the need for launching an application can be obviated, thus simplifying operations.

(12) In the system arrangement, the host device has a function of copying memory information on the card device by sending a predetermined request to the printer device, which reads out/writes information from/in the card device using its internal storage means. Hence, upon copying information on a given card device to another card device, high-speed copy operation can be done.

(13) In the system arrangement, the host device comprises storage control means for reading out arbitrary information from an arbitrary location of each of devices which are connected to the system and have storage means from which information/control programs can be read out, and saving the information or rewriting a control program at an arbitrary location of each of devices which are connected to the system and have storage means in/from which information/control programs can be saved/read out. In this manner, information can be easily exchanged among connected devices, and the user can easily arrange information.

As described above, the image processing system of the present invention can provide a system environment that allows every users to use many multimedia functions in a living room, and can provide a home-use print system which is inexpensive, has many functions, and is convenient.

As many apparently widely different embodiments of the present invention can be made without departing from the spirit and scope thereof, it is to be understood that the invention is not limited to the specific embodiments thereof except as defined in the claims.

What is claimed is:

1. A printer comprising:
a first determination unit adapted to determine whether received information is information for a print function;
a second determination unit adapted to, when said first determination unit determines that the received information is the information for the print function, determine whether the printer is in a sleep state;
a third determination unit adapted to, when said second determination unit determines that the printer is not in the sleep state, determine whether the printer can print singly without starting an initial operation, and when said second determination unit determines that the printer is in the sleep state, start the initial operation and determine whether the printer can print singly; and a processing unit adapted to, when said third determination unit determines that the printer can print singly, execute printing in accordance with the received information, when said third determination unit determines that the printer cannot print singly, transmit the received information to a host device, and when said first determination unit determines that the received information is not the information for the print function, transmit the received information to the host device.

2. The printer according to claim 1, wherein the initial operation includes an initialization of a mechanism of the printer.

3. The printer according to claim 1, wherein the printer comprises an ink-jet printer.

4. The printer according to claim 1, wherein said third determination unit determines that the printer cannot print singly when an image with high image quality is included as information to be printed in the received information.

5. A printer comprising:
a first determination unit adapted to determine whether information received from a card device is information for a print function;
a second determination unit adapted to, when said first determination unit determines that the information received from the card device is the information for the print function, determining whether the printer is in a sleep state;
a third determination unit adapted to, when said second determination unit determines that the printer is not in the sleep state, determine whether the printer can print singly without starting an initial operation, and when said second determination unit determines that the printer is in the sleep state, starting the initial operation and determining whether the printer can print singly; and
a processing unit adapted to, when said third determination unit determines that the printer can print singly, executing printing in accordance with the information received from the card device, when said third determination unit determines that the printer cannot print singly, transmitting the information received from the card device to a host device, and when said first determination unit determines that the information received from the card device is not the information for the print function, transmitting the information received from the card device to the host device.

6. The printer according to claim 5, wherein the initial operation includes an initialization of a mechanism of the printer.

7. The printer according to claim 5, wherein the printer comprises an ink-jet printer.

8. The printer according to claim 5, wherein said third determination unit determines that the printer cannot print singly when an image with high image quality is included as information to be printed in the received information.

9. A printer control method comprising:
a first determination step of determining whether received information is information for a print function;
a second determination step of, when it is determined in the first determination step that the received information is the information for the print function, determining whether the printer is in a sleep state;
a third determination step of, when it is determined in the second determination step that the printer is not in the sleep state, determining whether the printer can print singly without starting an initial operation, and when it is determined in the second determination step that the printer is in the sleep state, starting the initial operation and determining whether the printer can print singly; and
a processing step of, when it is determined in the third determination step that the printer can print singly, executing printing in accordance with the received information, when it is determined in the third determination step that the printer cannot print singly, transmitting the received information to a host device, and when it is determined in the first determination step that the received information is not the information for the print function, transmitting the received information to the host device.

10. The printer control method according to claim 9, wherein the initial operation includes an initialization of a mechanism of the printer.

11. The printer control method according to claim 9, wherein the printer comprises an ink-jet printer.

12. The printer control method according to claim 9, wherein said third determination step determines that the printer cannot print singly when an image with high image quality is included as information to be printed in the received information.

13. A printer control method comprising:
a first determination step of determining whether information received from a card device is information for a print function;
a second determination step of, when it is determined in the first determination step that the information received from the card device is the information for the print function determining whether the printer is in a sleep state;
a third determination step of, when it is determined in the second determination step that the printer is not in the sleep state, determining whether the printer can print singly without starting an initial operation, and when it is determined in the second determination step that the printer is in the sleep state, starting the initial operation and determining whether the printer can print singly; and
a processing step of, when it is determined in the third determination step that the printer can print singly, executing printing in accordance with the information received from the card device, when it is determined in the third determination step that the printer cannot print singly, transmitting the information received from the card device to a host device, and when it is determined in the first determination step that the information received from the card device is not the information for the print function, transmitting the information received from the card device to the host device.

14. The printer control method according to claim 13, wherein the initial operation includes an initialization of a mechanism of the printer.

15. The printer control method according to claim 13, wherein the printer comprises an ink-jet printer.

16. The printer control method according to claim 13, wherein said third determination step determines that the printer cannot print singly when an image with high image quality is included as information to be printed in the received information.

17. A computer readable program stored on a computer readable medium for making a computer implement a printer control method, the program comprising:
- a first determination step of determining whether received information is information for a print function;
- a second determination step of, when it is determined in the first determination step that the received information is the information for the print function, determining whether the printer is in a sleep state;
- a third determination step of, when it is determined in the second determination step that the printer is not in the sleep state, determining whether the printer can print singly without starting an initial operation, and when it is determined in the second determination stop that the printer is in the sleep state, starting the initial operation and determining whether the printer can print singly; and
- a processing step of, when it is determined in the third determination step that the printer can print singly, executing printing in accordance with the received information, when it is determined in the third determination step that the printer cannot print singly, transmitting the received information to a host device, and when it is determined in the first determination step that the received information is not the information for the print function, transmitting the received information to the host device.

18. The computer readable program according to claim 17, wherein the initial operation includes an initialization of a mechanism of the printer.

19. The computer readable program according to claim 17, wherein the printer comprises an ink-jet printer.

20. The computer readable program according to claim 17, wherein said third determination step determines that the printer cannot print singly when an image with high image quality is included as information to be printed in the received information.

21. A computer readable program stored on a computer readable medium for making a computer implement a printer control method, the program comprising:
- a first determination step of determining whether information received from a card device is information for a print function;
- a second determination step of, when it is determined in the first determination step that the information received from the card device is the information for the print function, determining whether the printer is in a sleep state;
- a third determination step of, when it is determined in the second determination step that the printer is not in the sleep state, determining whether the printer can print singly without starting an initial operation, and when it is determined in the second determination step that the printer is in the sleep state, starting the initial operation and determining whether the printer can print singly; and
- a processing step of, when it is determined in the third determination step that the printer can print singly, executing printing in accordance with the information received from the card device, when it is determined in the third determination step that the printer cannot print singly, transmitting the information received from the card device to a host device, and when it is determined in the first determination step that the information received from the card device is not the information for the print function, transmitting the information received from the card device to the host device.

22. The computer readable program according to claim 21, wherein the initial operation includes an initialization of a mechanism of the printer.

23. The computer readable program according to claim 21, wherein the printer comprises an ink-jet printer.

24. The computer readable program according to claim 21, wherein said third determination step determines that the printer cannot print singly when an image with high image quality is included as information to be printed in the received information.

* * * * *

UNITED STATES PATENT AND TRADEMARK OFFICE
CERTIFICATE OF CORRECTION

| | |
|---|---|
| PATENT NO. | : 7,068,386 B2 |
| APPLICATION NO. | : 09/853710 |
| DATED | : June 27, 2006 |
| INVENTOR(S) | : Tetsuya Kawanabe |

It is certified that error appears in the above-identified patent and that said Letters Patent is hereby corrected as shown below:

DRAWINGS:
Sheet 28, Figure 28A, Box S306, "GENELTATE" should read -- GENERATE --.

COLUMN 23:
Line 49, "←43" should read -- ← → --

COLUMN 24:
Line 22, "circuit" should read -- circuit) --; and
Line 44, "print S" should read -- print --.

COLUMN 25:
Line 3, "(PCMD" should begin a new paragraph; and
Line 60, " "N"-"H"; " should read -- "N"="H"; --.

COLUMN 29:
Line 3, "AckReplyok" should read -- AckReplyOk --.

COLUMN 32:
Line 45, "①" should read -- ④ --.

COLUMN 36:
Line 18, "plyok," should read -- plyOk, --.

COLUMN 37:
Line 30, "plyok," should read -- plyOk, --;
Line 50, "AckReplyok," should read -- AckReplyOk, --; and
Line 57, "plyok" should read -- plyOk --.

COLUMN 38:
Line 62, "AckReplyok" should read -- AckReplyOk --.

COLUMN 39:
Line 25, "AckReplyok" should read -- AckReplyOk --; and
Line 46, "Replyok" should read -- ReplyOk --.

COLUMN 40:
Line 3, "AckReplyok" should read -- AckReplyOk --.

COLUMN 46:
Line 46, "recoded" should read -- recorded --.

UNITED STATES PATENT AND TRADEMARK OFFICE
CERTIFICATE OF CORRECTION

PATENT NO. : 7,068,386 B2
APPLICATION NO. : 09/853710
DATED : June 27, 2006
INVENTOR(S) : Tetsuya Kawanabe It is certified that error appears in the above-identified patent and that said Letters Patent is hereby corrected as shown below:

COLUMN 49:
Line 53, "e.g." should read -- e.g., --.

COLUMN 52:
Line 66, "devices" should read -- device --.

COLUMN 59:
Line 1, " is a" should read -- is --.

COLUMN 60:
Line 7, "is a" should read -- is --.

COLUMN 64:
Line 12, "program," should read -- programs, --; and
Line 46, "users" should read -- user --.

COLUMN 66:
Line 36, "function" should read -- function, --.

COLUMN 67:
Line 14, "stop" should read -- step --.

Signed and Sealed this

Thirty-first Day of July, 2007

JON W. DUDAS
*Director of the United States Patent and Trademark Office*